United States Patent
Watanabe et al.

(10) Patent No.: US 11,310,426 B2
(45) Date of Patent: Apr. 19, 2022

(54) CONTROL DEVICE, CONTROLLING METHOD, AND IMAGING APPARATUS

(71) Applicant: SONY SEMICONDUCTOR SOLUTIONS CORPORATION, Kanagawa (JP)

(72) Inventors: Kohki Watanabe, Tokyo (JP); Akira Akiba, Kanagawa (JP); Hidetoshi Kabasawa, Tokyo (JP); Mitsuo Hashimoto, Kanagawa (JP); Tomohiro Shirane, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 122 days.

(21) Appl. No.: 16/633,323

(22) PCT Filed: Jul. 18, 2018

(86) PCT No.: PCT/JP2018/026822
§ 371 (c)(1),
(2) Date: Jan. 23, 2020

(87) PCT Pub. No.: WO2019/026615
PCT Pub. Date: Feb. 7, 2019

(65) Prior Publication Data
US 2020/0221004 A1 Jul. 9, 2020

(30) Foreign Application Priority Data
Aug. 1, 2017 (JP) .............................. JP2017-148831

(51) Int. Cl.
*H04N 5/232* (2006.01)
*G02B 27/64* (2006.01)

(52) U.S. Cl.
CPC ......... *H04N 5/2328* (2013.01); *G02B 27/646* (2013.01); *H04N 5/23264* (2013.01); *H04N 5/23287* (2013.01); *G03B 2205/0007* (2013.01); *G03B 2207/005* (2013.01)

(58) Field of Classification Search
CPC ............. H04N 5/2328; H04N 5/23258; H04N 5/23203; H04N 5/349; H04N 5/225; H04N 2005/2255; G03B 5/00; G03B 15/00
See application file for complete search history.

(56) References Cited

U.S. PATENT DOCUMENTS

2012/0105656 A1\* 5/2012 Noguchi ............ H04N 5/23245
348/208.4
2014/0160566 A1\* 6/2014 Shihoh ..................... G03B 5/00
359/557

(Continued)

FOREIGN PATENT DOCUMENTS

EP 2741137 A2 6/2014
EP 3261329 A1 12/2017

(Continued)

OTHER PUBLICATIONS

Machine English Translation JP 2006165784 A, Jun. 22, 2006 (Year: 2006).\*
International Search Report and Written Opinion of PCT Application No. PCT/JP2018/026822, dated Aug. 28, 2018, 10 pages of ISRWO.

*Primary Examiner* — Nelson D. Hernández Hernández
(74) *Attorney, Agent, or Firm* — Chip Law Group

(57) ABSTRACT

The present technology relates to a control device, a controlling method, and an imaging apparatus that make it possible to reduce a weight of a movable body while simplifying a structure and to improve control accuracy. A moving body that moves in two or more directions, and a controller that controls movement of the moving body are provided. The controller sets a control value directed to (Continued)

controlling of the movement of the moving body on the basis of an initial position of the moving body and an instructed position of the moving body. A parameter directed to setting of the control value is set on the basis of the initial position and the instructed position. The present technology is applicable, for example, to a shake correction device that corrects a hand shake of an imaging apparatus or a technique that achieves super-resolution by shifting a sensor to capturing a plurality of images.

16 Claims, 48 Drawing Sheets

(56) References Cited

U.S. PATENT DOCUMENTS

2016/0248978 A1* 8/2016 Nishihara ............ H04N 5/2254
2017/0244899 A1 8/2017 Abe et al.

FOREIGN PATENT DOCUMENTS

| | | | |
|---|---|---|---|
| JP | 2006165784 A | * | 6/2006 |
| JP | 2007-101671 A | | 4/2007 |
| JP | 2007101671 A | * | 4/2007 |
| JP | 2008-078852 A | | 4/2008 |
| JP | 2008-164928 A | | 7/2008 |
| JP | 2014-115350 A | | 6/2014 |
| JP | 2016-152602 A | | 8/2016 |
| JP | 2017-146532 A | | 8/2017 |
| WO | 2016/132571 A1 | | 8/2016 |

* cited by examiner

| | | INITIAL POSITION | | | |
|---|---|---|---|---|---|
| | | A | B | ... | I |
| INSTRUCTED POSITION | A | KxAA, KyAA | KxBA, KyBA | ... | KxIA, KyIA |
| | B | KxAB, KyAB | KxBB, KyBB | ... | KxIB, KyIB |
| | C | KxAC, KyAC | KxBC, KyBC | ... | KxIC, KyIC |
| | D | KxAD, KyAD | KxBD, KyBD | ... | KxID, KyID |
| | E | KxAE, KyAE | KxBE, KyBE | ... | KxIE, KyIE |
| | F | KxAF, KyAF | KxBF, KyBF | ... | KxIF, KyIF |
| | G | KxAG, KyAG | KxBG, KyBG | ... | KxIG, KyIG |
| | H | KxAH, KyAH | KxBH, KyBH | ... | KxIH, KyIH |
| | I | KxAI, KyAI | KxBI, KyBI | ... | KxII, KyII |

FIG. 45

<table>
<tr><th colspan="3"></th><th colspan="3">INITIAL POSITION 251</th></tr>
<tr><th colspan="3"></th><th>A</th><th>...</th><th>I</th></tr>
<tr><th rowspan="24">INSTRUCTED POSITION</th><th></th><th>x</th><th>y</th><th></th><th>...</th><th></th></tr>
<tr><th rowspan="4">A</th><td>+</td><td>+</td><td>KxAA++, KyAA++</td><td>...</td><td>—</td></tr>
<tr><td>+</td><td>−</td><td>KxAA+−, KyAA+−</td><td>...</td><td>—</td></tr>
<tr><td>−</td><td>+</td><td>KxAA−+, KyAA−+</td><td>...</td><td>—</td></tr>
<tr><td>−</td><td>−</td><td>KxAA−−, KyAA−−</td><td>...</td><td>KxIA−−, KyIA−−</td></tr>
<tr><th rowspan="4">B</th><td>+</td><td>+</td><td>KxAB++, KyAB++</td><td>...</td><td>—</td></tr>
<tr><td>+</td><td>−</td><td>KxAB+−, KyAB+−</td><td>...</td><td>—</td></tr>
<tr><td>−</td><td>+</td><td>—</td><td>...</td><td>—</td></tr>
<tr><td>−</td><td>−</td><td>—</td><td>...</td><td>KxIB−−, KyIB−−</td></tr>
<tr><td>⋮</td><td>⋮</td><td>⋮</td><td>⋮</td><td></td><td>⋮</td></tr>
<tr><th rowspan="4">E</th><td>+</td><td>+</td><td>KxAE++, KyAE++</td><td>...</td><td>—</td></tr>
<tr><td>+</td><td>−</td><td>—</td><td>...</td><td>—</td></tr>
<tr><td>−</td><td>+</td><td>—</td><td>...</td><td>—</td></tr>
<tr><td>−</td><td>−</td><td>—</td><td>...</td><td>KxIE−−, KyIE−−</td></tr>
<tr><td>⋮</td><td>⋮</td><td>⋮</td><td>⋮</td><td></td><td>⋮</td></tr>
<tr><th rowspan="4">I</th><td>+</td><td>+</td><td>KxAI++, KyAI++</td><td>...</td><td>KxII++, KyII++</td></tr>
<tr><td>+</td><td>−</td><td>—</td><td>...</td><td>KxII+−, KyII+−</td></tr>
<tr><td>−</td><td>+</td><td>—</td><td>...</td><td>KxII−+, KyII−+</td></tr>
<tr><td>−</td><td>−</td><td>—</td><td>...</td><td>KxII−−, KyII−−</td></tr>
</table>

FIG. 50

|  |  |  |  | INITIAL POSITION | | | | |
|---|---|---|---|---|---|---|---|---|
|  |  |  |  | A | | ... | I | |
|  |  | x | y |  |  | ... |  |  |
| INSTRUCTED POSITION | A | + | + | KxAA++, KyAA++ | VAA | ... | ——— | VIA |
|  |  | + | − | KxAA+−, KyAA+− |  | ... | ——— |  |
|  |  | − | + | KxAA−+, KyAA−+ |  | ... | ——— |  |
|  |  | − | − | KxAA−−, KyAA−− |  | ... | KxIA−−, KyIA−− |  |
|  | B | + | + | KxAB++, KyAB++ | VAB | ... | ——— | VIB |
|  |  | + | − | KxAB+−, KyAB+− |  | ... | ——— |  |
|  |  | − | + | ——— |  | ... | ——— |  |
|  |  | − | − | ——— |  | ... | KxIB−−, KyIB−− |  |
|  | ⋮ | ⋮ | ⋮ | ⋮ |  | ⋮ | ⋮ |  |
|  | E | + | + | KxAE++, KyAE++ | VAE | ... | ——— | VIE |
|  |  | + | − | ——— |  | ... | ——— |  |
|  |  | − | + | ——— |  | ... | ——— |  |
|  |  | − | − | ——— |  | ... | KxIE−−, KyIE−− |  |
|  | ⋮ | ⋮ | ⋮ | ⋮ |  | ⋮ | ⋮ |  |
|  | I | + | + | KxAI++, KyAI++ | VAI | ... | KxII++, KyII++ | VII |
|  |  | + | − | ——— |  | ... | KxII+−, KyII+− |  |
|  |  | − | + | ——— |  | ... | KxII−+, KyII−+ |  |
|  |  | − | − | ——— |  | ... | KxII−−, KyII−− |  |

351

CONTROL DEVICE, CONTROLLING METHOD, AND IMAGING APPARATUS

CROSS REFERENCE TO RELATED APPLICATIONS

This application is a U.S. National Phase of International Patent Application No. PCT/JP2018/026822 filed on Jul. 18, 2018, which claims priority benefit of Japanese Patent Application No. JP 2017-148831 filed in the Japan Patent Office on Aug. 1, 2017. Each of the above-referenced applications is hereby incorporated herein by reference in its entirety.

TECHNICAL FIELD

The present technology relates to a control device, a controlling method, and an imaging apparatus. For example, the present technology relates to a control device, a controlling method, and an imaging apparatus that each have an expanded range in which shake can be corrected and are each capable of performing control with increased accuracy.

BACKGROUND ART

Some imaging apparatuses, such as a video camera, a still camera, or various devices in which a camera unit is incorporated, are provided with a shake correction device that corrects image shake by causing a lens, an imaging device, or the like to travel in a direction perpendicular to an optical axis direction for example (for example, see PTL 1).

A shake correction device disclosed in PTL 1 includes a movable body and a moving mechanism. The movable body holds a lens or an imaging device. The moving mechanism moves the movable body in a first movement direction and a second movement direction that are perpendicular to each other. The moving mechanism includes a first moving body, a second moving body, a third moving body, a first actuator, and a second actuator. The first moving body, the second moving body, and the third moving body are movably in contact with the movable body at respective positions of the movable body.

The first moving body is moved in the second movement direction by the first actuator. The movable body is moved in the second movement direction when the first moving body is moved in the second movement direction. At this time, the second moving body and the third moving body are caused to slide against the movable body, and the movable body is moved in the second movement direction while being held on a plane perpendicular to the optical axis.

Further, the second moving body is moved in the first movement direction by the second actuator. When the second moving body is moved in the first movement direction, the movable body is moved in the first movement direction. At this time, the first moving body and the third moving body are caused to slide against the movable body, and the movable body is moved in the first movement direction while being held on the plane perpendicular to the optical axis.

CITATION LIST

Patent Literature

PTL 1: Japanese Unexamined Patent Application Publication No. 2008-78852

SUMMARY OF THE INVENTION

Problem to be Solved by the Invention

The shake correction device disclosed in PTL 1 has a configuration in which a plurality of driving forces in different directions is applied to a single movable body. In the shake correction device disclosed in PTL 1, the weight of the movable body is reduced because the moving mechanism is not attached to the movable body; however, three moving bodies are provided, which increases the number of components, leading to a possibility that simplification of the structure is hindered.

Therefore, it is desirable to simplify the structure also in a shake correction device having a configuration in which a plurality of driving forces in different directions is applied to a single movable body.

The present technology has been made in view of the above circumstances, and allows for reduction in weight of a movable body while simplifying a structure.

Means for Solving the Problem

A control device of an aspect of the present technology includes a moving body and a controller. The moving body moves in two or more directions. The controller controls movement of the moving body. The controller sets a control value directed to controlling of the movement of the moving body on the basis of an initial position of the moving body and an instructed position of the moving body.

A controlling method of an aspect of the present technology causes a control device controlling a moving body to control movement of the moving body on the basis of an initial position of the moving body and an instructed position of the moving body. The moving body moves in two or more directions.

An imaging apparatus of an aspect of the present technology includes a lens unit, an imaging device, and a shake correction device. The lens unit includes one or more lenses. The imaging device performs photoelectric conversion of an optical image taken in through the one or more lenses. The shake correction device corrects an image shake of the optical image. The shake correction device includes a moving body and a controller. The moving body moves in two or more directions. The controller sets a control value directed to controlling of movement of the moving body on the basis of an initial position of the moving body and an instructed position of the moving body.

In the control device and the controlling method of one aspect of the present technology, the moving body moving in two or more directions is controlled. The control is performed by setting a control value directed to controlling the movement of the moving body on the basis of the initial position of the moving body and the instructed position of the moving body.

In the imaging apparatus according to one aspect of the present technology, the lens unit having one or more lenses, the imaging device that performs photoelectric conversion of an optical image taken in through the two or more lenses, and a shake correction device that corrects an image shake of the optical image are included. The shake correction device controls the moving body that moves in two or more directions. The control is performed by setting the control value directed to controlling the movement of the moving body on the basis of the initial position of the moving body and the instructed position of the moving body.

It is to be noted that the control device or the imaging apparatus may be independent devices or may be inner blocks included in a single apparatus.

Effects of the Invention

According to one aspect of the present technology, it is possible to reduce the weight of a movable body while simplifying a structure.

It is to be noted that the effects described herein are not necessarily limiting, and any of the effects described in the present disclosure may be provided.

BRIEF DESCRIPTION OF THE DRAWINGS

FIG. 6 is a perspective view illustrating a base body and the like.

FIG. 7 is a perspective view illustrating a first movable body and the like.

FIG. 10 is a perspective view illustrating a second movable body and the like.

FIG. 38 is a diagram illustrating an example of a table.

FIG. 45 is a diagram illustrating an example of a table.

FIG. 50 is a diagram illustrating an example of a table.

MODES FOR CARRYING OUT THE INVENTION

Hereinafter, some embodiments for carrying out the present technology (hereinafter, referred to as embodiments) will be described.

Since the present technology can be applied to a control device that controls a shake correction device that corrects a shake, the control device that controls the shake correction device will be described as an example here. Further, an imaging apparatus including the shake correction device will also be described as appropriate. In the embodiments described below, an imaging apparatus including a control device to which the present technology is applied is applied to an interchangeable lens, and the shake correction device is applied to a shake correction device provided to the interchangeable lens.

It is to be noted that the scope of application to which the present technology is applied is not limited to the interchangeable lens and the shake correction device provided to the interchangeable lens. The present technology can be widely applied to, for example, an imaging apparatus incorporated in various devices such as a still camera, a video camera, a personal computer, or a portable terminal, or to a shake correction device provided in the imaging apparatus thereof.

In the following description, it is assumed that the front, rear, top, bottom, left, and right directions are illustrated from a direction viewed from a photographer in a state in which the interchangeable lens is mounted on an apparatus body of a camera. Therefore, the subject side is the front side, and the photographer side is the rear side.

It is to be noted that the directions of front, rear, top, bottom, left, and right described below are for convenience of explanation, and the implementation of the present technology is not limited to these directions.

Further, the lens described below encompasses both a lens including a single lens and a lens including a plurality of lenses as a lens group.

<Overall Configuration of Imaging Apparatus>

Figure 1:
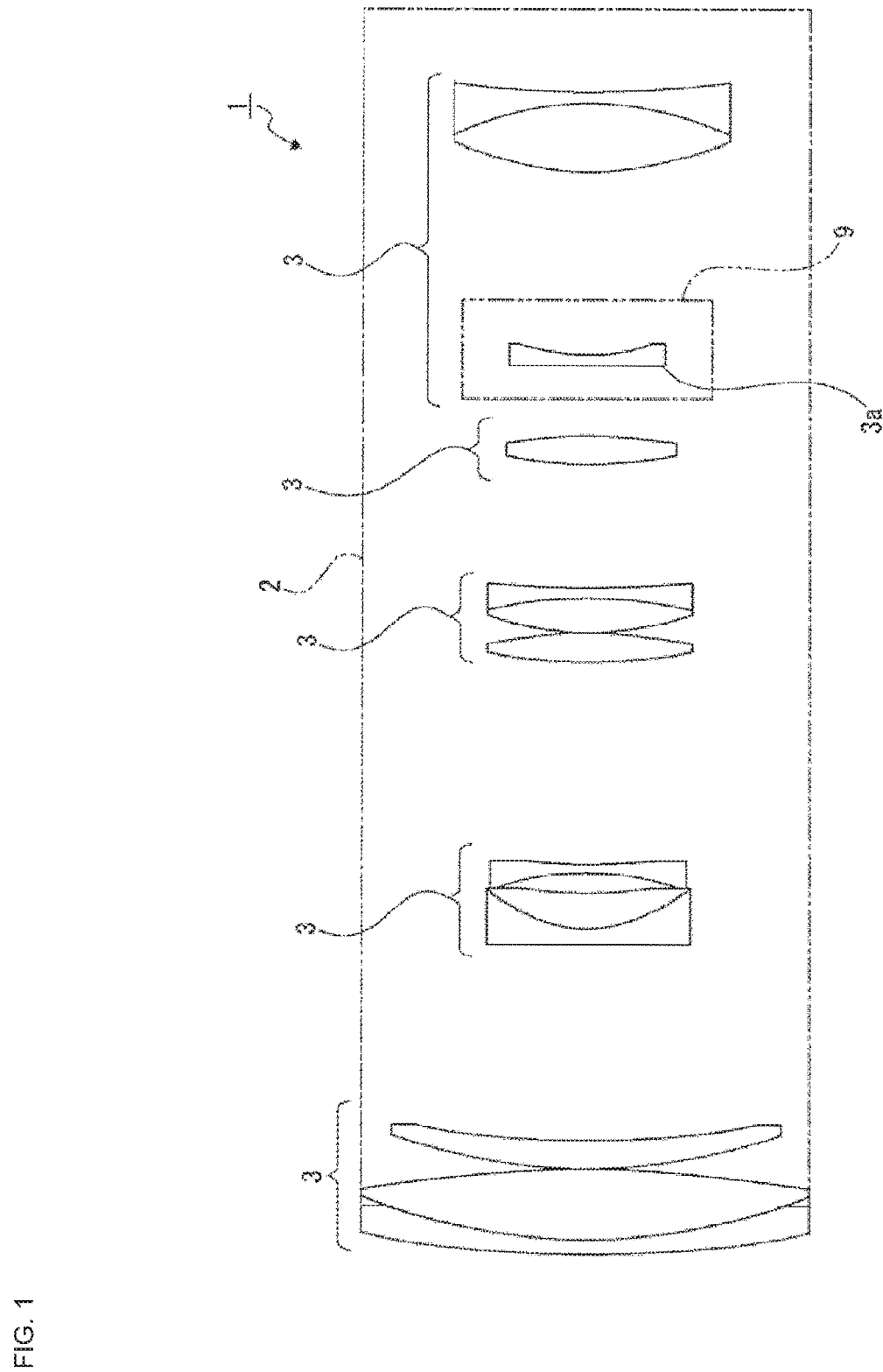
FIG. 1 is a diagram illustrating a configuration of an embodiment of an imaging apparatus including a shake correction device to which the present technology is applied.

An imaging apparatus (interchangeable lens) 1 includes a lens barrel 2 and required parts disposed inside the lens barrel 2 (see FIG. 1). One or more lens groups 3, 3, . . . are so disposed inside the lens barrel 2 as to be movable in an optical axis direction or fixed. The lens group 3 includes a single lens or a plurality of lenses. Other unillustrated optical elements other than the lens groups 3, 3, . . . such as an aperture stop are also disposed inside the lens barrel 2.

The lens group 3 of one of the lens groups 3, 3, . . . or a portion thereof is provided as a shift lens group 3a which is to be moved in a direction perpendicular to the optical axis. It is to be noted that the lens group 3 may include a plurality of sub lens groups each having a single lens or a plurality of lenses. For example, the lens group 3 may include a front group and a rear group. In this case, the sub lens group may be provided as the shift lens group 3a.

The imaging apparatus 1, which is an interchangeable lens, is detachably attachable to an unillustrated apparatus body of a still camera, and is attached to the apparatus body for use. The apparatus body is provided with an operation section such as a power button or a zoom knob, a display section on which a screen is displayed, etc.

It is to be noted that, in the present technology, the imaging apparatus may be configured as a whole by attaching the imaging apparatus 1 to the apparatus body, or only the apparatus body of the type in which the interchangeable lens is not used may be configured as the imaging apparatus. However, in a case where only the apparatus body of the type in which the interchangeable lens is not used is configured as the imaging apparatus, the lens groups 3, 3, . . . are disposed in the apparatus body.

Figure 2:
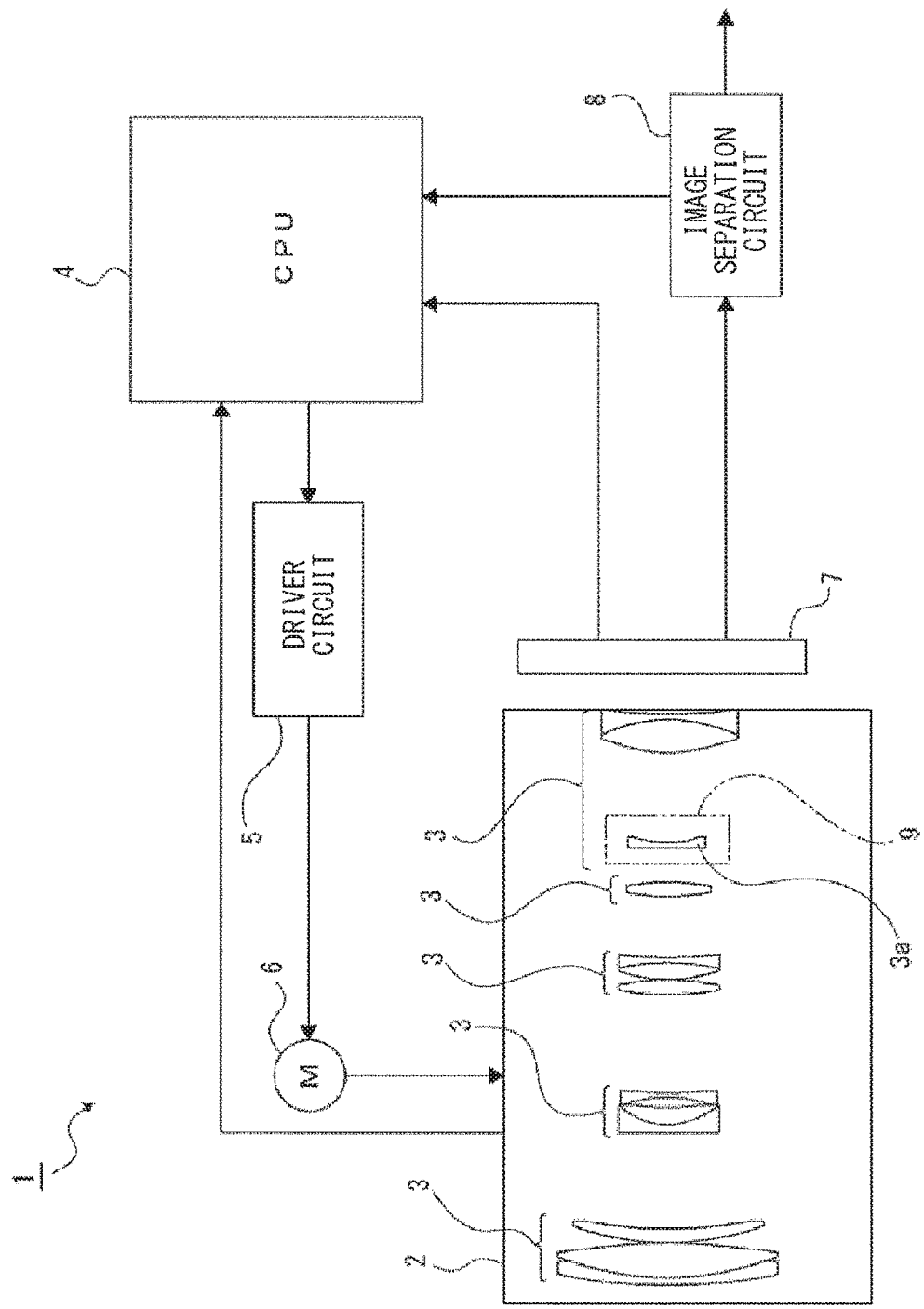
FIG. 2 is a block diagram illustrating an exemplary configuration of the imaging apparatus.

The imaging apparatus 1 includes a CPU (Central Processing Unit) 4, a driver circuit 5, a driving motor 6, an imaging device 7, and an image separation circuit 8 (see FIG. 2).

It is to be noted that the CPU 4, the driver circuit 5, the driving motor 6, the imaging device 7, and the image separation circuit 8 are provided in the apparatus body in the case where the imaging apparatus is configured as a whole by attaching the imaging apparatus 1 to the apparatus body, or in the case where only the apparatus body of the type in which the interchangeable lens is not used is configured as the imaging apparatus.

The CPU 4 controls the imaging apparatus 1 as a whole, and sends an image taken in by the lens groups 3, 3, . . . and subjected to photoelectric conversion by the imaging device 7 to the image separation circuit 8.

The CPU 4 executes various processes on the basis of input of an operation signal from the outside, such as focusing operation. For example, in a case where a focusing operation signal is inputted, a focusing process that causes the driving motor 6 to operate is performed via the driver circuit 5 in accordance with the inputted focusing operation signal.

By the focusing process, the lens group 3 provided as a focus lens group is caused to travel in the optical axis direction. At this time, position information of the focus lens group is fed back by the CPU 4. Thereafter, reference information at a time when the focus lens group is caused to travel through the driving motor 6 is stored. Further, for example, in a case where a zooming operation signal is inputted, the CPU 4 performs a scaling process that causes the driving motor 6 to operate via the driver circuit 5 in accordance with the inputted zooming operation signal.

Further, the CPU 4 sends a drive signal to the driver circuit 5 on the basis of a signal outputted from a position detecting section, which will be described later, directed to correcting a shake. The driver circuit 5 causes a later-described first actuator and a later-described second actuator to operate on the basis of the inputted drive signal. The shake is corrected by the operation of the first actuator and the second actuator.

As the imaging device 7, for example, a photoelectric conversion device such as a CCD (Charge Coupled Device) or a CMOS (Complementary Metal-Oxide Semiconductor) is used.

The image separation circuit 8 sends an image signal to an unillustrated image process circuit. The image process circuit converts the inputted image signal into a signal format suitable for a subsequent process, and performs various processes such as an image display process on the display section, a recording process on a recording medium, or a data transfer process via a communication interface.

A shake correction device 9 that causes the shift lens group 3a to travel is disposed inside the lens barrel 2 (see FIGS. 1 and 2). Therefore, the shake is corrected by causing the shift lens group 3a to travel in the direction perpendicular to the optical axis.

It is to be noted that, in the above description, an example has been described in which the shift lens group 3a is caused to travel in the direction perpendicular to the optical axis by the shake correction device 9 to perform shake correction. However, a configuration may be provided in which the shift lens group 3a is not caused to travel in the direction perpendicular to the optical axis but the imaging device 7 is caused to travel by the shake correction device 9. In this case, the shake is corrected by causing the imaging device 7 to travel in the direction perpendicular to the optical axis.

<Configuration of Shake Correction Device>

A configuration of the shake correction device 9 will be described below (see FIGS. 3 to 16).

Figure 3:
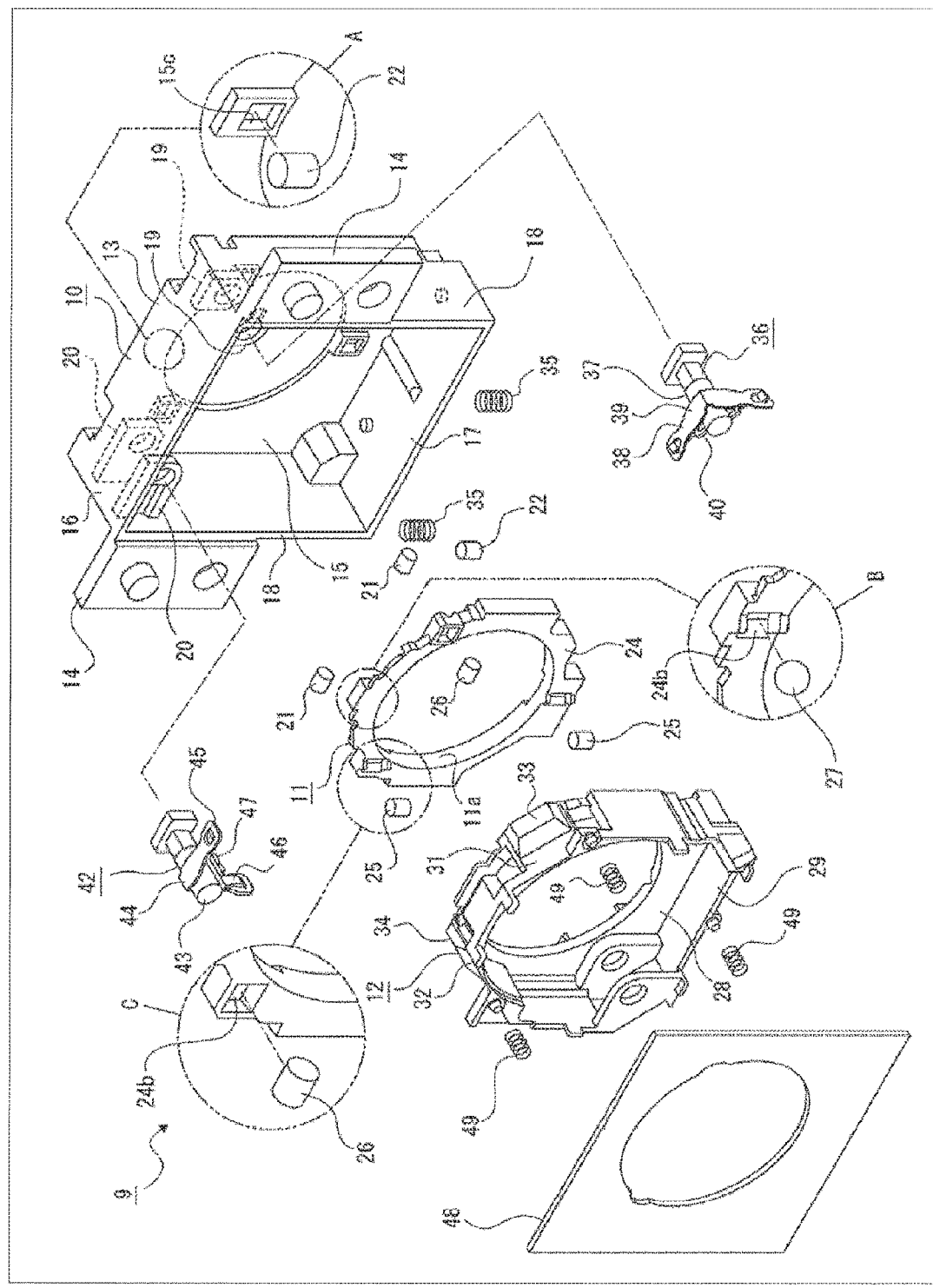
FIG. 3 is an exploded perspective view of a shake correction device.
Figure 4:
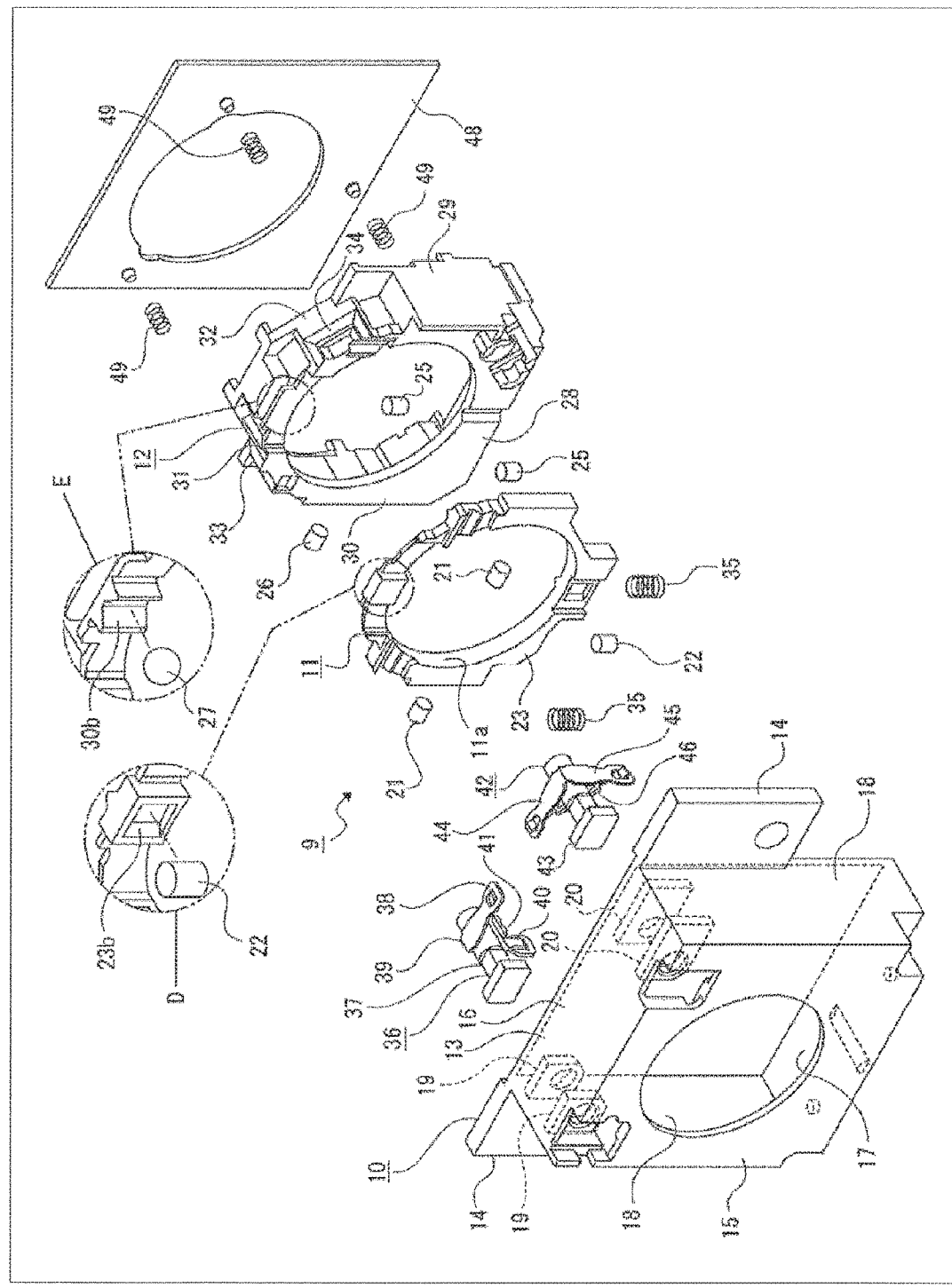
FIG. 4 is an exploded perspective view of the shake correction device.
Figure 5:
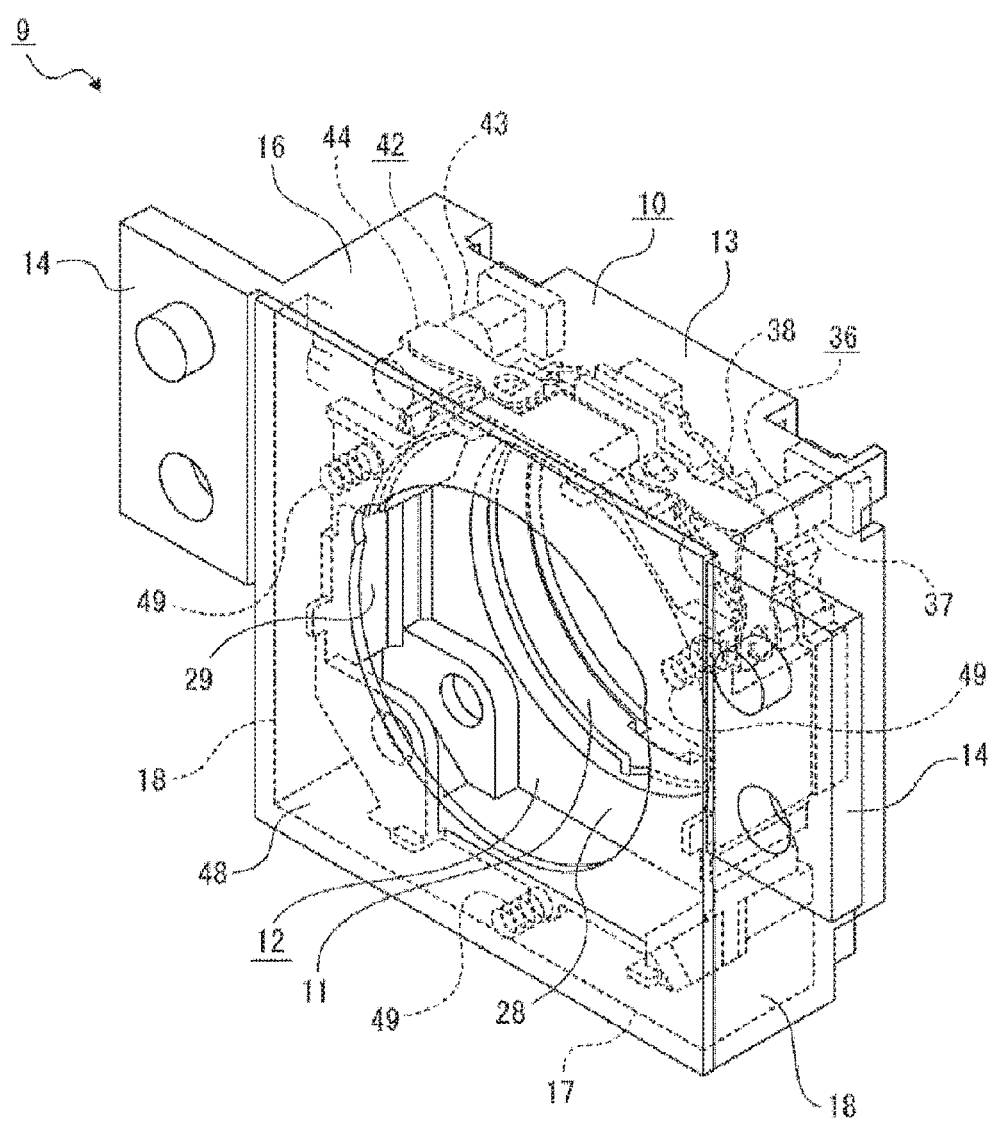
FIG. 5 is a perspective view of the shake correction device.

The shake correction device 9 includes a base body 10, a first movable body 11, and a second movable body 12 (see FIGS. 3 to 5). The base body 10 is disposed in a fixed manner. The first movable body 11 is movable in a right-left direction, which is a first movement direction, with respect to the base body 10. The second movable body 12 is movable in a top-bottom direction, which is a second movement direction, with respect to the first movable body 11.

The base body 10 includes a disposing section 13 and supported projections 14 and 14. The disposed section 13 is formed in a case-shape open to the front. The supported projections 14 and 14 project from the disposing section 13 to right and left.

Figure 6:
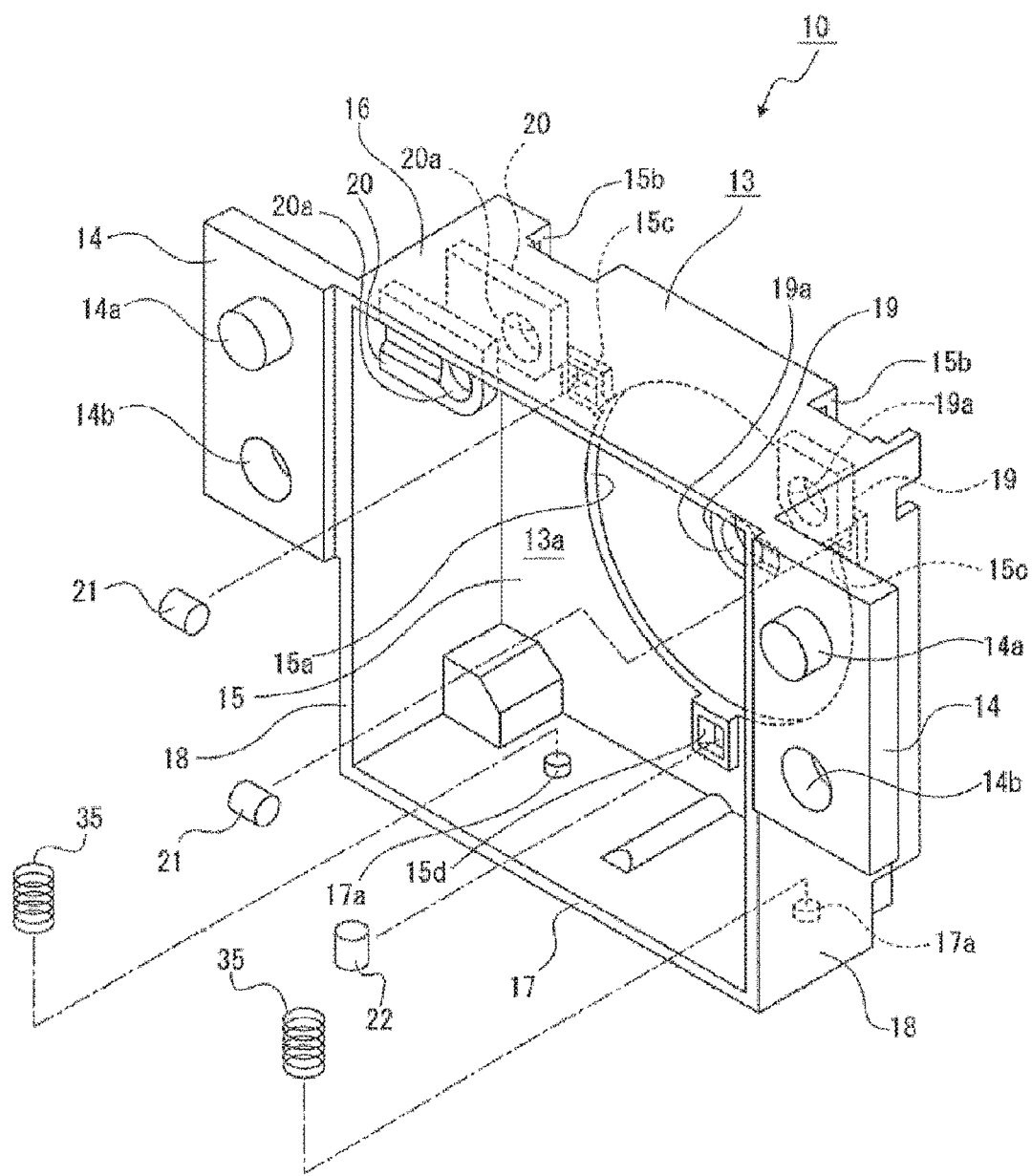

The disposing section 13 includes a base surface portion 15, an upper surface portion 16, a lower surface portion 17, and side surface portions 18 and 18 (see FIG. 6). An inner space of the disposing section 13 is formed as a disposing space 13a. The base surface portion 15 is oriented in the front-rear direction. The upper surface portion 16 projects forward from an upper end of the base surface portion 15. The lower surface portion 17 projects forward from a lower end of the base surface portion 15. The side surface portions 18 project forward from right and left ends of the base surface portion 15.

The base surface portion 15 is formed in a rectangular plate shape. The base surface portion 15 is formed with a circular light passing hole 15a penetrating the base surface portion 15 in the front-rear direction. At right and left ends of the upper ends of the base surface portion 15, disposing holes 15b and 15b penetrating the base surface portion 15 in the front-rear direction are formed.

In the base surface portion 15, disposing recesses 15c and 15c opened forward are formed so as to be spaced apart from each other on the right and left sides of the light passing hole 15a. In the base surface portion 15, a supporting recess 15d opened forward is formed below the light passing hole 15a.

The disposing section 13 is provided with supporting projections 19, 19, 20, and 20. The supporting projections 19 and 19 project inward from a position extending between one of the right and left ends of the upper surface portion 16 and the upper end of one of the side surface portions 18, and are so positioned as to be spaced away from each other in the front-rear direction.

The supporting projection 19 is formed with a supporting hole 19a penetrating the supporting projection 19 in the front-rear direction. The supporting projections 20 and 20 project inward from a position extending between the other of the right and left ends of the upper surface portion 16 and an upper end of the other side surface portion 18, and are so positioned as to be spaced away from each other in the front-rear direction. The supporting projection 20 is formed with a supporting hole 20a penetrating the supporting projection 20 in the front-rear direction.

The lower surface portion 17 is provided with spring supporting projections 17a and 17a projecting upward and spaced away from each other in the right-left direction.

An alignment pin 14a and an insertion hole 14b are positioned in the supported projection 14 and are spaced away from each other in the top-bottom direction. The supported projections 14 and 14 of the base body 10 are attached to the lens barrel 2 or an unillustrated mounting member disposed inside the lens barrel 2. At this time, the base body 10 is aligned with respect to the lens barrel 2 or the mounting member by the alignment pins 14a and 14a, and is attached to the lens barrel 2 or the mounting member by unillustrated mounting screws inserted through the insertion holes 14b and 14b.

The disposing recesses 15c and 15c of the base body 10 are provided with respective first guides 21 and 21. The first guide 21 is formed in a cylindrical shape or a columnar shape, and is disposed on the disposing recess 15c in a state where an axial direction coincides with the right-left direction. The first guide 21 is non-movable relative to the base surface portion 15.

A first rolling member 22 is supported by the supporting recess 15d of the base body 10. The first rolling member 22 is formed in a cylindrical shape or a columnar shape, and is supported by the supporting recess 15d in a state where an axial direction coincides with the top-bottom direction. The first rolling member 22 is rotatable in a direction around the axis with respect to the base body 10.

It is to be noted that the supporting recesses 15d and 15d may be formed above and below the light passing hole 15a in the base body 10, and the first rolling members 22 and 22 may be supported by the respective supporting recesses 15d and 15d (see diagram A enclosed by a two-dot chain line in FIG. 3).

Figure 7:
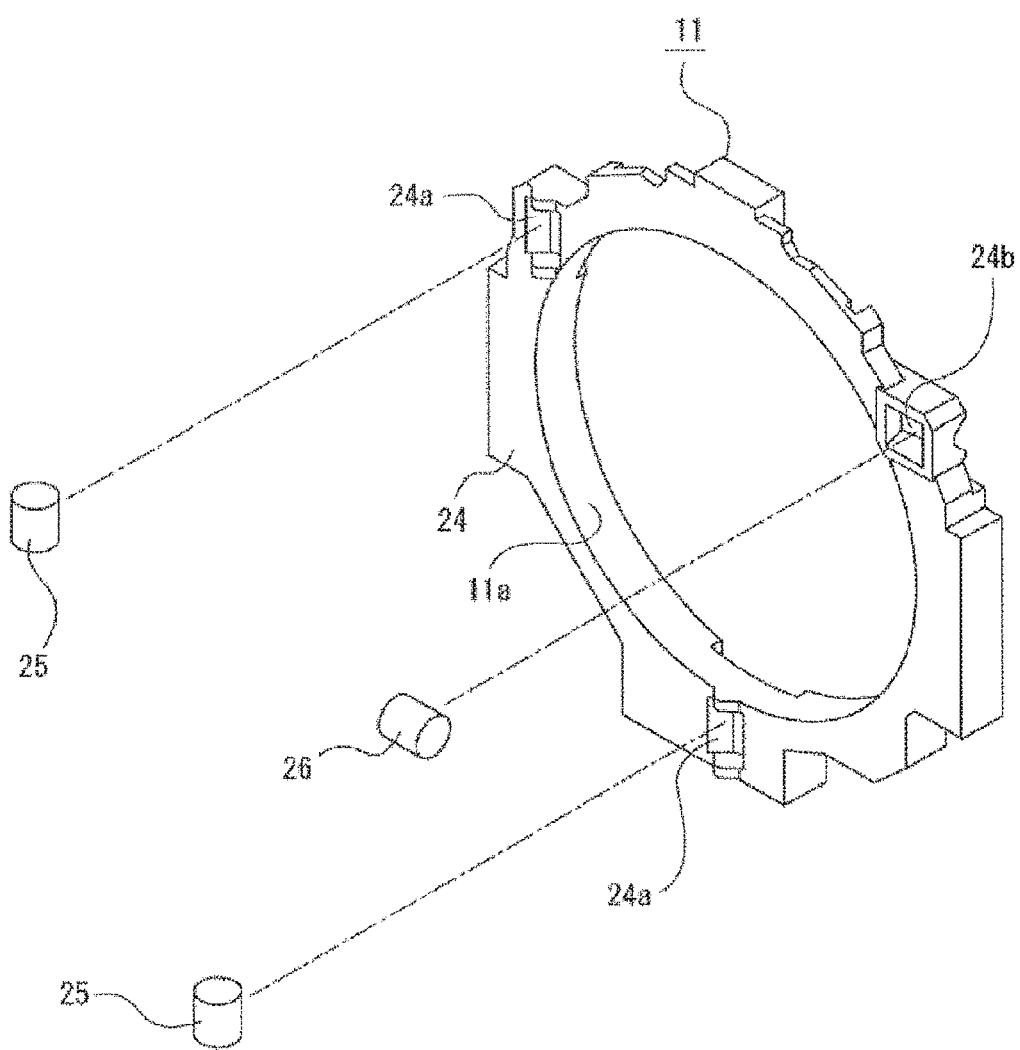
Figure 8:
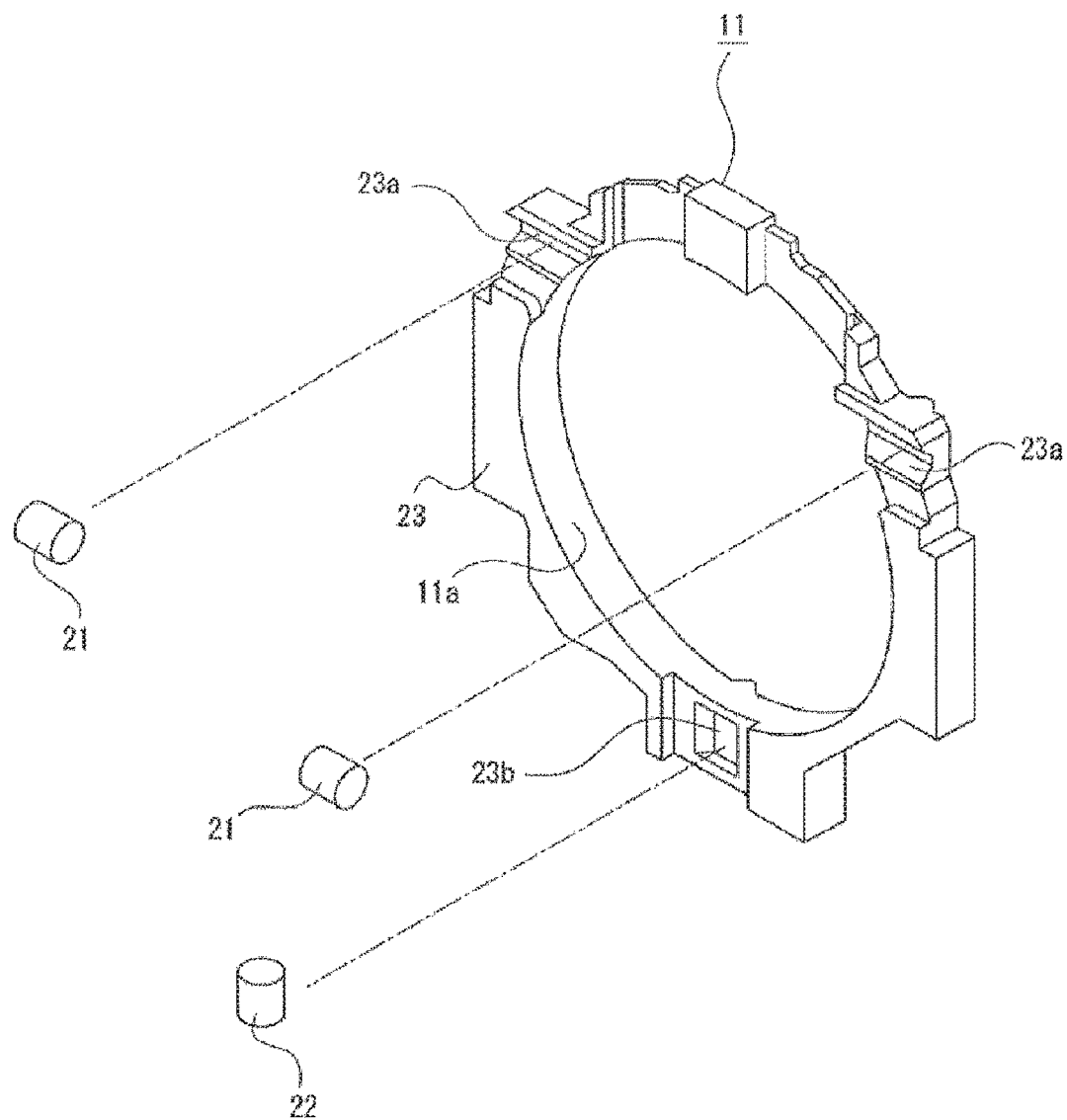
FIG. 8 is a perspective view illustrating the first movable body and the like in a state as viewed from a direction other than that in FIG. 7.

The first movable body 11 is formed in an approximately-annular shape, and an inner space is formed as a transmitting hole 11a (see FIGS. 7 and 8).

In the rear surface 23 of the first movable body 11, guided grooves 23a and 23a opened rearward are formed to be spaced away from each other on the right and left sides of the transmitting hole 11a (see FIG. 8). The guided grooves 23a and 23a are formed in a shape extending in the right-left direction. In the rear surface 23 of the first movable body 11, a supporting recess 23b opened rearward is formed below the transmitting hole 11a.

The front surface 24 of the first movable body 11 is formed with disposing recesses 24a and 24a opened forward. The disposing recesses 24a and 24a are spaced away from each other in circumferential direction of the transmitting hole 11a on the outer side of the transmitting hole 11a (see FIG. 7). In the front surface 24 of the first movable body 11, a supporting recess 24b opened forward is formed on the outer side of the transmitting hole 11a. The disposing recesses 24a and 24a and the supporting recess 24b are formed in order in a circumferential direction and are spaced away from each other.

Figure 9:
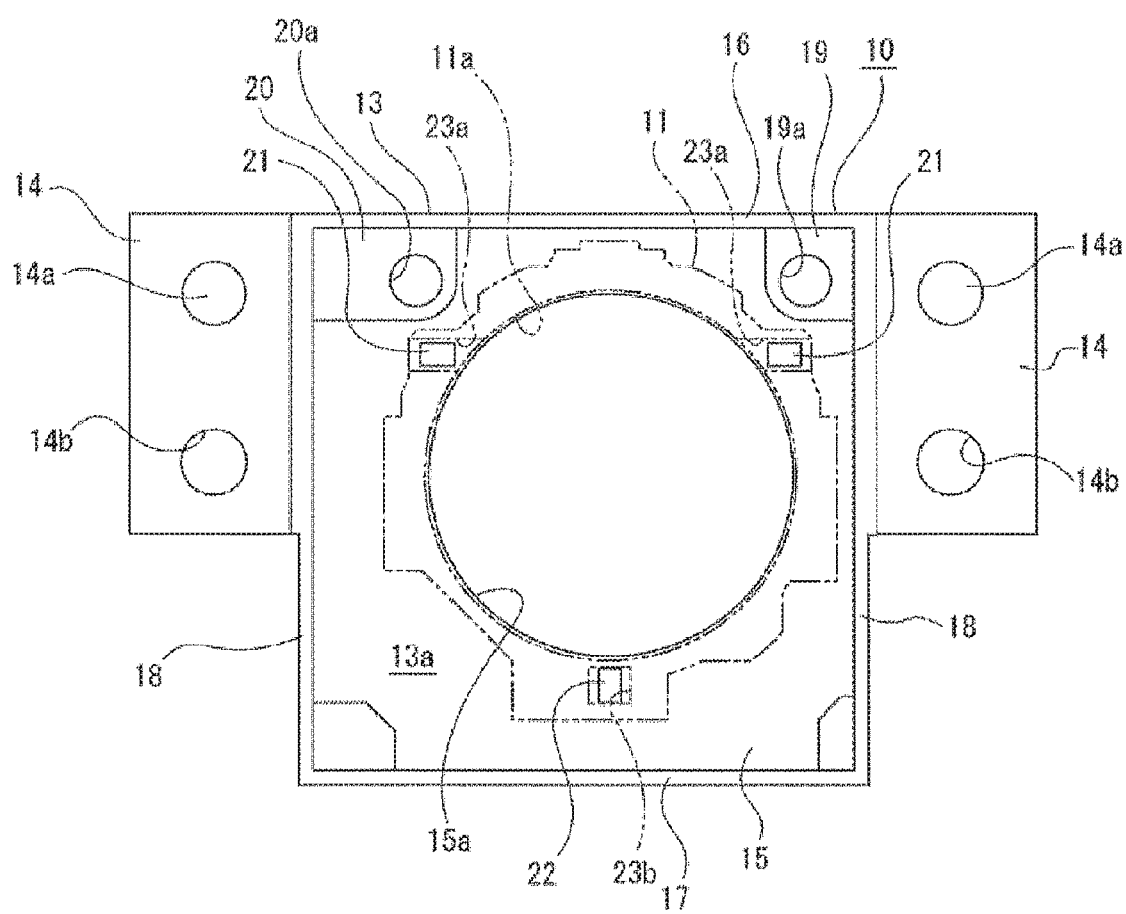
FIG. 9 is a front view illustrating a state in which the first movable body is supported by the base body.

The first guides 21 and 21 are disposed on the guided grooves 23a and 23a of the first movable body 11, respectively (see FIG. 9). The first movable body 11 is movable in the right-left direction (first movement direction) with respect to the base body 10 as a result of the guided grooves 23a and 23a being guided by the first guides 21 and 21, respectively. Accordingly, the first movable body 11 is disposed in the disposing space 13a of the disposing section 13, in a state where the first movable body 11 is supported by the base surface portion 15 of the base body 10 via the first guides 21 and 21.

The first rolling member 22 is supported by the supporting recess 23b of the first movable body 11. The first rolling member 22 is rolled between the base body 10 and the first movable body 11, whereby the first movable body 11 is smoothly moved with respect to the base body 10 in the right-left direction.

It is to be noted that the supporting recesses 23b and 23b may be formed above and below the transmitting hole 11a in the first movable body 11, and the first rolling members 22 and 22 may be supported by the supporting recesses 23b and 23b, respectively (see diagram D enclosed by a two-dot chain line in FIG. 4).

Second guides 25 and 25 are disposed in the disposing recesses 24a and 24a of the first movable body 11, respectively (see FIG. 7). The second guide 25 is formed in a cylindrical shape or a columnar shape. The second guide 25 is disposed on the disposing recess 24a in a state where the axial direction coincides with the top-bottom direction. The second guide 25 is non-movable relative to the first movable body 11.

A second rolling member 26 is supported by the supporting recess 24b of the first movable body 11. The second rolling member 26 is formed in a cylindrical shape or a columnar shape. The second rolling member 26 is supported by the supporting recess 24b in a state where the axial direction coincides with the right-left direction. The second rolling member 26 is rotatable in a direction around the axis with respect to the first movable body 11.

It is to be noted that the supporting recesses 24b and 24b may be formed around the transmitting hole 11a in the first movable body 11, and the second rolling members 26 and 27 may be supported by the supporting recesses 24b and 24b, respectively (see diagram B and diagram C enclosed by two-dot chain lines in FIG. 3). The second rolling member 26 is formed in a cylindrical shape or a columnar shape. The second rolling member 26 is supported by the supporting recess 24b in a state where the axial direction coincides with the right-left direction. The second rolling member 26 is rotatable in a direction around the axis with respect to the first movable body 11.

The second rolling member 27 is formed, for example, in a spherical shape. The second rolling member 27 is rotatable in the same direction as that of the second rolling member 26 along the shape of the supporting recess 24b with respect to the first movable body 11. In addition, the second rolling members 26 and 26 may be supported by both of the supporting recesses 24b and 24b, respectively, and the second rolling members 27 and 27 may be supported by both of the supporting recesses 24b and 24b, respectively.

Figure 10:
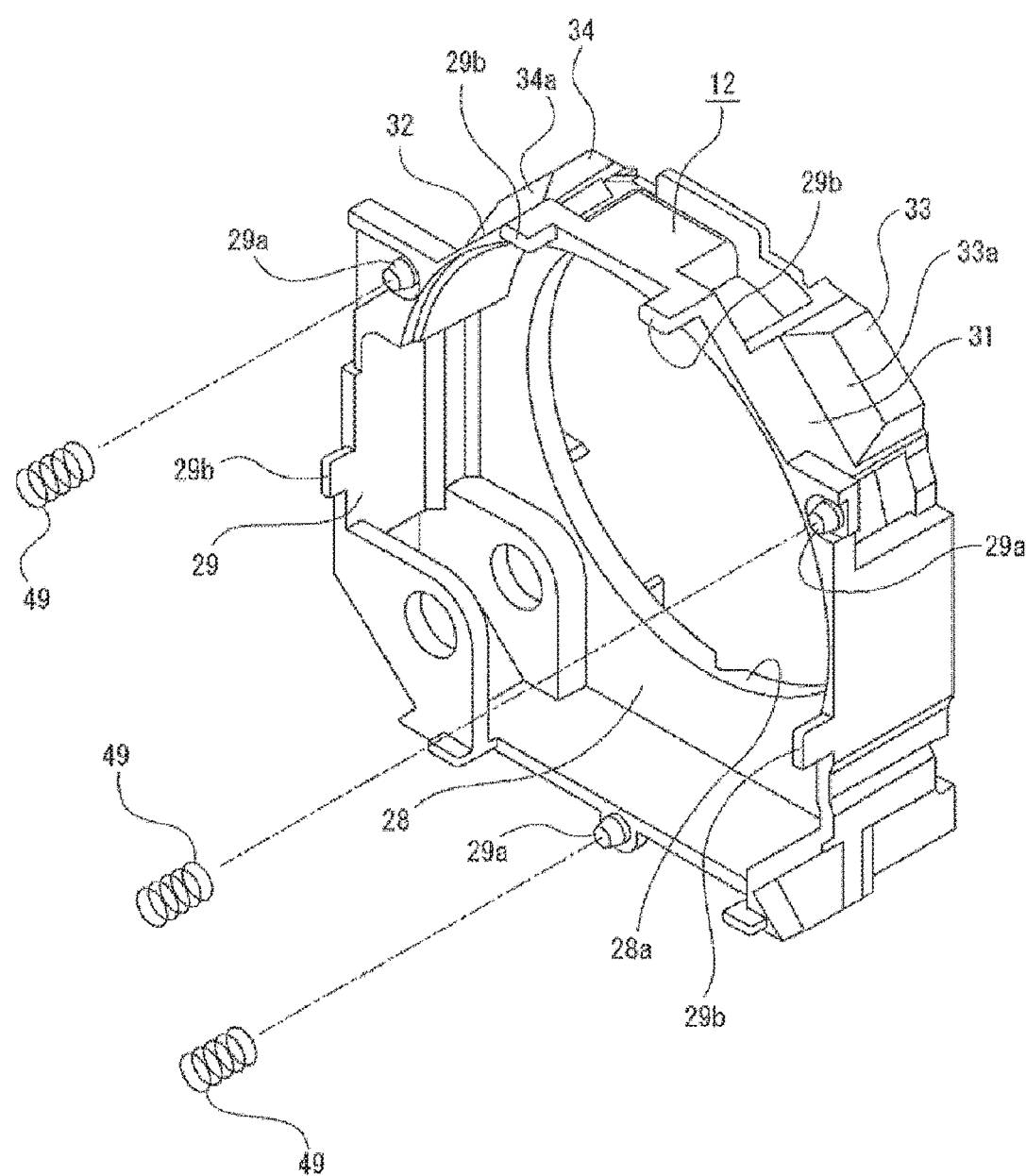
Figure 11:
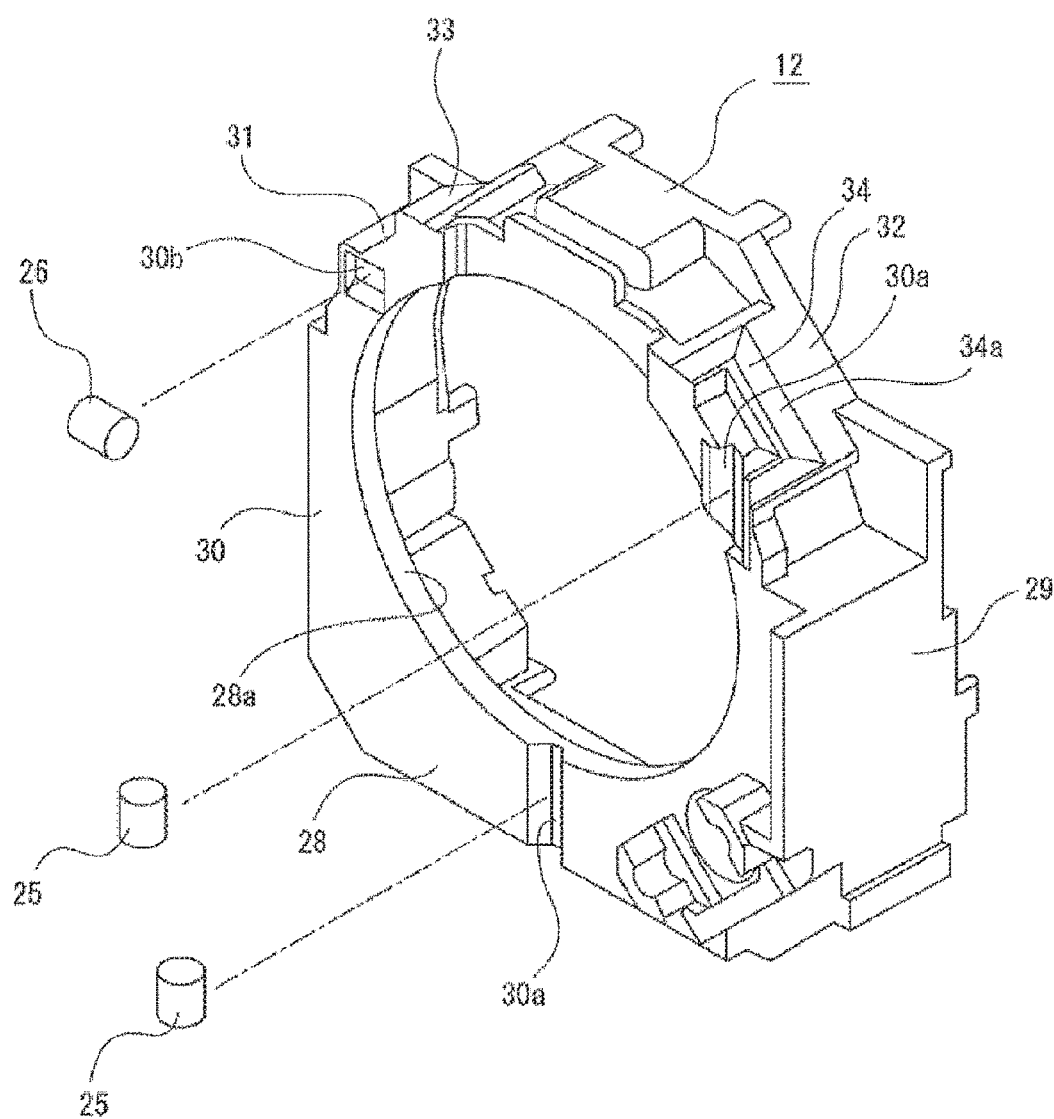
FIG. 11 is a perspective view illustrating the second movable body and the like in a state as viewed from a direction other than that in FIG. 10.

The second movable body 12 has an annularly-formed base surface portion 28 and a peripheral surface portion 29 projecting forward from an outer periphery of the base surface portion 28 (see FIGS. 10 and 11). The outer shape of the second movable body 12 is larger than the outer shape of the first movable body 11. The inner space of the base surface portion 28 is formed as a through hole 28a.

The shift lens group 3a is held in the second movable body 12 in a state where the shift lens group 3a covers the through hole 28a. The imaging light taken in by the lens groups 3, 3, . . . including the shift lens group 3a enters the imaging device 7. At this time, the imaging light is caused to pass through the through hole 28a of the second movable body 12, the transmitting hole 11a of the first movable body 11, and the light passing hole 15a of the base body 10 in order, and enters the imaging device 7.

In the rear surface 30 of the base surface portion 28, guided grooves 30a and 30a opened rearward are formed in a circumferential direction of the through hole 28a on the outer side of the through hole 28a, and are spaced away from each other (see FIG. 11) The guided grooves 30a and 30a are formed in a shape extending in the top-bottom direction. A supporting recess 30b opened rearward is formed in the rear surface 30 of the base surface portion 28 on the outer side of the through hole 28a.

The right and left ends of the peripheral surface portion 29 in a portion near the upper end are provided as sloped surface portions 31 and 32, respectively (see FIGS. 10 and 11). The sloped surface portions 31 and 32 are so sloped as to be shifted downward in a direction in which the sloped surface portions 31 and 32 are spaced away from each other in the right-left direction.

Receiving projections 33 and 34 are provided in the peripheral surface portion 29. The receiving projections 33 and 34 project from the outer surfaces of the sloped surface portions 31 and 32. A first working target surface 33a is formed in the receiving projection 33, and a second working target surface 34a is formed in the receiving projection 34.

The first working target surface 33a positioned on the left side is so sloped as to face diagonally upward to the left and diagonally upward to the front. The second working target surface 34a positioned on the right side is so sloped as to face diagonally upward to the right and diagonally upward to the front. The first working target surface 33a and the second working target surface 34a have the same slope angle in the right-left direction and the top-bottom direction with respect to a horizontal plane.

Spring supporting projections 29a, 29a, and 29a projecting forward are provided at the front end of the peripheral surface portion 29 and are spaced away from each other in a circumferential direction. Stopper projections 29b, 29b, . . . projecting forward are so provided at the front end of the peripheral surface portion 29 as to be separated away from each other in the circumferential direction.

Figure 12:
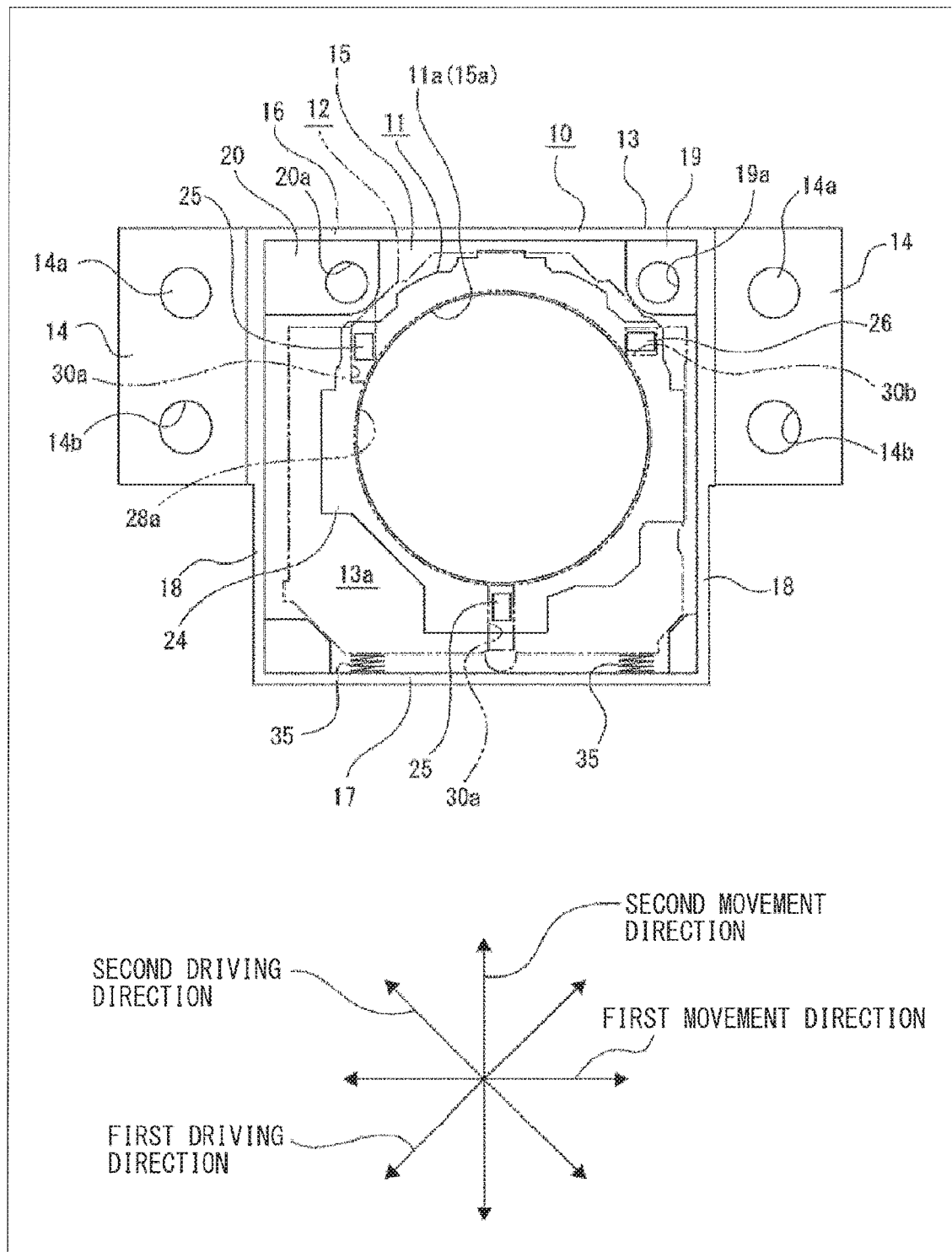
FIG. 12 is a front view illustrating a state in which the first movable body is supported by the base body and the second movable body is supported by the first movable body.

Second guides 25 and 25 are disposed at the guided grooves 30a and 30a of the second movable body 12, respectively (see FIG. 12). The second movable body 12 is movable in the top-bottom direction (second movement direction) with respect to the first movable body 11 as a result of the guided grooves 30a and 30a being guided by the second guides 25 and 25, respectively. Accordingly, the second movable body 12 is supported by the first movable body 11 via the second guides 25 and 25, and is disposed in the disposing space 13a of the disposing section 13.

The second rolling member 26 is supported by the supporting recess 30b of the second movable body 12. The second rolling member 26 is rolled between the first movable body 11 and the second movable body 12. Thereby, the second movable body 12 is smoothly moved in the top-bottom direction with respect to the first movable body 11 with less friction when the second movable body 12 is moved with respect to the first movable body 11.

The second movable body 12 is moved in the top-bottom direction with respect to the first movable body 11. The first movable body 11 is moved in the right-left direction with respect to the base body 10. Therefore, the second movable body 12 supported by the first movable body 11 is moved in the right-left direction with respect to the base body 10 together with the first movable body 11. It is to be noted that supporting recesses 30b and 30b may be formed around the through hole 28a in the second movable body 12, and the second rolling members 26 and 27 may be supported by the supporting recesses 30b and 30b, respectively (see a diagram E surrounded by a two-dot chain line in FIG. 4).

As described above, the shake correction device 9 is provided with the first guides 21 and 21 that guide the first movable body 11 in the first movement direction, and the second guides 25 and 25 that guides the second movable body 12 in the second movement direction.

Accordingly, since the first movable body 11 is guided with respect to the base body 10 by the first guides 21 and 21 and the second movable body 12 is guided with respect to the first movable body 11 by the second guides 25 and 25, it is possible to reliably move the first movable body 11 and the second movable body 12 in the first movement direction and the second movement direction, respectively.

Figure 13:
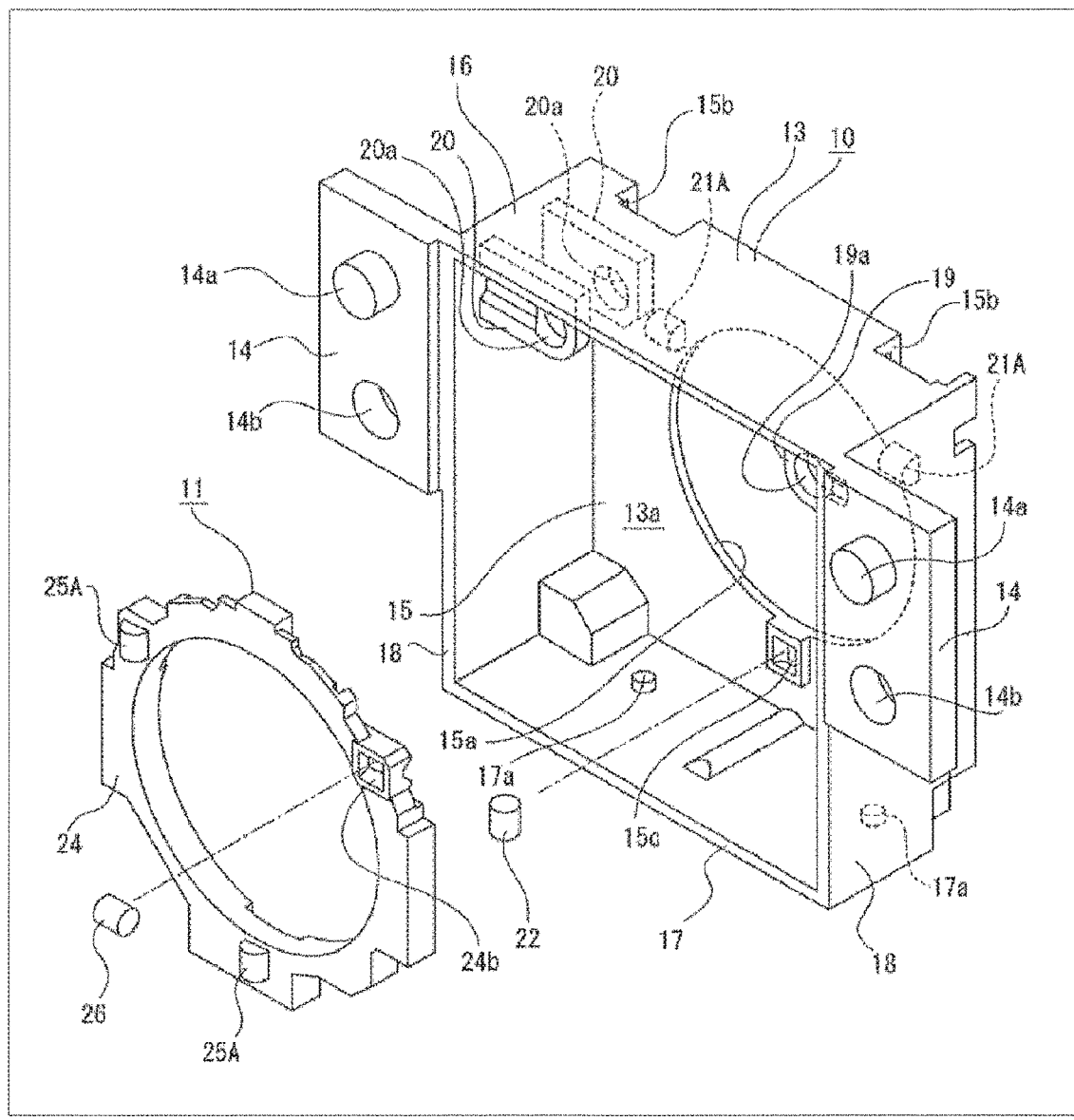
FIG. 13 is an exploded perspective view illustrating an example in which a guide is integrally formed on the base body and the first movable body.

It is to be noted that, although the example has been described above in which the first guides 21 and 21 are provided as a separate member from the base body 10, and the second guides 25 and 25 are provided as a separate member from the first movable body 11, the first guides 21 and 21 may be formed integrally with the base body 10 as first guides 21A and 21A, and the second guides 25 and 25 may be formed integrally with the first movable body 11 as second guides 25A and 25A (see FIG. 13).

Forming the first guides 21 and 21 integrally with the base body 10 as the first guides 21A and 21 A and forming the second guides 25 and 25 integrally with the first movable body 11 as the second guides 25A and 25A make it unnecessary to form the first guides 21 and 21 and the second guides 25 and 25 as separate members from the base body 10. They also make it possible to surely move the first movable body 11 and the second movable body 12 in the first movement direction and the second movement direction, respectively, while reducing the number of components.

It is to be noted that, instead of the first guides 21 and 21 and the second guides 25 and 25, a first guided member which is non-movable with respect to the first movable body 11 may be provided between the base body 10 and the first movable body 11, and a second guided member which is non-movable with respect to the second movable body 12 may be provided between the first movable body 11 and the second movable body 12.

In this case, a configuration may be provided in which a first guide groove is formed in the base body 10, a second guide groove is formed in the first movable body 11, the first movable body 11 is guided via the first guided member by the first guide groove, and the second movable body 12 is guided via the second guided member by the second guide groove.

Further, in this case, the first guided member may be integrally formed with the first movable body 11, and the second guided member may be integrally formed with the second movable body 12.

Further, the first rolling member 22 is disposed between the base body 10 and the first movable body 11 and the second rolling member 26 is disposed between the first movable body 11 and the second movable body 12. The first rolling member 22 is rolled when the first movable body 11 is moved in the first movement direction. The second rolling member 26 is rolled when the second movable body 12 is moved in the second movement direction.

Accordingly, since the first rolling member 22 is rolled when the first movable body 11 is moved in the first movement direction and the second rolling member 26 is rolled when the second movable body 12 is moved in the second movement direction, it is possible to move the first movable body 11 and the second movable body 12 smoothly in the first movement direction and the second movement direction, respectively.

Pressing springs 35 and 35 are disposed between the lower surface of the peripheral surface portion 29 in the second movable body 12 and the upper surface of the lower surface portion 17 in the base body 10 (see FIGS. 6 and 12). The pressing springs 35 and 35 serve as biasing portions. The pressing springs 35 and 35 are, for example, compression-coil springs. The lower ends of the pressing springs 35 and 35 are supported by spring supporting projections 17a and 17a of the base body 10. The second movable body 12 is biased upward by the pressing springs 35 and 35. It is to be noted that a single pressing spring 35 may be provided.

Figure 14:
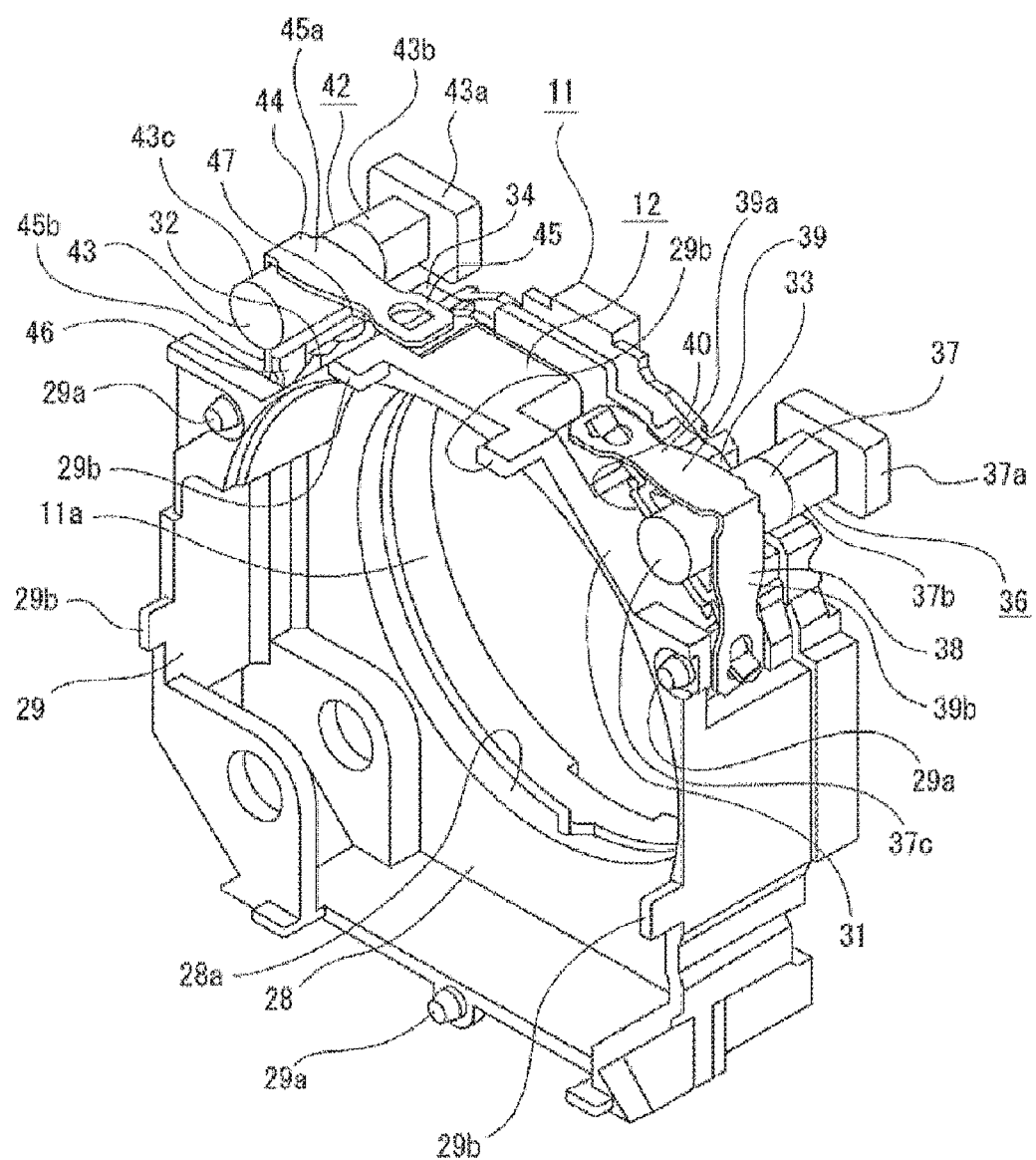
FIG. 14 is a perspective view illustrating the first movable body, the second movable body, and a driving body.
Figure 15:
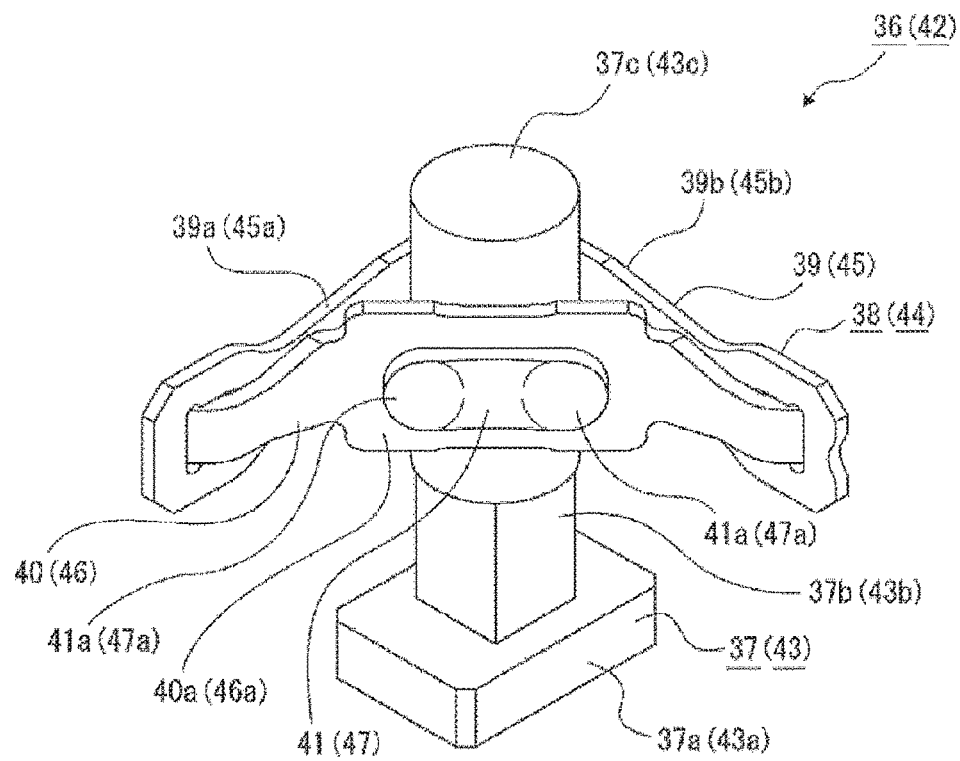
FIG. 15 is a perspective view illustrating the driving body.
Figure 16:
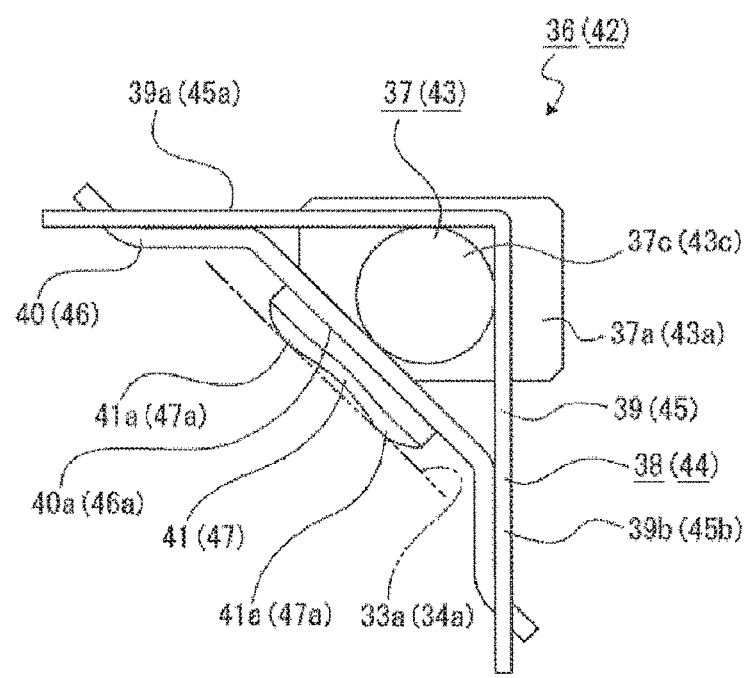
FIG. 16 is a front view illustrating the driving body.
Figure 17:
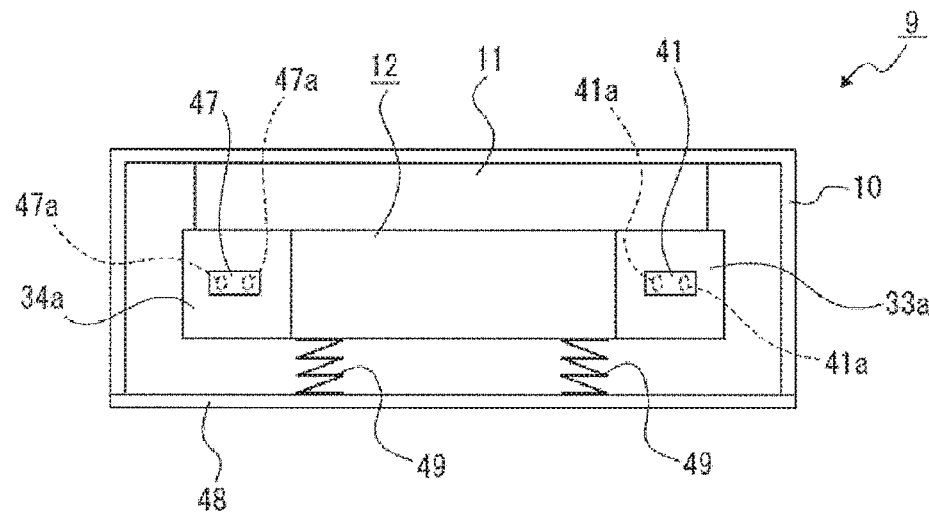
FIG. 17 is a schematic plan view illustrating a state in which the first movable body and the second movable body are in respective reference positions.

A first driving body 36 is attached to the supporting projections 19 and 19 of the base body 10 (see FIGS. 3 and 14). The first driving body 36 includes a first actuator 37 and a first slider 38 (see FIGS. 15 and 16).

The first actuator 37 is, for example, an actuator using a piezoelectric device. The first actuator 37 includes a fixed portion 37a, a piezoelectric device 37b, and a driving shaft 37c. The piezoelectric device 37b projects forward from the fixed portion 37a. The driving shaft 37c is continuously provided on the front side of the piezoelectric device 37b. The piezoelectric device 37b and the driving shaft 37c are disposed in a state extending in the front-rear direction.

In a state where the fixed portion 37a of the first actuator 37 is so disposed at the disposing hole 15b of the base surface portion 15 as to be fixed to the base body 10, the driving shaft 37c of the first actuator 37 is so supported by the supporting holes 19a and 19a of the supporting projections 19 and 19 as to be movable in the front-rear direction. When the piezoelectric device 37b is applied with a voltage in the first actuator 37, the piezoelectric device 37b is expanded or contracted, and the driving shaft 37c is moved in the front-rear direction.

The first slider 38 includes a base member 39 bent at a right angle and a linking member 40 coupled to a base member 39 in a longitudinal direction. Both ends of the linking member 40 in the longitudinal direction are coupled to both ends of the base member 39 in the longitudinal direction.

One side of a bent portion of the base member 39 is provided as a first portion 39a and the other side of the bent portion of the base member 39 is provided as a second portion 39b. The linking member 40 is provided as a flat-plate-shaped contact surface portion 40a at a portion other than both ends in the longitudinal direction.

The first slider 38 has an elastic force in a directions in which the base member 39 and the linking member 40 approach each other. The driving shaft 37c of the first actuator 37 is inserted between the base member 39 and the linking member 40. The first portion 39a of the base member 39, the second portion 39b of the base member 39, and the contact surface portion 40a of the linking member 40 are pressed against the driving shaft 37c.

A transmitting member 41 is attached to a surface, of the contact surface portion 40a, opposite to a surface, of the contact surface portion 40a in contact with the driving shaft 37c. Projecting first driving force transmitting sections 41a and 41a are provided on opposite side of contact surface portion 40a on the transmitting member 41. The first driving force transmitting sections 41a and 41a are spaced away from each other in the longitudinal direction of the linking member 40. Outer surfaces of the respective first driving force transmitting sections 41a and 41a are formed to have a curved surface with a gentle projection shape.

The first driving body 36 is positioned at the upper left corner of the disposing section 13 of the base body 10. The first driving force transmitting sections 41a and 41a of the transmitting member 41 are in contact with the first working target surface 33a of the receiving projection 33 of the second movable body 12 in a state where the first driving force transmitting sections 41a and 41a are slidable (see FIG. 16). The transmitting member 41 is in contact with the first working target surface 33a diagonally from the upper left.

At this time, since the second movable body 12 is biased by the pressing springs 35 and 35. The first working target surface 33a is therefore pressed against the first driving force transmitting sections 41a and 41a of the transmitting member 41.

A second driving body 42 is attached to the supporting projections 20 and 20 of the base body 10 (see FIGS. 3 and 14). The second driving body 42 is composed of a second actuator 43 and a second slider 44 (see FIGS. 15 and 16).

The second actuator 43 is, for example, an actuator using a piezoelectric device. The second actuator 43 includes a fixed portion 43a, a piezoelectric device 43b, and a driving shaft 43c. The piezoelectric device 43b projects forward from the fixed portion 43a. The driving shaft 43c is continuously provided on the front side of the piezoelectric device 43b. The piezoelectric device 43b and the driving shaft 43c are disposed in a state extending in the front-rear direction.

In a state where the fixed portion 43a of the second actuator 43 is so disposed at the disposing hole 15b of the base surface portion 15 as to be fixed to the base body 10, the driving shaft 43c of the second actuator 43 is so supported by the supporting holes 20a and 20a of the supporting projections 20 and 20 as to be movable in the front-rear direction. When a voltage is applied to the piezoelectric device 43b in the second actuator 43, the piezoelectric device 43b is expanded or contracted, and the driving shaft 43c is moved in the front-rear direction.

The second slider 44 includes a base member 45 bent at a right angle and a linking member 46 coupled to the base member 45 in a longitudinal direction. Both ends of the linking member 46 in the longitudinal direction are coupled to both ends of the base member 45 in the longitudinal direction.

One side of a bent portion of the base member 45 is provided as a first portion 45a and the other side of the bent portion of the base member 45 is provided as a second portion 45b. The linking member 46 is provided as a flat-plate-shaped contact surface portion 46a at a portion other than both ends in the longitudinal direction.

The second slider 44 has an elastic force in a direction in which the base member 45 and the linking member 46 approach each other. The driving shaft 43c of the second actuator 43 is inserted between the base member 45 and the linking member 46. The first portion 45a of the base member 45, the second portion 45b of the base member 45, and the contact surface portion 46a of the linking member 46 are pressed against the driving shaft 43c.

A transmitting member 47 is attached to a surface, of the contact surface portion 46a, opposite to a surface, of the contact surface portion 46a in contact with the driving shaft 43c. Projecting second driving force transmitting sections 47a and 47a are provided on opposite side of contact surface portion 46a on the transmitting member 47. The second driving force transmitting sections 47a and 47a are spaced away from each other in the longitudinal direction of the linking member 46. Outer surfaces of the respective second driving force transmitting sections 47a and 47a are formed to have a curved surface with a gentle projection shape.

The second driving body 42 is positioned at the upper right corner of the disposing section 13 of the base body 10. The second driving force transmitting sections 47a and 47a of the transmitting member 47 are in contact with the second working target surface 34a of the receiving projection 34 of the second movable body 12 in a state where the second driving force transmitting sections 47a and 47a are slidable (see FIG. 16). The transmitting member 47 is in contact with the second working target surface 34a diagonally from the upper right.

At this time, since the second movable body 12 is biased upward by the pressing springs 35 and 35. The second working target surface 34a is therefore pressed against the second driving force transmitting sections 47a and 47a of the transmitting member 41.

As described above, in the first driving body 36, the transmitting member 41 is in contact with the first working target surface 33a of the second movable body 12 obliquely from the upper left. A driving force is applied to the second movable body 12 from the first driving body 36 obliquely to the lower right or the upper left. This direction is the first driving direction.

Further, in the second driving body 42, the transmitting member 47 is in contact with the second working target surface 34a of the second movable body 12 obliquely from the upper right. A driving force is applied to the second movable body 12 from the second driving body 42 obliquely to the lower left or the upper right. This direction is set as the second driving direction.

The first driving direction and the second driving direction are perpendicular to each other. The first driving direction and the second driving direction are different by 45 degrees from the first movement direction of the first movable body 11 and the second movement direction of the second movable body 12, respectively (see FIG. 12).

It is to be noted that, although an example of the first driving body 36 and the second driving body 42 respectively having the piezoelectric devices 37b and 43b have been described above, the first driving body and the second driving body may each be, for example, an electromagnetic actuator that generates a driving force by a coil and a magnet, or an electric actuator that generates a driving force by rotation of a lead screw.

The cover body 48 is attached to the disposing section 13 of the base body 10 from the front side in a state where the first movable body 11, the second movable body 12, the first driving body 36, and the second driving body 42 are disposed in the disposing space 13a, and the first movable body 11, the base body 12, the first driving body 36, and the second driving body 42 are closed by the cover 48 (see FIGS. 3 to 5). The cover 48 is formed with a passing hole 48a penetrating in the front-rear direction.

Biasing springs 49, 49, and 49 are disposed between the front surface of the peripheral surface portion 29 and the rear surface of the cover 48 in the second movable body 12 (see FIGS. 5 and 10). The biasing springs 49, 49, and 49 are each, for example, a compression coil spring, and rear ends thereof are supported by the spring supporting projections 29a, 29a, and 29a of the second movable body 12. The second movable body 12 is biased rearward by the biasing springs 49, 49, and 49, and the first movable body 11 is also biased rearward by the second movable body 12 being biased rearward.

Accordingly, the second movable body 12 is pressed against the second guides 25 and 25 and the second rolling member 26. The second guides 25 and 25 and the second rolling member 26 are pressed against the first movable body 11. The first movable body 11 is pressed against the first guides 21 and 21 and the first rolling member 22. The first guides 21 and 21 and the first rolling member 22 are pressed against the base surface portion 15 of the base body 10.

It is to be noted that, in the shake correction device 9, since the base body 10 is provided with the stopper projections 29b, 29b, . . . projecting forward, when a large impact is applied to the imaging apparatus 1 by dropping or the like, the stopper projections 29b, 29b, . . . come into contact with the rear surface of the cover 48, and excessive forward movement of the second movable body 12 and the first movable body 11 is prevented.

As described above, since the first actuator 37 and the second actuator 43 are attached to the base body 10 supporting the first movable body 11, a dedicated member for attaching the first actuator 37 and the second actuator 43 is not required. This makes it possible to simplify the structure of the shake correction device 9.

Further, the base body 10 is provided with the approximately-rectangular disposing section 13 on which the first movable body 11 and the second movable body 12 are disposed. The first driving body 36 and the second driving body 42 are attached to the corners of the disposing section 13 on the outer sides of the first movable body 11 and the second movable body 12, respectively.

Therefore, since the first driving body 36 and the second driving body 42 are disposed at a portion, of the disposing section 13, near the outer periphery, it is possible to reduce the size of the shake correction device 9 by effectively utilizing the spaces.

It is to be noted that the first driving body 36 and the second driving body 42 may be attached to portions other than the corners of the disposing section 13.

Further, since the outer shape of the first movable body 11 is made smaller than the outer shape of the second movable body 12, it is possible to dispose the first movable body 11 and the second movable body 12 in a state where the first movable body 11 does not project outward compared to the second movable body 12. It is therefore possible to further reduce the size of the shake correction device 9.

In particular, the first movable body 11 is movable only in the right-left direction with respect to the base body 10. The first movable body 11 has a function of regulating the rotation of the shift lens group 3a held by the second movable body 12 and the second movable body 12 in the direction around the optical axis. By positioning the first movable body 11 regulating the rotation on inner side of the second movable body 12, it is possible to reduce the size of the imaging apparatus 1 in the radial direction of the lens barrel 2 and to simplify the structure of the imaging apparatus 1.

Furthermore, since the disposing space 13a in which the first movable body 11, the second movable body 12, the first driving body 36, and the second driving body 42 are disposed is formed in the base body 10, the first movable body 11, the second movable body 12, the first driving body 36, and the second driving body 42 are disposed in the same space formed in the base body 10. It is therefore possible to further reduce the size of the shake correction device 9 by effectively utilizing the disposing space.

<Operation of Shake Correction Device>

Hereinafter, the shake correction operation in the shake correction device 9 will be described (see FIGS. 17 to 26). It is to be noted that, in FIGS. 17 to 26, each part is illustrated in a simplified manner in order to facilitate understanding of the shake correction operation.

It is to be noted that, in the shake correction device 9, the first movable body 11 is movable with respect to the base body 10 only in the right-left direction (first movement direction) by the first guides 21 and 21, and the second movable body 12 is movable with respect to the first movable body 11 only in the top-bottom direction (second movement direction) by the second guides 25 and 25.

Therefore, in the shake correction operation described below, a so-called rolling operation does not occur. The rolling operation is an operation in which the first movable body 11 and the second movable body 12 operate with respect to the base body 10 in the rotation direction in the direction around the optical axis. In addition, since the first movable body 11 and the second movable body 12 are biased rearward by the biasing springs 49, 49, . . . , the first movable body 11 and the second movable body 12 are not moved in the front-rear direction in the shake correction operation.

The first driving body 36 and the second driving body 42 are not operated in a state before the shake correction operation is performed. In the first driving body 36, the first driving force transmitting sections 41a and 41a of the transmission member 41 are in contact with the middle portion in the front-rear direction of the first working target surface 33a formed on the receiving protrusion 33 of the second movable body 12. In the second driving body 42, the second driving force transmitting sections 47a and 47a of the transmission member 47 are in contact with the middle portion in the front-rear direction of the second working target surface 34a formed on the receiving protrusion 34 of the second movable body 12 (see FIG. 17).

Figure 18:
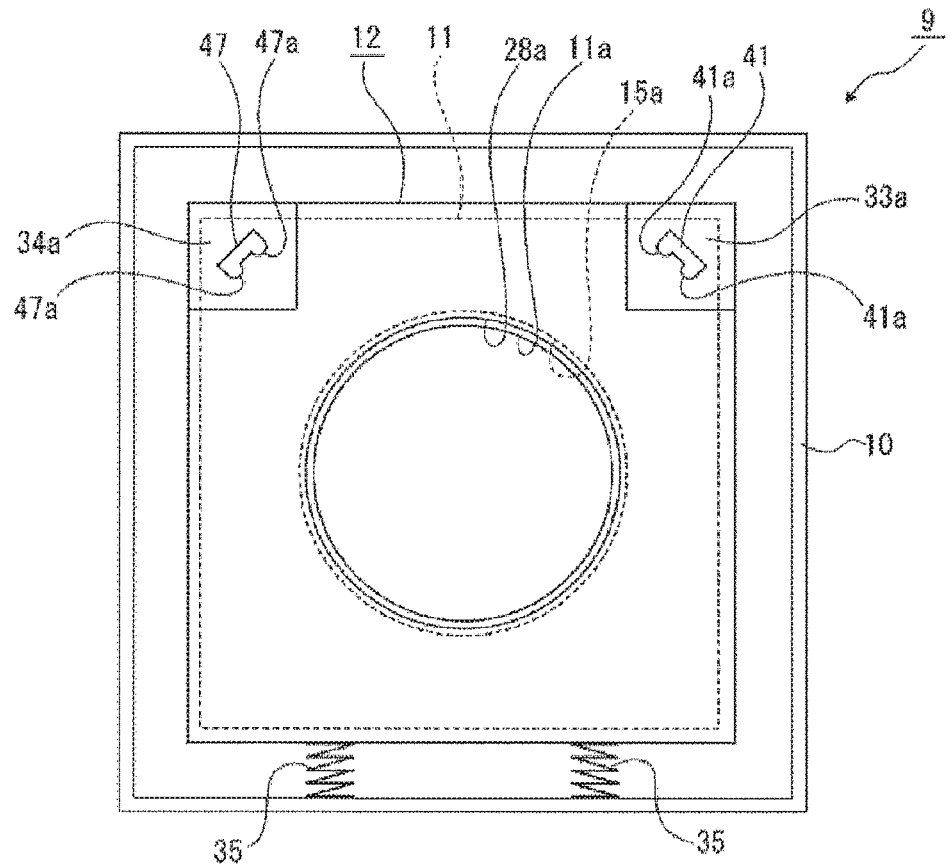
FIG. 18 is a schematic front view illustrating the state in which the first movable body and the second movable body are in the respective reference positions.

Therefore, the shake correction device 9 is in a reference position in which the first movable body 11 and the second movable body 12 are not moved in either the right-left direction or the top-bottom direction (see FIG. 18).

First, the shake correction operation in the second movement direction (top-bottom direction) in the shake correction device 9 will be described (see FIGS. 19 to 22).

Figure 19:
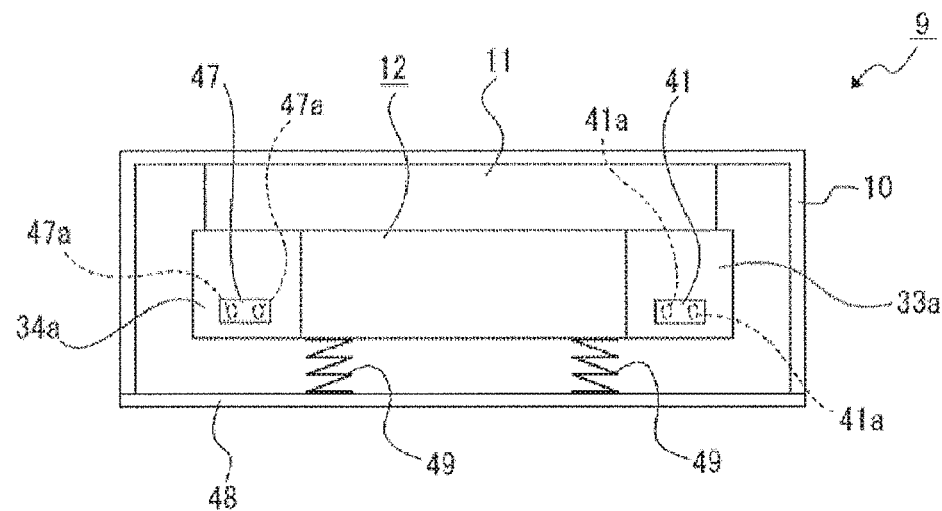
FIG. 19 is a schematic plan view illustrating a state in which a first slider and a second slider are moved forward.

In the shake correction device 9, when voltages are applied to the piezoelectric element 37b of the first actuator 37 and the piezoelectric element 43b of the second actuator 43, the driving shafts 37c and 43c are operated, and the first slider 38 and the second slider 44 are moved forward, the first driving force transmitting sections 41a and 41a are moved to the front end side of the first working target surface 33a by sliding against the first working target surface 33a, and the second driving force transmitting sections 47a and 47a are moved to the front end side of the second working target surface 34a by sliding against the second working target surface 34a (see FIG. 19).

Figure 20:
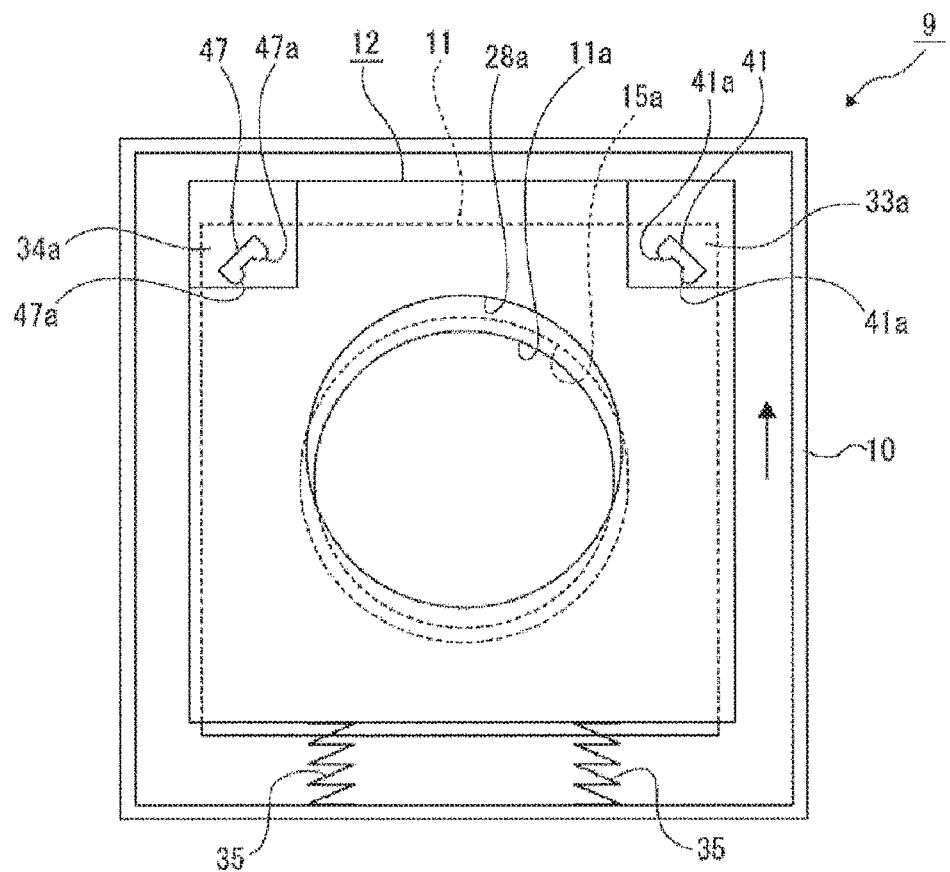
FIG. 20 is a schematic front view illustrating a state in which the first and second sliders are moved forward and the second movable body is moved in a second movement direction.

When the first driving force transmitting sections 41a and 41a are moved to the front end side of the first working target surface 33a and the second driving force transmitting sections 47a and 47a are moved to the front end side of the second working target surface 34a, the second movable body 12 biased upward by the pressing springs 35 and 35 is guided by the second guides 25 and 25 with respect to the first movable body 11 and moved upward (see FIG. 20).

Figure 21:
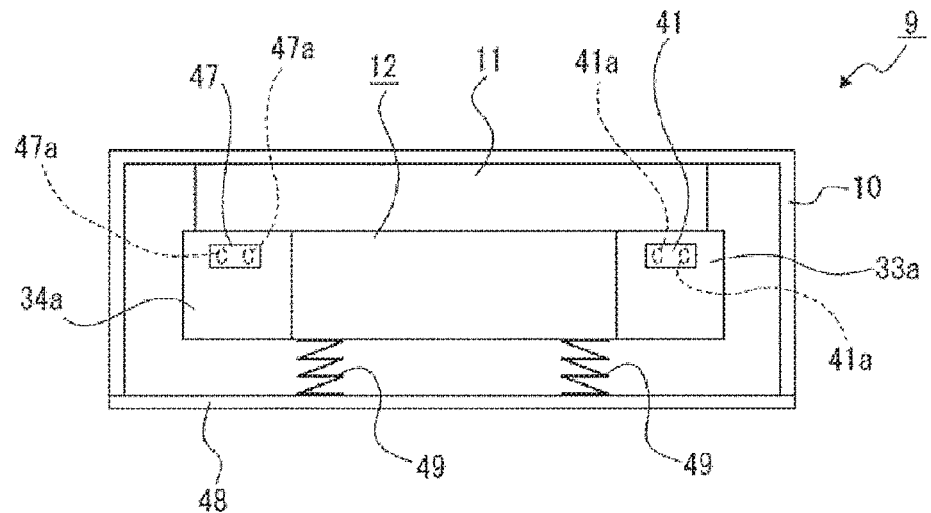
FIG. 21 is a schematic plan view illustrating a state in which the first slider and the second slider are moved rearward.

In contrast, in the shake correction device 9, when voltages are applied to the piezoelectric element 37b of the first actuator 37 and the piezoelectric element 43b of the second actuator 43, the driving shafts 37c and 43c are operated, and the first slider 38 and the second slider 44 are moved rearward, the first driving force transmitting sections 41a and 41a are moved to the rear end side of the first working target surface 33a by sliding against the first working target surface 33a, and the second driving force transmitting sections 47a and 47a are moved to the rear end side of the second working target surface 34a by sliding against the second working target surface 34a (see FIG. 21).

Figure 22:
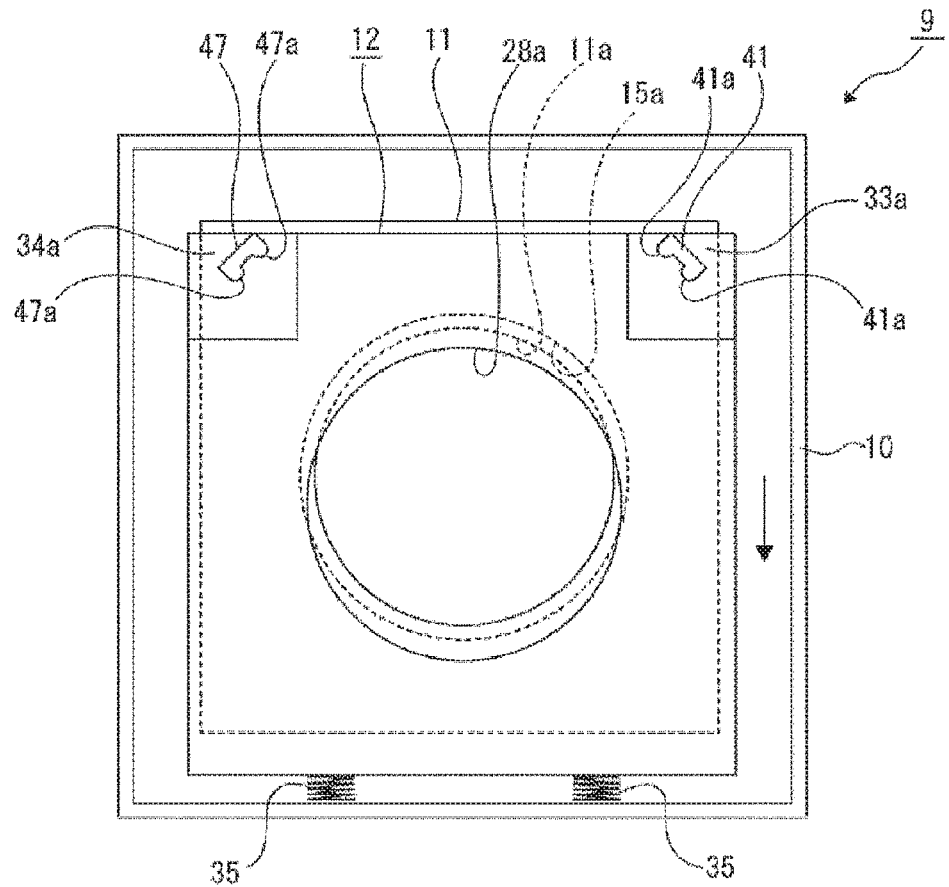
FIG. 22 is a schematic front view illustrating a state in which the first slider and the second slider are moved rearward and the second movable body is moved in the second movement direction.

When the first driving force transmitting sections 41a and 41a are moved to the rear end side of the first working target surface 33a and the second driving force transmitting sections 47a and 47a are moved to the rear end side of the second working target surface 34a, the second movable body 12 is guided by the second guides 25 and 25 and moved downward with respect to the first movable body 11 against the biasing force of the pressing springs 35 and 35 (see FIG. 22).

Next, the shake correction operation in the first movement direction (right-left direction) in the shake correction device 9 will be described (see FIGS. 23 to 26).

Figure 23:
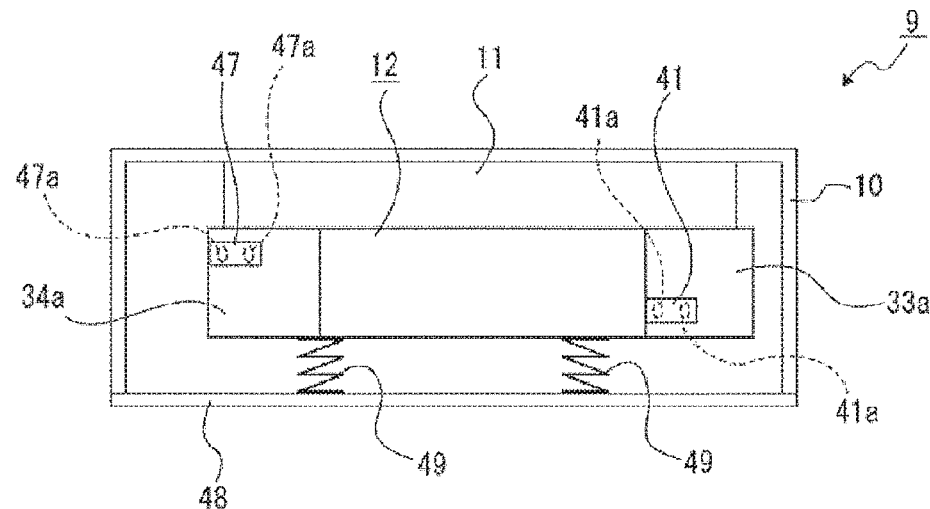
FIG. 23 is a schematic plan view illustrating a state in which the first slider is moved forward and the second slider is moved rearward.
Figure 24:
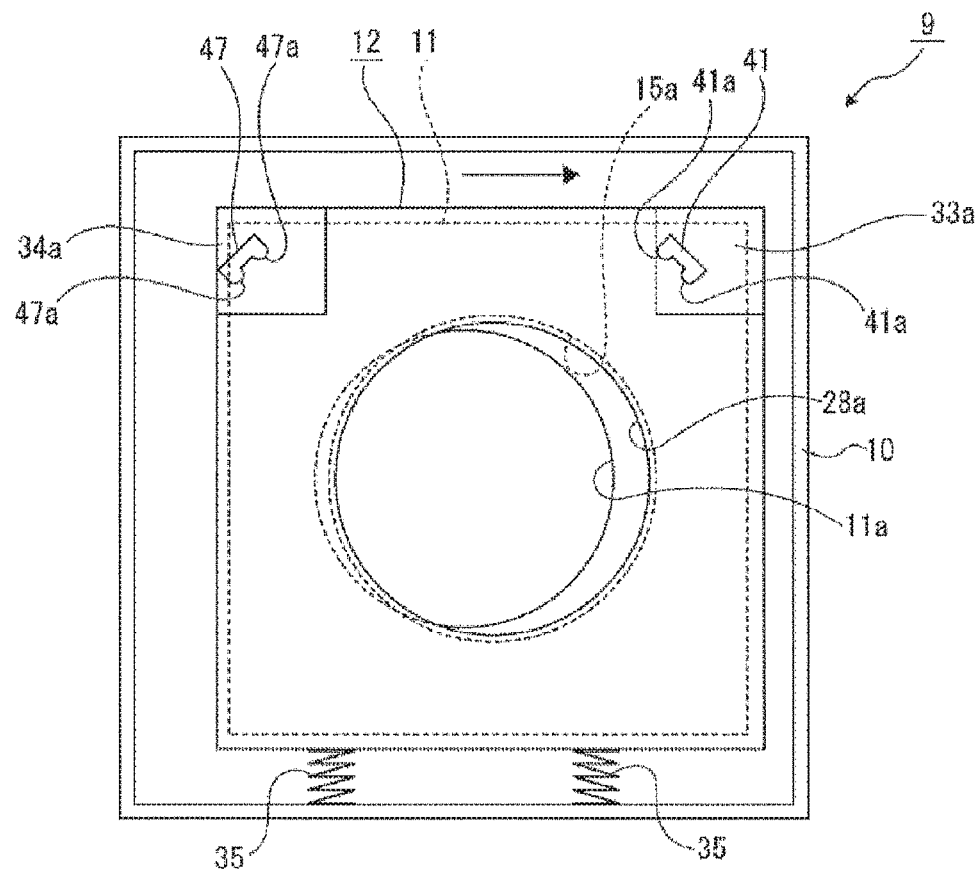
FIG. 24 is a schematic front view illustrating a state in which the first slider is moved forward, the second slider is moved rearward, and the first movable body and the second movable body are thereby moved together in a first movement direction.

In the shake correction device 9, when voltages are applied to the piezoelectric element 37b of the first actuator 37 and the piezoelectric element 43b of the second actuator 43, the driving shafts 37c and 43c are operated, and the first slider 38 and the second slider 44 are moved forward and rearward, respectively, the first driving force transmitting sections 41a and 41a are moved to the front end side of the first working target surface 33a by sliding against the first working target surface 33a, and the second driving force transmitting sections 47a and 47a are moved to the rear end side of the second working target surface 34a by sliding against the second working target surface 34a (see FIG. 23).

When the first driving force transmitting sections 41a and 41a are moved to the front end side of the first working target surface 33a and the second driving force transmitting sections 47a and 47a are moved to the rear end side of the second working target surface 34a, the second movable body 12 is applied with a moving force. The applied moving force is transmitted from the second movable body 12 to the first movable body 11, and the first movable body is guided by the first guides 21 and 21 to be moved to the left together with the second movable body 12 (see FIG. 24).

Figure 25:
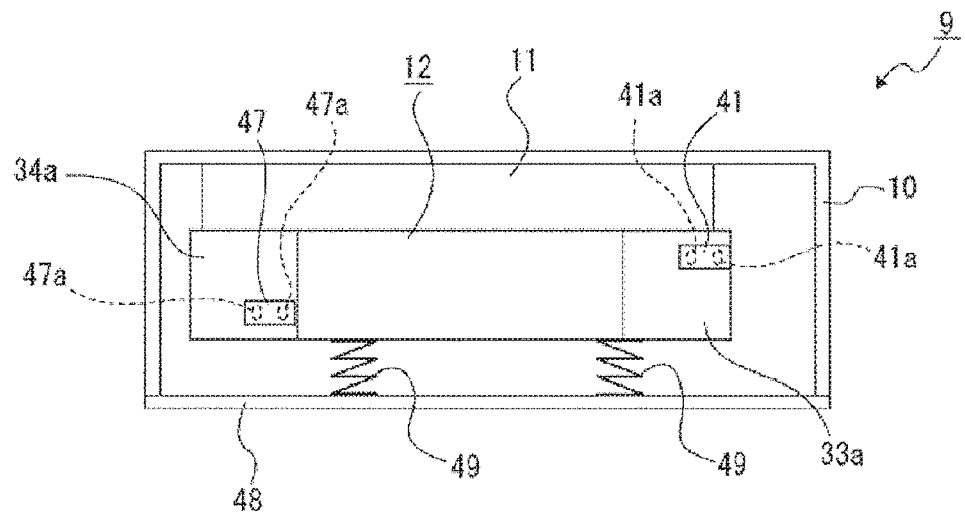
FIG. 25 is a schematic plan view illustrating a state in which the first slider is moved rearward and the second slider is moved forward.
Figure 26:
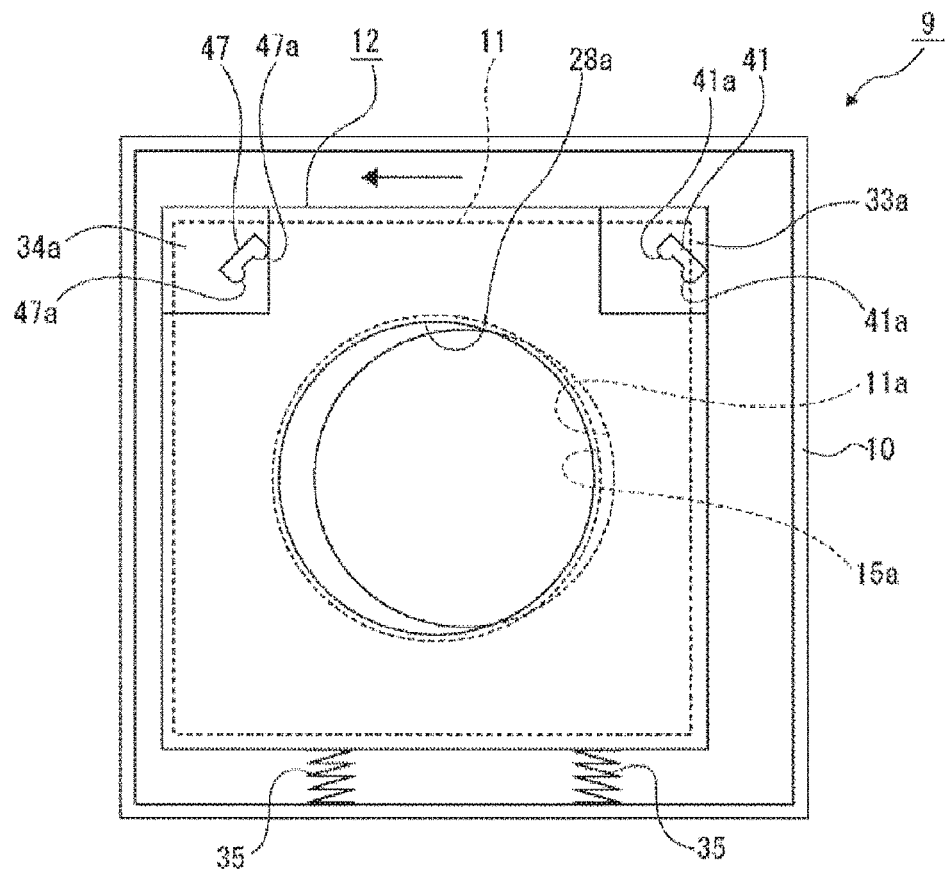
FIG. 26 is a schematic front view illustrating a state in which the first slider is moved rearward, the second slider is moved forward, and the first movable body and the second movable body are thereby moved together in the first movement direction.

In contrast, in the shake correction device 9, when voltages are applied to the piezoelectric element 37b of the first actuator 37 and the piezoelectric element 43b of the second actuator 43, the driving shafts 37c and 43c are operated, and the first slider 38 and the second slider 44 are moved rearward and forward, respectively, the first driving force transmitting sections 41a and 41a are moved to the rear end side of the first working target surface 33a by sliding against the first working target surface 33a, and the second driving force transmitting sections 47a and 47a are moved to the front end side of the second working target surface 34a by sliding against the second working target surface 34a (see FIG. 25).

When the first driving force transmitting sections 41a and 41a are moved to the rear end side of the first working target surface 33a and the second driving force transmitting sections 47a and 47a are moved to the front end side of the second working target surface 34a, the second movable body 12 is applied with a moving force to the right. The applied moving force is transmitted from the second movable body 12 to the first movable body 11, and the first movable body 11 is guided by the first guides 21 and 21 to be moved to the right together with the second movable body 12 (see FIG. 26).

As described above, the second movable body 12 is moved in the top-bottom direction with respect to the first movable body 11 and is moved in the right-left direction together with the first movable body 11. Thereby, the shift lens group 3a held by the second movable body 12 is also moved in the top-bottom and right-left directions, the optical axis of the shift lens group 3a is displaced, and shake correction in which an image shake is corrected is performed.

It is to be noted that, although an example is described above in which the first driving force transmitting sections 41a and 41a and the second driving force transmitting sections 47a and 47a are moved with respect to the first working target surface 33a and the second working target surface 34a at the same time, only the first driving force transmitting sections 41a and 41a or only the second driving force transmitting sections 47a and 47a may be moved with respect to the first working target surface 33a or the second working target surface 34a.

Further, by varying the magnitude of the voltages and the directions of the currents applied to the first actuator 37 and the second actuator 43, it is possible to adjust the moving amounts in the front-rear direction and the movement directions of the first driving force transmitting sections 41a and 41a and the second driving force transmitting sections 47a and 47a to move the second movable body 12 to any position in a plane perpendicular to the optical axis.

As described above, in the shake correction device 9, the first movable body 11 and the second movable body 12 are positioned side by side in the optical axis direction (front-rear direction), the first movement direction is a direction perpendicular to the optical axis direction, and the second movement direction is a direction perpendicular to both the optical axis direction and the first movement direction.

Therefore, since the first movement direction in which the first movable body 11 is moved and the second movement direction in which the second movable body 12 is moved are perpendicular to each other and perpendicular to the optical axis, it is possible to perform reliable shake correction.

It is to be noted that, although an example has been described above where the first movable body 11 is moved in the first movement direction, which is the right-left direction, and the second movable body 12 is moved in the second movement direction, which is the top-bottom direction, the first movable body 11 may be moved in the top-bottom direction and the second movable body 12 may be moved in the right-left direction in reverse.

Further, in the shake correction device 9, the first driving direction, which is the driving direction of the driving force applied from the first driving body 36 to the second movable body 12, is set to a direction oblique toward the lower right and toward the upper left. Further, the second driving direction, which is the driving direction of the driving force applied from the second driving body 42 to the second movable body 12, is set to a direction oblique toward the lower left and the upper right. Therefore, both the first driving direction and the second driving direction are set to the directions perpendicular to the optical axis direction and perpendicular to each other.

Therefore, since the first driving direction and the second driving direction are perpendicular to each other and are both perpendicular to the optical axis, it is possible to perform highly-reliable shake correction.

It is to be noted that the first driving direction and the second driving direction may be set to directions other than the directions perpendicular to each other, for example, the first driving direction and the second driving direction may be set at an angle of less than 90 degrees in the circumferential direction. Further, the first driving direction and the second driving direction may be set at an angle larger than 90 degrees in the circumferential direction.

Also in a case where the first driving direction and the second driving direction are set at an angle other than that (90 degrees) at which the first driving direction and the second driving direction are perpendicular to each other as described above, by varying the magnitude of the voltages and the directions of the currents applied to the first actuator 37 and the second actuator 43, it is possible to adjust the moving amounts and the movement directions of the first driving force transmitting sections 41a and 41a and the second driving force transmitting sections 47a and 47a to move the second movable body 12 to any position in the plane perpendicular to the optical axis.

Further, in the shake correction device 9, the second movable body 12 is moved with respect to the base body 10 by: pressing the first driving force transmitting sections 41a and 41a to the first working target surface 33a in a state where the first driving force transmitting sections 41a and 41a are slidable against the first working target surface 33a; pressing the second driving force transmitting sections 47a and 47a to the second working target surface 34a in a state where the second driving force transmitting sections 47a and 47a are slidable against the second working target surface 34a; and varying at least the positions of the first driving force transmitting sections 41a and 41a with respect to the first working target surface 33a or the positions of the second driving force transmitting sections 47a and 47a with respect to the second working target surface 34a.

Therefore, since the driving force of the first driving body 36 is transmitted to the first working target surface 33a, the driving force of the second driving body 42 is transmitted to the second working target surface 34a, and the second movable body 12 is thereby moved, it is possible to reliably move the second movable body 12 by a simple configuration.

Further, pressing springs 35 and 35 are provided that performs biasing in a direction that causes the first working target surface 33a to be pressed against the first driving force transmitting sections 41a and 41a and causes the second working target surface 34a to be pressed against the second driving force transmitting sections 47a and 47a.

Accordingly, the first working target surface 33a is pressed against the first driving force transmitting sections 41a and 41a by the pressing springs 35 and 35 and the second working target surface 34a is pressed against the second driving force transmitting sections 47a and 47a. Therefore, the driving force is reliably transmitted from the first driving body 36 and the second driving body 42 to the second movable body 12. This makes it possible to perform highly-reliable shake correction while the number of components is reduced Further, by setting the first driving direction of the first driving body 36 and the second driving direction of the second driving body 42 to different directions and directions sloped with respect to the top, the bottom, the right, and the left, and by setting the biasing direction by the pressing springs 35 and 35 to be upward, there is no need to provide a spring that performs biasing in different directions that causes the first working target surface 33a and the second working target surface 34a of the second movable body 12 to be pressed against the first driving force transmitting sections 41a and 41a and the second driving force transmitting sections 47a and 47a, respectively. This makes it possible to simplify the structure by reducing the number of components.

Further, since the first working target surface 33a and the second working target surface 34a are both sloped with respect to the first movement direction and the second movement direction, the driving force of the first driving body 36 is transmitted to the first working target surface 33a formed as the sloped surface, the driving force of the second driving body 42 is transmitted to the second working target surface 34a formed as the sloped surface, and the second movable body 12 is thereby moved. This makes it possible to reliably move the second movable body 12 by a simpler configuration.

Further, the slope angle of the first working target surface 33a with respect to the first movement direction and the second movement direction is the same as the slope angle of the second working target surface 34a with respect to the first movement direction and the second movement direction.

Accordingly, the driving force of the first driving body 36 is transmitted to the first working target surface 33a formed as the sloped surface, the driving force of the second driving body 42 is transmitted to the second working target surface 34a sloped at the same angle as that of the first working target surface 33a, and the second movable body 12 is moved thereby. Therefore, it is possible to cause the amount of movement of the second movable body 12 in the first movement direction and the amount of movement of the second movable body 12 in the second movement direction by the same driving force of the first driving body 36 and the second driving body 42 to be the same, It is therefore possible to easily control the movement of the second movable body 12 in the first movement direction and the second movement direction.

However, in the shake correction device 9, a configuration may be provided in which the slope angles of the first working target surface 33a with respect to the first movement direction and the second movement direction and the slope angles of the second working target surface 34a with respect to the first movement direction and the second movement direction are different. By making the slope angles of the first working target surface 33a and the second working target surface 34a different, it is possible to vary the amounts of movement of the second movable body 12 in the first movement direction and the second movement direction with respect to the same driving forces of the first driving body 36 and the second driving body 42.

Accordingly, it is possible to perform control in accordance with the movement speed in the first movement direction and the second movement direction required for the second movable body 12, the characteristics of the first driving body 36 and the second driving body 42, for example, the driving force, the driving speed, and the like. It is therefore possible to improve the degree of freedom in designing the movement control of the second movable body 12.

It is to be noted that, in the above description, an example has been described in which the first working target surface 33a and the second working target surface 34a are sloped with respect to the first movement direction and the second movement direction, respectively, and the first driving direction of the first driving body 36 and the second driving direction of the second driving body 42 are directions perpendicular to the optical axis. However, for example, the first working target surface 33a and the second working target surface 34a may be oriented in a direction perpendicular to the optical axis, and the first driving direction of the first driving body 36 and the second driving direction of the second driving body 42 may be sloped with respect to a direction perpendicular to the optical axis.

Further, in the above description, an example has been described in which the second movable body 12 is biased by the pressing springs 35 and 35. However, for example, instead of the pressing springs 35 and 35, another unit may be provided which performs biasing in a direction that causes the first working target surface 33a and the second working target surface 34a of the second movable body 12 are pressed against the first driving force transmitting sections 41a and 41a and the second driving force transmitting sections 47a and 47a, respectively.

For example, the receiving protrusions 33 and 34 of the second movable body 12 may be formed of a magnetic material. The transmission member 41 of the first driving body 36 and the transmission member 47 of the second driving body 42 may be formed of a magnet. The receiving protrusion 33 may be attracted to the transmission member 41 thereby. The first working target surface 33a may be pressed against the first driving force transmission portions 41a and 41a thereby. The receiving protrusion 34 may be attracted to the transmission member 47 thereby. The second working target surface 34a may be pressed against the second driving force transmitting sections 47a and 47a.

It is to be noted that, in reverse, the receiving projections 33 and 34 of the second movable body 12 may be formed of a magnet, and the transmitting members 41 and 47 may be formed of a magnetic material.

In the shake correction device 9, as described above, a plurality of, for example, two, first driving force transmitting sections 41a and 41a and a plurality of, for example, two, second driving force transmitting sections 47a and 47a are provided.

Accordingly, since the first acted surface 33a is pressed against the plurality of first driving force transmitting section 41a, 41a and the second acted surface 34a is pressed against the plurality of second driving force transmitting section 47a, 47a, the positions of the first driver 36 and the second driver 42 with respect to the second movable body 12 can be stabilized, and the driving force can be transmitted from the first driver 36 and the second driver 42 to the second movable body 12 in a stable manner.

Further, the first movement direction in which the first movable body 11 is moved and the first driving direction of the driving force applied from the first driving body 36 to the second movable body 12 are set in different directions, and the second movement direction in which the second movable body 12 is moved and the second driving direction of the driving force applied from the second driving body 42 to the second movable body 12 are set in different directions.

Accordingly, both the driving force of the first driving body 36 and the driving force of the second driving body 42 are transmitted to move the second movable body 12. Therefore, the second movable body 12 is moved in the first movement direction or the second movement direction according to the magnitudes of the driving forces of the first driving body 36 and the second driving body 42. It is therefore possible to improve the degree of freedom of movement control with respect to the second movable body 12.

Further, the first driving body 36 includes the first actuator 37 and the first slider 38 operated by the first actuator 37. The second driving body 42 includes the second actuator 43 and the second slider 44 operated by a second actuator 43. The first slider 38 and the second slider 44 are slidable against the second movable body 12.

Accordingly, the driving force of the first driving body 36 and the driving force of the second driving body 42 are transmitted to the second movable body 12 from the first slider 38 and the second slider 44, respectively. Therefore, it is possible to reliably transmit the driving forces of the first driving body 36 and the second driving body 42 to the second movable body 12 with a simple configuration.

Furthermore, the first movement direction and the second movement direction are made to be directions perpendicular to each other. The first slider 38 and the second slider 44 are operated in a direction (front-rear direction) perpendicular to both the first movement direction and the second movement direction.

Accordingly, the first slider 38 and the second slider 44 are operated in the direction perpendicular to the movement direction of the first movable body 11 and the second movable body 12. Therefore, the arrangement spaces of the first slider 38 and the second slider 44 are reduced inside the plane including the movement direction of the first movable body 11 and the second movable body 12, i.e., inside the plane perpendicular to the optical axis. It is therefore possible to reduce the size of the imaging apparatus 1 in the radial direction of the lens barrel 2.

Further, in the shake correction device 9, the first slider 38 and the second slider 44 are operated in the optical axis direction (front-rear direction) and the first movable body 11 and the second movable body 12 are operated in the direction perpendicular to the optical axis. This makes the operating direction of the first slider 38 and the second slider 44 and the movement direction of the first movable body 11 and the second movable body 12 differ from each other.

As described above, the operation directions of the first slider 38 and the second slider 44 and the movement directions of the first movable body 11 and the second movable body 12 differ from each other. This disperses the influences of the inertial masses of the first slider 38 and the second slider 44 as well as the first movable body 11 and the second movable body 12 in the operation direction and the movement direction, respectively.

Accordingly, when a large impact due to dropping or the like of the imaging apparatus 1 is applied, the impact is dispersed in each direction. It is therefore possible to suppress occurrence of breakage or a damage of each portion due to the impact.

Examples of control in the shake correction operation of the shake correction device 9 will be described below (see FIGS. 27 and 28).

Figure 27:
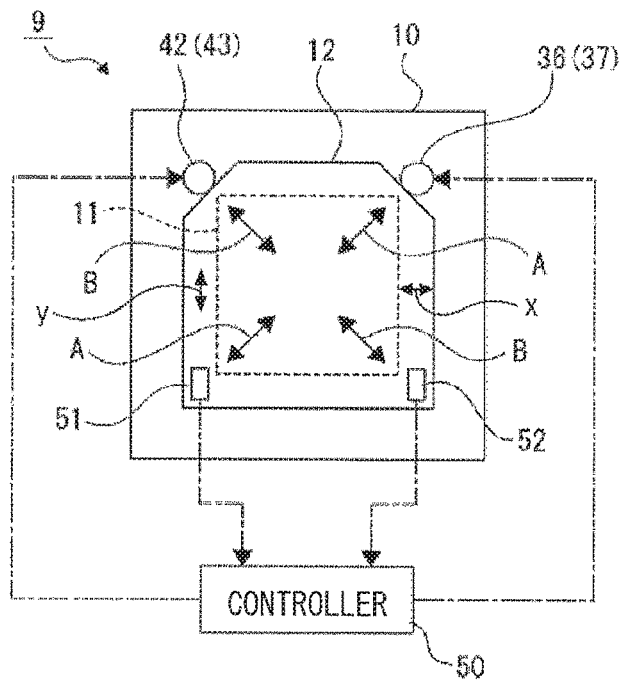
FIG. 27 is a schematic front view illustrating a configuration of a shake correction device for explaining a control example of shake correction operation.
Figure 28:
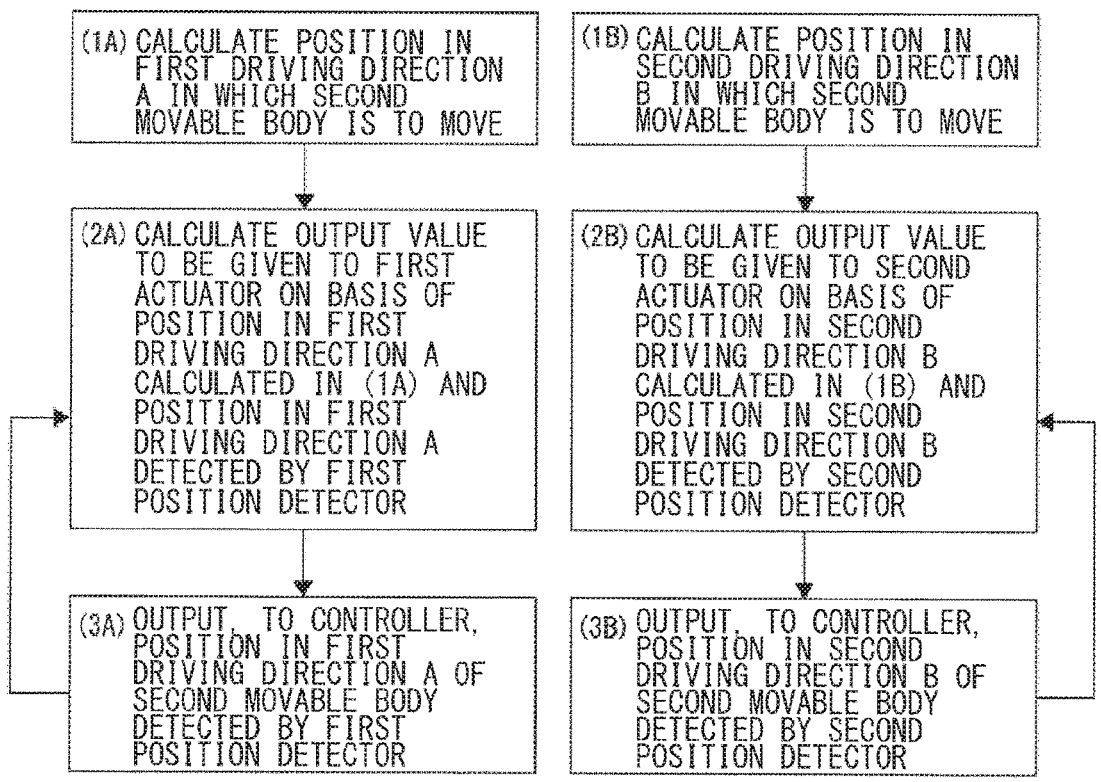
FIG. 28 is a flowchart illustrating an example of control of the shake correction operation.

The imaging apparatus 1 is provided with a controller 50 (see FIG. 27). As the controller 50, for example, the CPU 4 that performs overall control of the imaging apparatus 1 as a whole is used.

The shake correction device 9 is provided with a first position detector 51 and a second position detector 52. The first position detector 51 detects a position of the second movable body 12 in a first driving direction A. The second position detector 52 detects a position of the second movable body 12 in a second driving direction B. As the first position detector 51 and the second position detector 52, various detectors such as an optical detector or a magnetic detector are used.

The control in the shake correction operation is performed in the following procedure (see FIG. 28).

(1A, 1B) Each of the position in the first driving direction A and the position in the second driving direction B of the second movable body 12 to be moved in order to correct the image shake are calculated by the controller 50.

(2A, 2B) On the basis of the position in the first driving direction A calculated in (1A) and the position in the first driving direction A of the second movable body 12 detected by the first position detector 51, an output value to be given to the first actuator 37 is calculated, and the calculated output value is outputted to the first actuator 37.

At the same time, an output value to be given to the second actuator 43 is calculated on the basis of the position of the second driving direction B calculated in (1B) and the position of the second movable body 12 in the second driving direction B detected by the second position detector 52, and the calculated output value is outputted to the second actuator 43.

(3A, 3B) The position in the first driving direction A of the second movable body 12 operated on the basis of the output value of (2A) is detected by the first position detector 51. A detection result is outputted to the controller 50, and the operation of (2A) is performed. At the same time, the position in the second driving direction B of the second movable body 12, operated on the basis of the output value of (2B) is detected by the second position detector 52. A detection result is outputted to the controller 50, and the operation of (2B) is performed.

As described above, by detecting and controlling the positions in the first driving direction A and the second driving direction B of the second movable body 12 by the first position detector 51 and the second position detector 52, respectively, the positions of the second movable body 12 detected by the first position detector 51 and the second position detector 52 coincide with the driving directions of the first driving body 36 and the second driving body 42. It is therefore possible to perform the control related to the shake correction by a simple logic.

<Control Taking into Consideration Biasing Force>

In this manner, the shake correction device 9 corrects the shake. The processing in the shake correction will be described in more detail.

The shake correction device 9 includes the pressing spring 35 which functions as a biasing portion. For example, the biasing force from the pressing spring 35 differs between a time at which the first moving body 11 and the second moving body 12 are at the reference position and a time at which the first moving body 11 and the second moving body 12 are deviated from the reference position. The movement directions and the moving amounts need to be set and controlled also taking into consideration the influence of the biasing force resulting from the positions of the first moving body 11 and the second moving body 12.

Figure 29:
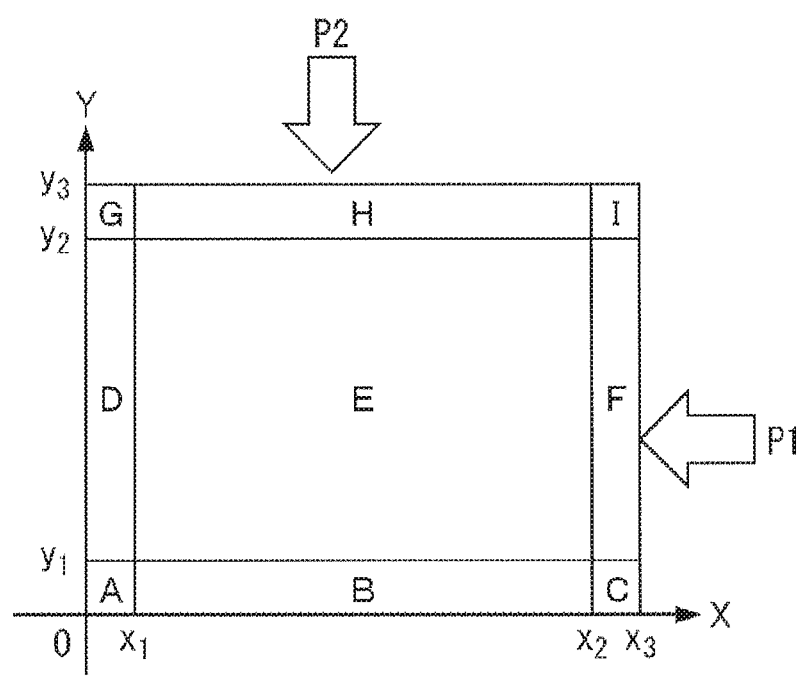
FIG. 29 is a diagram for explaining a movement range.

Here, the influence of the biasing force will be simply described. In the following description, coordinates illustrated in FIG. 29 are used. The coordinates illustrated in FIG. 29 indicate movable ranges of the first moving body 11 and the second moving body 12 (movable ranges in the first movement direction and the second movement direction).

The first moving body 11 is configured to be movable in a range from 0 to x3 in an X-axis direction, and is configured to be movable in a range from 0 to y3 in a Y-axis direction. As illustrated in FIG. 29, for the purpose of the following description, a region surrounded by coordinates (0, 0), (0, y3), (x3, y3), and (x3, 0) is divided into nine regions.

A region A is a region surrounded by coordinates (0, 0), (0, y1), (x1, y1), and (x1, 0). A region B is a region surrounded by coordinates (x1, 0), (x1, y1), (x2, y1), and (x2, 0). A region C is a region surrounded by coordinates (x2, 0), (x2, y1), (x3, y1), and (x3, 0).

A region D is a region surrounded by coordinates (0, y1), (0, y2), (x1, y2), and (x1, y1). A region E is a region surrounded by coordinates (x1, y1), (x1, y2), (x2, y2), and (x2, y1). A region F is a region surrounded by coordinates (x2, y1), (x2, y2), (x3, y2), and (x3, y1).

A region G is a region surrounded by coordinates (0, y2), (0, y3), (x1, y3), and (x1, y2). A region H is a region surrounded by coordinates (x1, y2), (x1, y3), (x2, y3), and (x2, y2). A region I is a region surrounded by coordinates (x2, y2), (x2, y3), (x3, y3), and (x3, y2).

The reference position (the position in a usual state with no shift correction) of the first moving body 11 and the second moving body 12 is a middle position of the area E. Further, here, the explanation will be continued on the assumption that a biasing force in the X-axis direction is biasing force P1 and is a force in an x1 direction from an x3 direction. Similarly, the explanation will be continued on the assumption that a biasing force in the Y-axis direction is a biasing force P2 and is a force in a y1 direction from a y3 direction.

For example, regarding the biasing force P1, when the first moving body 11 and the second moving body 12 are positioned in the region F, the biasing force P1 applied to the first moving body 11 and the second moving body 12 is greater than the biasing force P1 applied to the first moving body 11 and the second moving body 12 when the first moving body 11 and the second moving body 12 are positioned in the region D. Similarly, regarding the biasing force P2, when the first moving body 11 and the second moving body 12 are positioned in the region H, the biasing force P2 applied to the first moving body 11 and the second moving body 12 is greater than the biasing force P2 applied to the first moving body 11 and the second moving body 12 when the first moving body 11 and the second moving body 12 are positioned in the region B.

Figure 30:
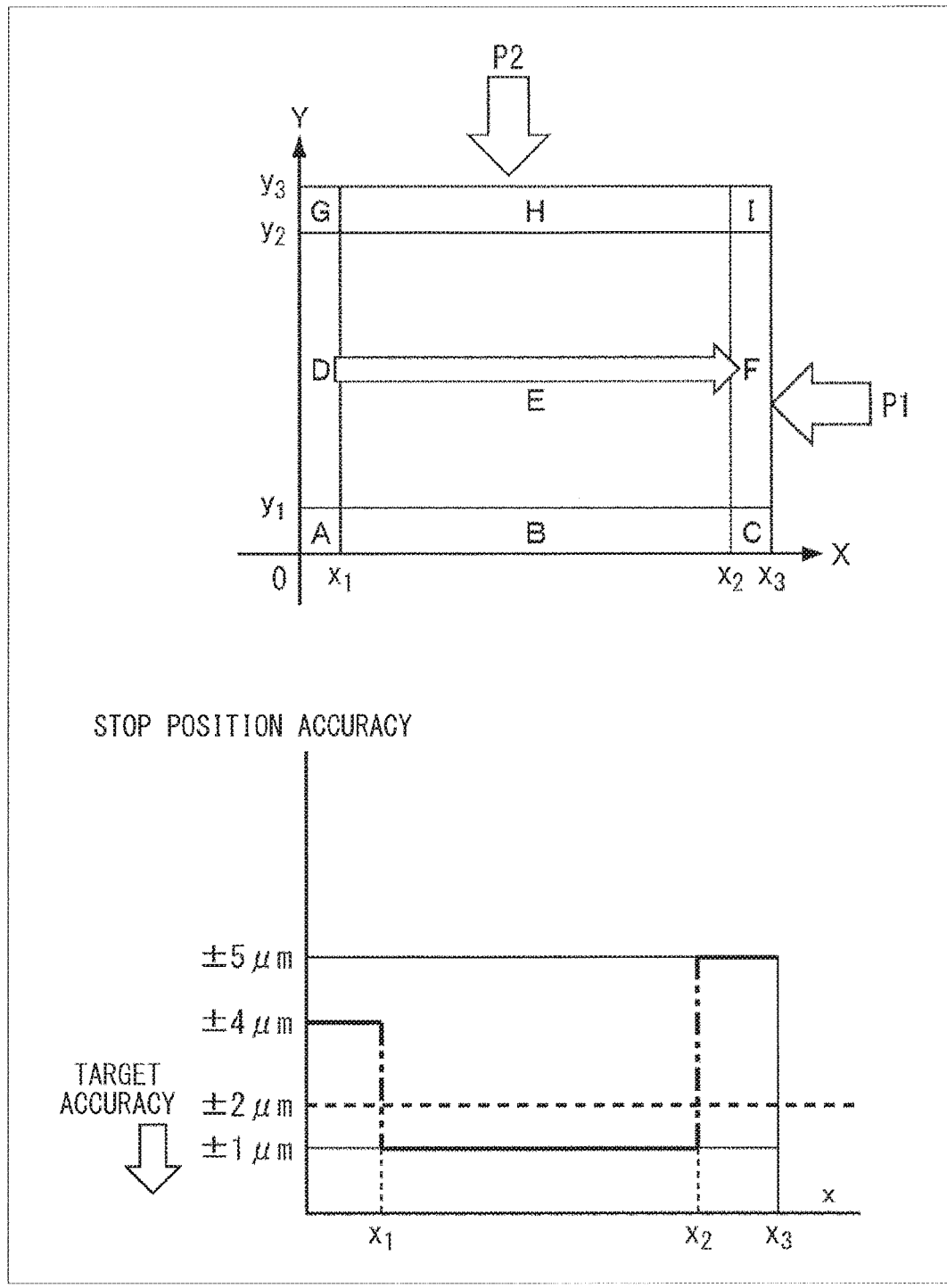
FIG. 30 is a diagram for explaining stop position accuracy.
Figure 31:
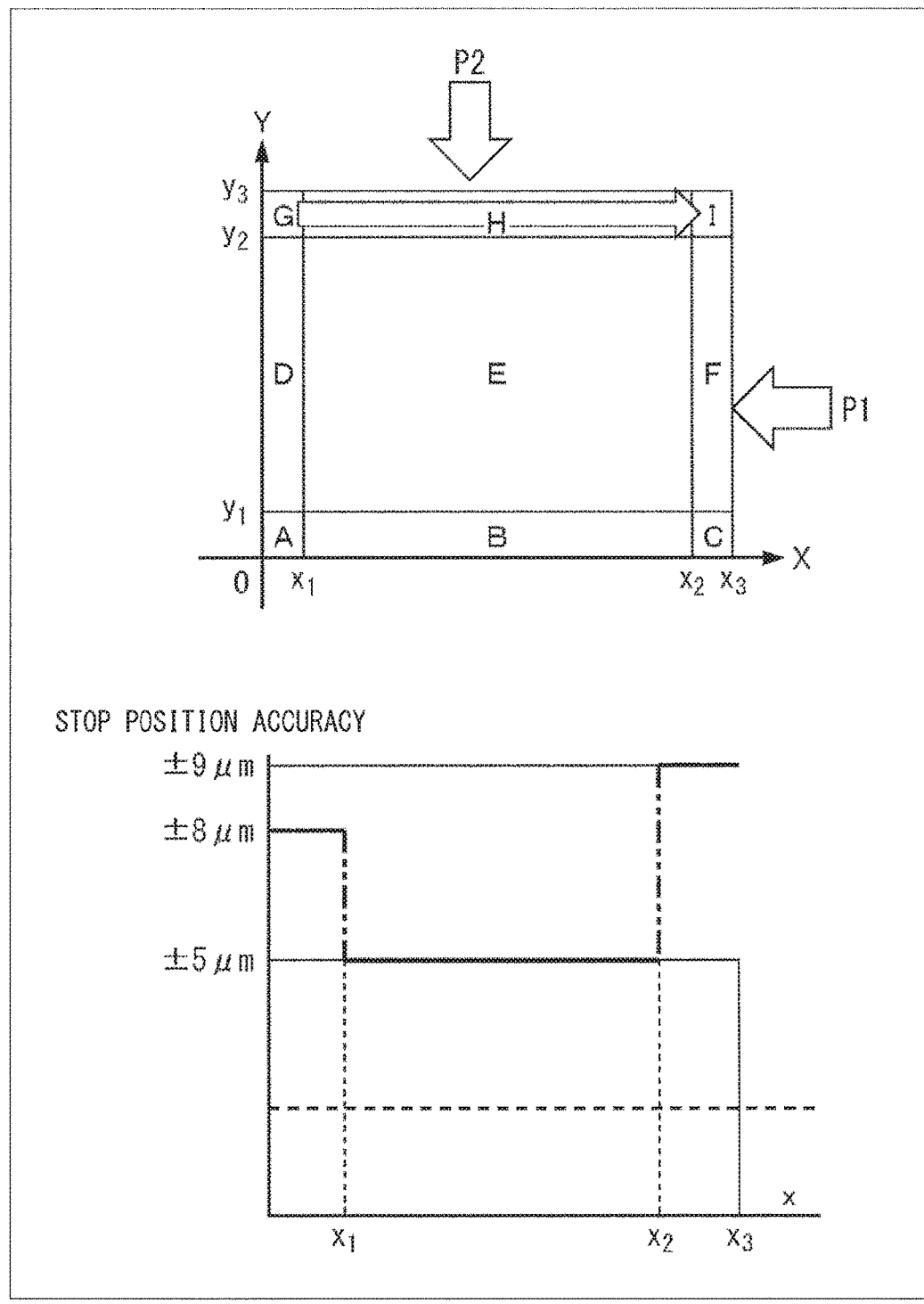
FIG. 31 is a diagram for explaining the stop position accuracy.

Referring to FIGS. 30 and 31, the accuracy of the stopping positions of the first moving body 11 and the second moving body 12 will be described.

The upper drawing of FIG. 30 is the same drawing as that of FIG. 29, and the movement directions of the first moving body 11 and the second moving body 12 are added by arrows to the drawing illustrating the movement ranges illustrated in FIG. 29. As illustrated by the arrows in the upper drawing of FIG. 30, the accuracy of the stopping positions of the first moving body 11 and the second moving body 12 at a time when the first moving body 11 and the second moving body 12 are moved stepwise from a state in which the first moving body 11 and the second moving body 12 are positioned in the region D to the region F is illustrated in the lower drawing of FIG. 30.

The movement of the first moving body 11 and the second moving body 12 illustrated in the upper drawing of FIG. 30 is not movement in the Y-axis direction but movement in the X-axis direction. Further, stepwise movement means to repeatedly performing movement in which positions slightly ahead of the present positions are set as target stop positions and the first moving body 11 and the second moving body 12 are moved to the target stop positions. Hereinafter, such movement is referred to as step movement.

Reference is made to the lower drawing of FIG. 30. In the lower drawing of FIG. 30, a horizontal axis represents an X-axis of a movement range as in the upper drawing of FIG. 30, and a vertical axis represents the stop position accuracy. In the drawing, the target accuracy is set to stopping within a range of ±2 μm or less of a position set as the target stop position, and the position is indicated by a dotted line.

In a case where the first moving body 11 and the second moving body 12 are subjected to the step movement from a position 0 (X=0) to a position x1 (X=x1) (in a case where the step movement is performed inside the region D), the first moving body 11 and the second moving body 12 are stopped within a range of ±4 um from the position set as the target position. Therefore, it is not possible to achieve the target accuracy.

In a case where the first moving body 11 and the second moving body 12 are subjected to the step movement from the position x1 (X=x1) to a position x2 (X=x2) (in a case where the step movement is performed inside the region E), the first moving body 11 and the second moving body 12 are stopped within a range of ±1 um from the position set as the target position. Therefore, it is possible to achieve the target accuracy.

In a case where the first moving body 11 and the second moving body 12 are subjected to the step movement from the position x2 (X=x2) to a position x3 (X=x3) (in a case where the step movement is performed inside the region F), the first moving body 11 and the second moving body 12 are stopped within a range of ±5 um from the position set as the target position. Therefore, it is not possible to achieve the target accuracy.

In this case, it can be read that it is possible to perform the movement and the stopping capable of achieving the target accuracy in the region E, but in the region D and the region F, it is difficult to perform the movement and the stopping capable of achieving the target accuracy. This is the case where the same control is performed in any region. By performing control different from region to region as described later, the stop position accuracy can be kept within the target accuracy even in the region D or the region F.

Reference is made to FIG. 31. FIG. 31 is a diagram for explaining the stop position accuracy when the first moving body 11 and the second moving body 12 are moved along the X-axis direction, as with FIG. 30, but differs from the case of FIG. 30 in the region where the first moving body 11 moves.

In the example illustrated in FIG. 31, as illustrated in the upper drawing, a case where the first moving body 11 and the second moving body 12 move from the region G to the region I via the region H is illustrated. In this case, as illustrated in the lower drawing of FIG. 31, in a case where the first moving body 11 and the second moving body 12 are subjected to the step movement inside the region G, the first moving body 11 and the second moving body 12 are stopped within a range of ±8 um from the positions set as the target positions. Therefore, it is not possible to achieve the target accuracy.

In a case where the first moving body 11 and the second moving body 12 are subjected to the step movement inside the region H, the first moving body 11 and the second moving body 12 are stopped within a range of ±5 um from the positions set as the target positions. Therefore, it is not possible to achieve the target accuracy.

In a case where the first moving body 11 and the second moving body 12 are subjected to the step movement inside the region I, the first moving body 11 and the second moving body 12 are stopped within a range of ±9 um from the positions set as the target positions. Therefore, it is not possible to achieve the target accuracy.

In this case, it can be read that it is difficult to perform the movement and the stopping capable of achieving the target accuracy in all regions inside the region G, the region H, and the region I. This case is also the case where the same control is performed in any region. By performing control different from region to region as described later, the stop position accuracy can be kept within the target accuracy even in the region G, the region H, and the region I.

Although not illustrated, it is difficult to keep the stop position accuracy within the target accuracy in the region A, the region B, and the region C, as in the case illustrated in FIG. 31. If the control described later (control using the present technology) is not performed, it is difficult to accurately stop the first moving body 11 and the second moving body 12 at the target positions in regions other than the region E. Therefore, the movement ranges of the first moving body 11 and the second moving body 12 may be limited within the region E.

Therefore, as described below, the control of the first actuator 37 and the second actuator 43 is performed in accordance with the positions where the first moving body 11 and the second moving body 12 are located and the positions of to which the first moving body 11 and the second moving body 12 are to be moved.

<First Configuration and Operation of Controller>

Figure 32:
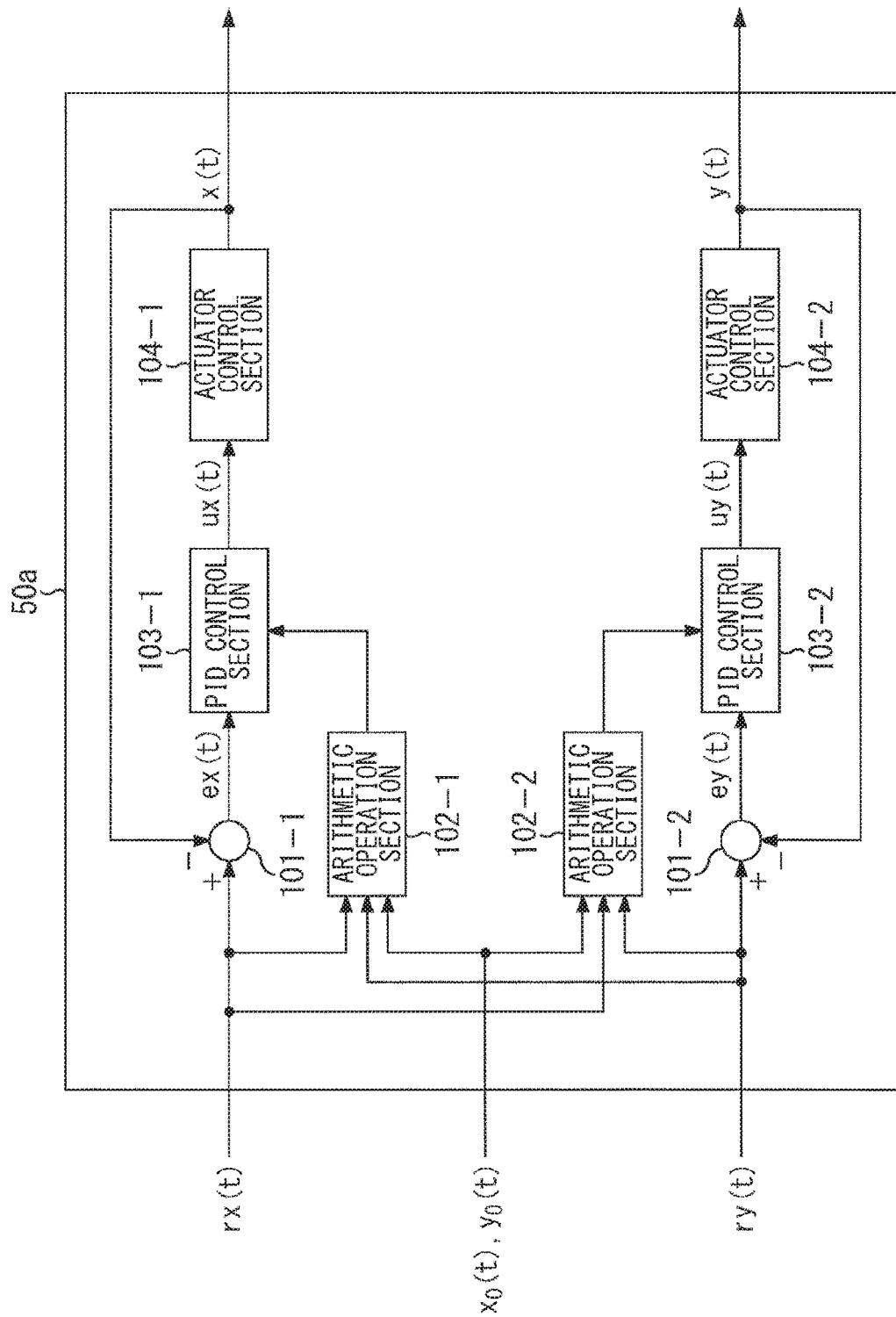
FIG. 32 is a diagram for explaining a configuration of a controller in a first embodiment.

FIG. 32 is a diagram illustrating an exemplary inner configuration of the controller 50 (FIG. 27). A controller 50a in a first embodiment includes adding sections 101-1 and 101-2, arithmetic operation sections 102-1 and 102-2, PID (Proportional-Integral-Differential) control sections 103-1 and 103-2, and actuator control sections 104-1 and 104-2.

The controller 50a includes a control section that controls movement in the X-axis direction and a control section that controls movement in the Y-axis direction. Here, it is assumed that the control section that controls the movement in the X-axis direction includes the adding section 101-1, the arithmetic operation section 102-1, the PID control section 103-1, and the actuator control section 104-1. Further, it is assumed that the control section that controls the movement in the Y-axis motion includes the adding section 101-2, the arithmetic operation section 102-2, the PID controller 103-2, and the actuator controller 104-2.

The control section that controls the movement in the X-axis direction and the control section that controls the movement in the Y-axis direction are similar in basic configuration and operation. Therefore, in the following explanation, the adding section 101-1 and the adding section 101-2 are simply referred to as an adding section 101 in a case where they need not be distinguished from each other. The other parts are similarly described as an arithmetic operation section 102, a PID control section 103, and an actuator control section 104.

In the following explanation, rx(t) is an instructed position (target position) in the X-axis direction, and is a value to be inputted to the adding section 101-1, the arithmetic operation section 102-1, and the arithmetic operation section 102-2. ry(t) is an instructed position (target position) in the Y-axis direction, and is a value to be inputted to the adding section 101-2, the arithmetic operation section 102-2, and the arithmetic operation section 102-1.

x0(t) is an initial position in the X-axis direction, and is a value to be inputted to the arithmetic operation section 102-1 and the arithmetic operation section 102-2. y0 is an initial position in the Y-axis direction and is a value to be inputted to the arithmetic operation section 102-1 and the arithmetic operation section 102-2. The initial position is a position at that time, i.e., a current position.

ex(t) is a deviation in the X-axis direction, is a calculation result in the adding section 101-1, and is an addition result (difference result) of the target position rx(t) and the output x(t) from the actuator control section 104-1. ey(t) is a deviation in the Y-axis direction, is a calculation result in the adding section 101-2, and is an addition result (difference result) of the target position ry(t) and the output y(t) from the actuator control section 104-2.

ux(t) is an output value from the PID control section 103-1, and is an input value inputted to the actuator control section 104-1 in the X-axis direction. uy(t) is an output value from the PID controller 103-2, and is an input value inputted to the actuator controller 104-2 in the Y-axis direction.

x(t) is an output value from the actuator control section 104-1. x(t) is used as a value for controlling the first actuator 37 and is used as a value fed back to the adding section 101-1. y(t) is an output value from the actuator controller 104-2. y(t) is used as a value for controlling the second actuator 43 and is used as a value fed back to the adding section 101-2.

Here, the description is continued on the assumption that the actuator control section 104-1 controls the first actuator 37, the first actuator 37 controls the movement in the first movement direction, and the first movement direction is the X-axis direction. Similarly, the description is continued on the assumption that the actuator control section 104-2 controls the second actuator 43, the second actuator 43 controls the movement in the second movement direction, and the second movement direction is the Y-axis direction.

Figure 33:
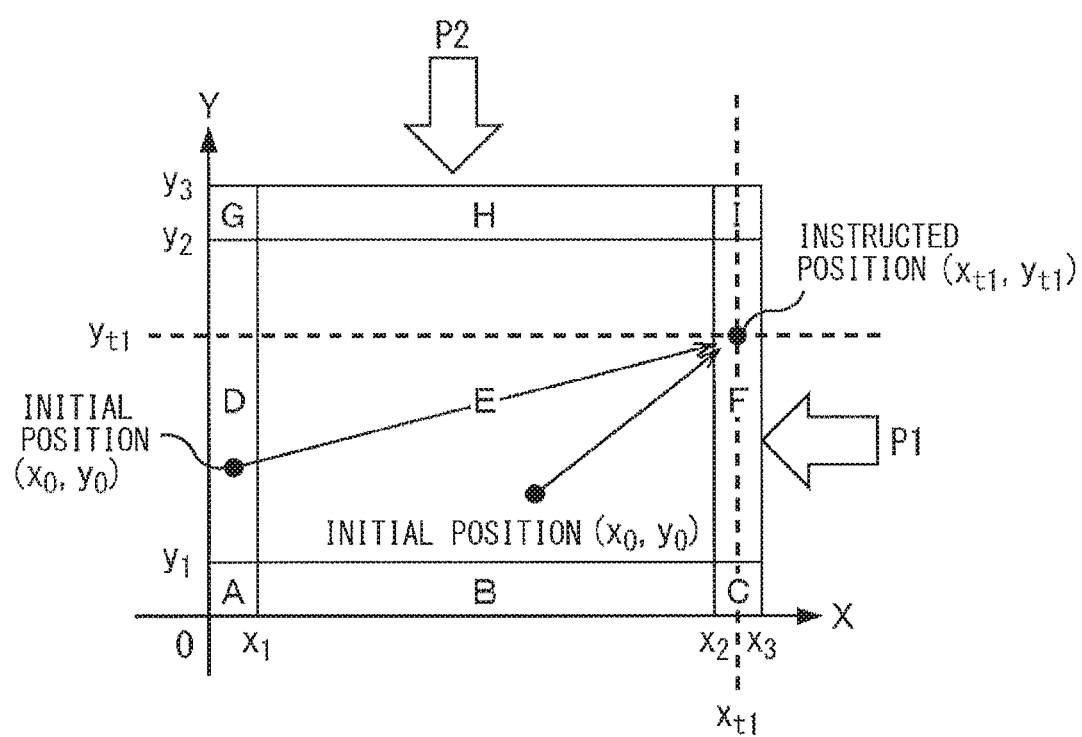
FIG. 33 is a diagram for explaining an initial position and an instructed position.

In the controller 50*a* to which the present technology is applied, the position prior to the movement (the initial position) and the position after the movement (the instructed position) are subjected to different arithmetic operations. For example, as illustrated in FIG. 33, in the case where the initial position is within the region D and the instructed position is in the region F, and in the case where the initial position is within the region E and the instructed position is in the region F, even if the instructed position is the same, the arithmetic operation in the arithmetic operation section 102 is performed differently.

Therefore, the arithmetic operation section 102 is supplied with information on the initial position (x0(t) and y0(t)) and information on the instructed position (rx(t) and ry(t)). The PID control section 103 is supplied with the operation result from the arithmetic operation section 102. The PID control section 103 is an example of feedback control. In this case, it is a method in which the control of the instructed position (rx(t) or ry(t)) is performed by three elements: a deviation (ex(t) or ey(t)) between the output value (x(t) or y(t)) from the actuator control section 104 and the instructed position; the integration thereof, and the differential thereof.

When the control of the PID control section 103 is represented by an expression, the control of the PID control section 103 is represented by the following expression (1).

[Math. 1]

$$ux(t) = Kpx \cdot ex(t) + Kix \cdot \int ex(\tau) \cdot d\tau + Kdx \cdot \frac{dex(t)}{dt} \quad (1)$$

The expression (1) represents an expression for the PID control section 103-1 that performs control in the X-axis direction, but the PID control section 103-2 that performs control in the Y-axis direction also performs an arithmetic operation using the same expression. In the expression (1), Kpx, Kix, and Kdx represent a proportional gain (P gain), an integral gain (I gain), and a differential gain (D gain), respectively, and are each set to a value uniquely calculated from the initial position and the instructed position.

The arithmetic operation section 102 performs arithmetic operation of the P gain, the I gain, and the D gain, respectively. The arithmetic operation section 102 functions as a gain parameter setting section that sets the gain of the PID control section 103. Hereinafter, the P gain, the I gain, and the D gain are described as gains. For example, the description "calculate a gain" refers to a case where any or all of the P gain, the I gain, and the D gain are calculated (a case where at least one gain is calculated).

Further, here, the explanation will be continued by exemplifying the case where the PID control section 103 sets the gain at the time of calculating the control value. The present technology, however, can also be applied to a case where a parameter other than the gain is set depending on the control of the PID control section 103. The arithmetic operation section 102 has a function of setting a parameter required when the PID control section 103 calculates the control value.

It is to be noted that, here, although the PID control is described as an example, other control, for example, feedback control such as P control or PI control can be applied to the present technology.

The arithmetic operation section 102 holds a plurality of arithmetic expressions for setting the gain, selects the held arithmetic expression on the basis of the initial position, and substitutes the instructed position into the selected arithmetic expression to calculate the gain.

The arithmetic operation section 102 holds the arithmetic expression for each initial position. For example, a case where the movable range is divided into nine regions as illustrated in FIG. 33 (FIG. 29) will be described as an example. As the initial position, ranges of 0 to x1, x1 to x2, and x2 to x3 are assumed in a case of considering the X-axis direction, and ranges of 0 to y1, y1 to y2, and y2 to y3 are assumed in a case of considering the Y-axis direction.

Further, the arithmetic operation section 102 also holds an arithmetic expression for each instructed position. As the instructed position, ranges of 0 to x1, x1 to x2, and x2 to x3 are assumed in a case of considering the X-axis direction, and ranges of 0 to y1, y1 to y2, and y2 to y3 are assumed in a case of considering the Y-axis direction.

The arithmetic operation section 102-1 that performs the arithmetic operation regarding the X-axis direction includes an arithmetic expression X01-1 in a case where the Y coordinate of the instructed position is in the range of 0 to y1 and the x value of the coordinate of the initial position is in the range of 0 to x1, an arithmetic expression X12-1 in a case where it is in the range of x1 to x2, and an arithmetic expression X23-1 in a case where it is in the range of x2 to x3.

Further, the arithmetic operation section 102-1 includes an arithmetic expression X01-2 in a case where the Y coordinate of the instructed position is in the range of y1 to y2 and the x value of the coordinate of the initial position is in the range of 0 to x1, an arithmetic expression X12-2 in a case where it is in the range of x1 to x2, and an arithmetic expression X23-2 in a case where it is in the range of x2 to x3.

Further, the arithmetic operation section 102-1 includes an arithmetic expression X01-3 in a case where the Y coordinate of the instructed position is in the range of y2 to y3 and the x value of the coordinate of the initial position is in the range of 0 to x1, an arithmetic expression X12-3 in a case where it is in the range of x1 to x2, and an arithmetic expression X23-3 in a case where it is in the range of x2 to x3.

Similarly, the arithmetic operation section 102-2 that performs the arithmetic operation regarding the Y-axis direction includes an arithmetic expression Y01-1 in a case where the X coordinate of the instructed position is in the range of 0 to x1 and the y value of the coordinate of the initial position is in the range of 0 to y1, an arithmetic expression Y12-1 in a case where it is in the range of y1 to y2, and an arithmetic expression Y23-1 in a case where it is in the range of y2 to y3.

Further, the arithmetic operation section 102-2 includes an arithmetic expression Y01-2 in a case where the X coordinate of the instructed position is in the range of x1 to x2 and the y value of the coordinate of the initial position is in the range of y1 to y2, an arithmetic expression Y12-2 in a case where it is in the range of y1 to y2, and an arithmetic expression Y23-2 in a case where it is in the range of y2 to y3.

Further, the arithmetic operation section 102-2 includes an arithmetic expression Y01-3 in a case where the X coordinate of the instructed position is in the range of x2 to x3 and the y value of the coordinate of the initial position is in the range of y1 to y2, an arithmetic expression Y12-3 in a case where it is in the range of y1 to y2, and an arithmetic expression Y23-3 in a case where it is in the range of y2 to y3.

Figure 34:
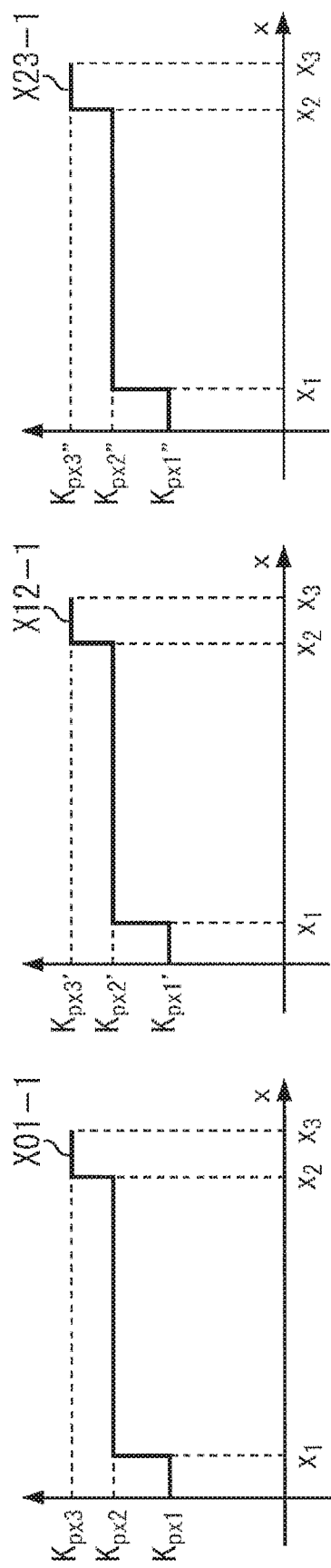
FIG. 34 is a diagram for explaining arithmetic expressions.

The arithmetic operation section 102-1 holds, for example, arithmetic expressions as illustrated in FIG. 34. In FIG. 34, the arithmetic expressions are represented by graphs. A horizontal axis of each graph illustrated in FIG. 34 represents the value of the coordinate x of the instructed position, and a vertical axis represents the value (Kpx) of the gain to be set.

The arithmetic expression X01-1 illustrated in FIG. 34 is an arithmetic expression used when the Y coordinate of the instructed position is in the range of 0 to y1 and the x coordinate of the initial position is in the range of 0 to x1. The arithmetic expression X01-1 illustrated in FIG. 34 is an expression by which a gain Kpx1 is calculated as the gain when the x coordinate of the instructed position is in the range of 0 to x1. Further, according to the arithmetic expression X01-1, a gain Kpx2 is calculated as the gain when the x coordinate of the instructed position is from x1 to x2, and a gain Kpx3 is calculated as the gain when the x coordinate of the instructed position is x2 to x3.

The arithmetic expression X12-1 illustrated in FIG. 34 is an arithmetic expression used when the Y coordinate of the instructed position is in the range of 0 to y1 and the x coordinate of the initial position is in the range of x1 to x2. The arithmetic expression X12-1 illustrated in FIG. 34 is an expression by which a gain Kpx1' is calculated as the gain when the x coordinate of the instructed position is in the range of 0 to x1. Further, according to the arithmetic expression X12-1, a gain Kpx2' is calculated as the gain when the x coordinate of the instructed position is from x1 to x2, and a gain Kpx3' is calculated as the gain when the x coordinate of the instructed position is from x2 to x3.

The arithmetic expression X23-1 illustrated in FIG. 34 is an arithmetic expression used when the Y coordinate of the instructed position is in the range of 0 to y1 and the x coordinate of the initial position is in the range of x2 to x3. The arithmetic expression X23-1 illustrated in FIG. 34 is an expression by which a gain Kpx1" is calculated as the gain when the x coordinate of the instructed position is in the range of 0 to x1. Further, according to the arithmetic expression X23-1, a gain Kpx2" is calculated as the gain when the x coordinate of the instructed position is from x1 to x2, and a gain Kpx3" is calculated as the gain when the x coordinate of the instructed position is from x2 to x3.

It is to be noted that, in a case where the x coordinate of the initial position is x1, an arithmetic expression to be applied may be set to either of the arithmetic expression X01-1 or the arithmetic expression X12-1. It is enough that which of the arithmetic expressions is used is set in advance. As for the other values, a preset arithmetic expression is used for the value of the boundary.

Although not illustrated here, each of the arithmetic expression X01-2, the arithmetic expression X12-2, the arithmetic expression X23-2, the arithmetic expression X01-3, the arithmetic expression X12-3, and the arithmetic expression X23-3 are also set. In other words, in this case, the arithmetic operation section 102 holds nine arithmetic expressions, sets one arithmetic expression on the basis of the X coordinate of the initial position and the Y coordinate of the instructed position, and substitutes the X coordinate of the instructed position into the set arithmetic expression, to thereby set the gain for calculating the control value for controlling the first actuator 37.

Figure 35:
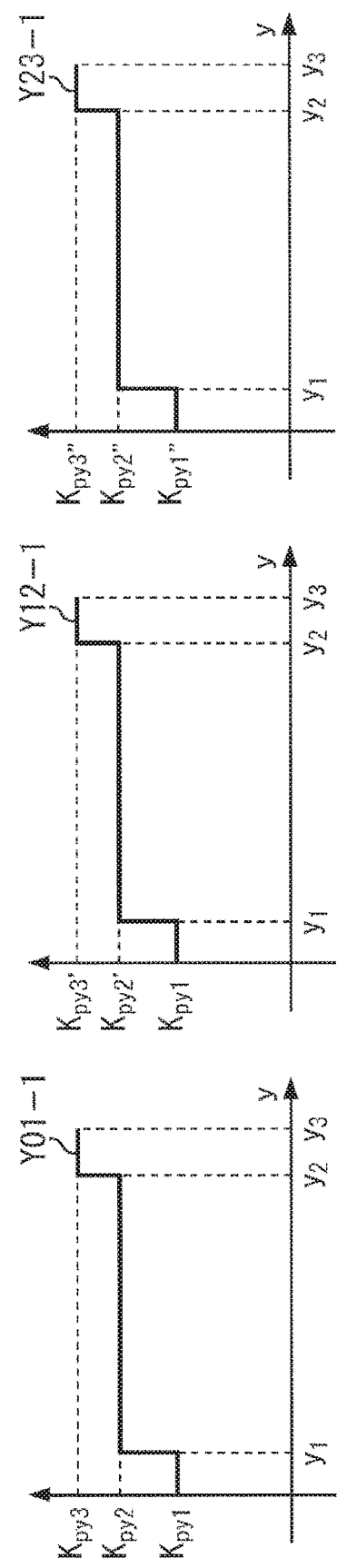
FIG. 35 is a diagram for explaining arithmetic expressions.

The arithmetic operation regarding the Y-axis direction is similar to the arithmetic operation regarding the X-axis direction. The arithmetic operation section 102-2 holds, for example, arithmetic expressions as illustrated in FIG. 35. In FIG. 35, the arithmetic expressions are represented by graphs. A horizontal axis of each graph illustrated in FIG. 35 represents the value of the coordinate y of the instructed position, and a vertical axis represents the value (Kpy) of the gain to be set.

The arithmetic expression Y01-1 illustrated in FIG. 35 is an arithmetic expression used when the X coordinate of the instructed position is in the range of 0 to x1 and the y coordinate of the initial position is in the range of 0 to y1. The arithmetic expression Y01-1 illustrated in FIG. 35 is an expression by which a gain Kpy1 is calculated as the gain when the y coordinate of the instructed position is in the range of 0 to y1. Further, according to the arithmetic expression Y01-1, a gain Kpy2 is calculated as the gain when the y coordinate of the instructed position is from y1 to y2, and a gain Kpy3 is calculated as the gain when the y coordinate of the instructed position is y2 to y3.

The arithmetic expression Y12-1 illustrated in FIG. 35 is an arithmetic expression used when the X coordinate of the instructed position is in the range of 0 to x1 and the y coordinate of the initial position is in the range of y1 to y2. The arithmetic expression Y12-1 illustrated in FIG. 35 is an expression by which a gain Kpy1' is calculated as the gain when the y coordinate of the instructed position is in the range of 0 to y1. Further, according to the arithmetic expression Y12-1, a gain Kpy2' is calculated as the gain when the y coordinate of the instructed position is from y1 to y2, and a gain Kpy3' is calculated as the gain when the y coordinate of the instructed position is y2 to y3.

The arithmetic expression Y23-1 illustrated in FIG. 35 is an arithmetic expression used when the X coordinate of the instructed position is in the range of 0 to x1 and the y coordinate of the initial position is in the range of y2 to y3. The arithmetic expression Y23-1 illustrated in FIG. 35 is an expression by which a gain Kpy1" is calculated as the gain when the y coordinate of the instructed position is in the range of y1 to y2. Further, according to the arithmetic expression Y12-1, a gain Kpy2" is calculated as the gain when the y coordinate of the instructed position is from y1 to y2, and a gain Kpy3" is calculated as the gain when the y coordinate of the instructed position is y2 to y3.

It is to be noted that, in a case where the y coordinate of the initial position is y1, an arithmetic expression to be applied may be set to either of the arithmetic expression Y01-1 or the arithmetic expression Y12-1. It is enough that which of the arithmetic expressions is used is set in advance. As for the other values, a preset arithmetic expression is used for the value of the boundary.

Although not illustrated here, each of the arithmetic expression Y01-2, the arithmetic expression Y12-2, the arithmetic expression Y23-2, the arithmetic expression Y01-3, the arithmetic expression Y12-3, and the arithmetic expression Y23-3 are also set. In other words, in this case, the arithmetic operation section 102 holds nine arithmetic expressions, sets one arithmetic expression on the basis of the Y coordinate of the initial position and the X coordinate of the instructed position, and substitutes the Y coordinate of the instructed position into the set arithmetic expression, to thereby set the gain for calculating the control value for controlling the second actuator 43.

In a case where the arithmetic expressions illustrated in FIGS. 34 and 35 are set, exemplary positions of the arithmetic operations by the arithmetic operation section 102 are described. For example, as illustrated in FIG. 33, a case where the initial position is in the region D and the instructed position is in the region F is described as an example.

Figure 36:
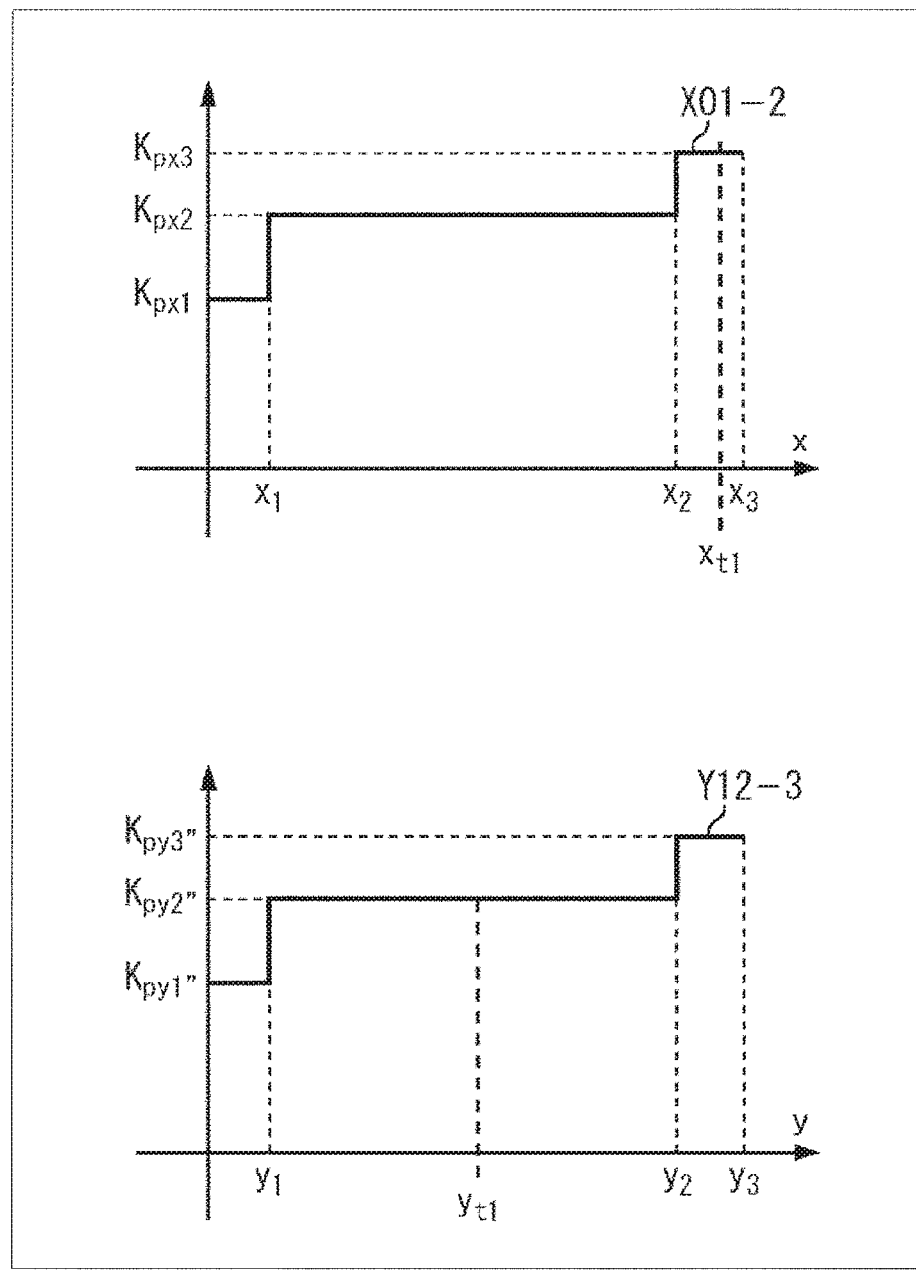
FIG. 36 is a diagram for explaining arithmetic expressions.

Referring to the upper diagram of FIG. 36, the x coordinate (x0) of the initial position is within the region D, in other words, within the range of 0 to x1. Therefore, the arithmetic operation section 102-1 that performs the arithmetic operation in the X-axis direction is set to perform the arithmetic operation using the arithmetic expression X01 as the arithmetic expression. Further, the Y coordinate of the instructed position is within the region F, in other words, within the range from y1 to y2. Therefore, it is set to perform the arithmetic operation using the arithmetic expression X01-2 of the arithmetic expressions X01-1 to 01-3 as the arithmetic expression.

The arithmetic operation section 102-1 uses the arithmetic expression X01-2 to calculate the gain of the x coordinate (xt1) of the instructed position. In this case, as illustrated in FIG. 36, the x coordinate (xt1) of the instructed position is within the region F, in other words, within the range of x2 to x3. Therefore, the gain Kpx3 is calculated as the gain.

Next, reference is made to the lower drawing of FIG. 36. They coordinate (y0) of the initial position is within the region D, in other words, within the range of y1 to y2. Therefore, the arithmetic operation section 102-2 that performs the arithmetic operation in the Y-axis direction is set to perform the arithmetic operation using the calculation expression Y12 as the calculation expression. Further, the X coordinate of the instructed position is within the region F, in other words, within the range of x2 to x3. Therefore, it is set to perform the arithmetic operation using the calculation expression Y12-3 of the arithmetic expressions Y12-1 to 12-3 as the arithmetic expression.

The arithmetic operation section 102-2 uses the arithmetic expression Y12-3 to calculate the gain of the y coordinate (yt1) of the instructed position. In this case, as illustrated in FIG. 36, they coordinate (yt1) of the instructed position is within the area F, in other words, within the range of y1 to y2. Therefore, the gain Kpy2" is calculated as the gain.

As described above, the arithmetic operation section 102 sets the gain at a time when the PID control section 103 calculates a control value related to the control of the actuator on the basis of the initial position and the instructed position.

It is to be noted that the arithmetic expression held by the arithmetic operation section 102 is not limited to the arithmetic expressions for obtaining the graphs illustrated in FIG. 34 and FIG. 35, and other arithmetic expressions can be applied to the present technology.

Figure 37:
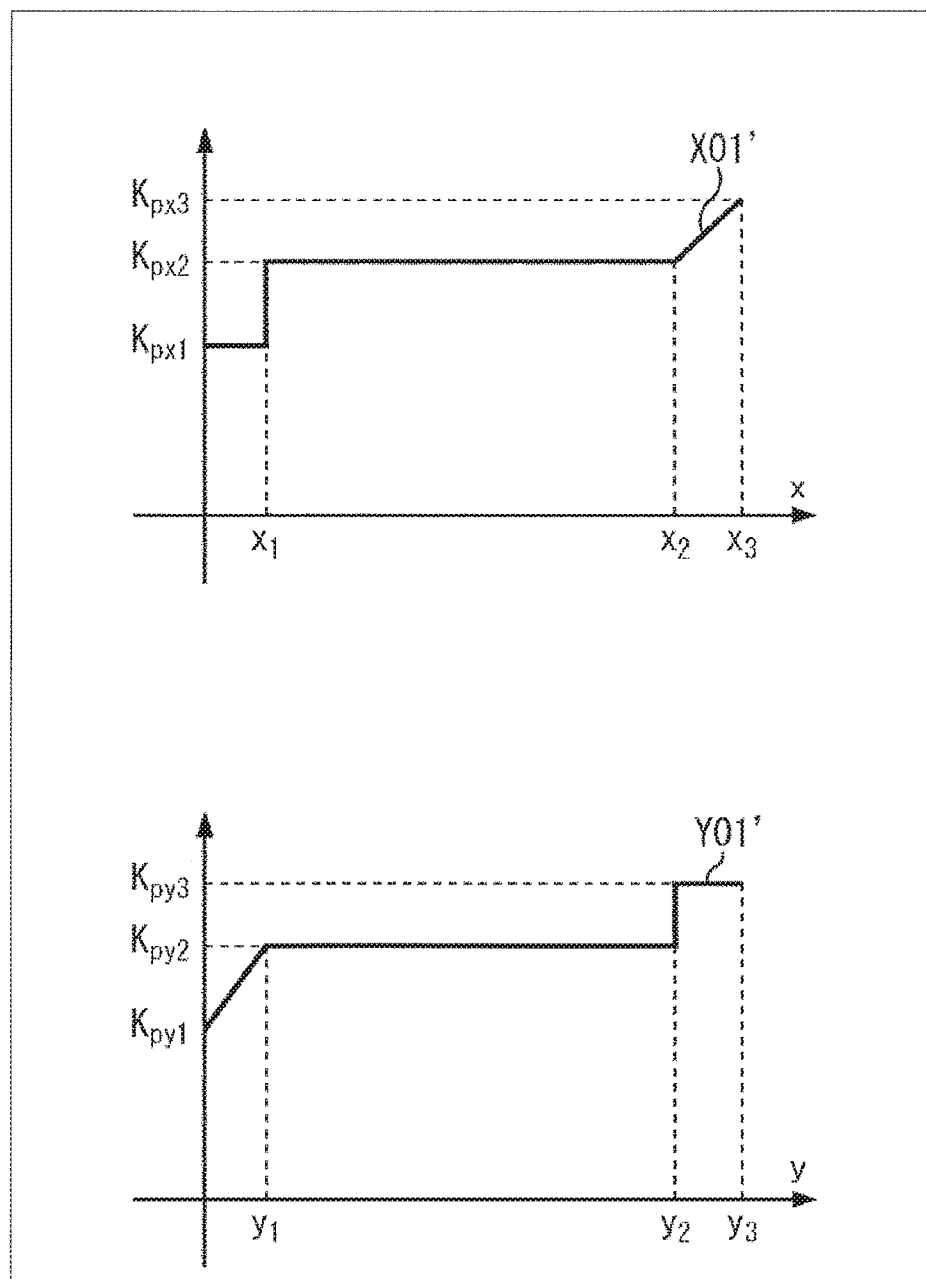
FIG. 37 is a diagram for explaining arithmetic expressions.

FIG. 37 illustrates an example of arithmetic expressions different from the arithmetic expressions illustrated in FIGS. 34 and 35. An example illustrated in the upper drawing of FIG. 37 illustrates another arithmetic expression of the arithmetic expression X01 (which is referred to as an arithmetic expression X01)'. The arithmetic expression X01' illustrated in FIG. 37 differs from the arithmetic expression X01 (arithmetic expression X01-1) illustrated in FIG. 34 in that the gain is set on the basis of a linear function when the x coordinate is in the range of x2 to x3.

Further, the example illustrated in the lower drawing of FIG. 37 illustrates another arithmetic expression of the arithmetic expression Y01 (which is referred to as an arithmetic expression Y01'). The arithmetic expression Y01' illustrated in FIG. 37 differs from the arithmetic expression Y01 (arithmetic expression Y01-1) illustrated in FIG. 35 in that the gain is set on the basis of the linear function when the y coordinate is in the range of y0 to y1.

As described above, the arithmetic operation section 102 may calculate the gain by an arithmetic expression, or a configuration may be provided in which the gain is set by referring to a look-up table (LUT).

FIG. 38 illustrates an example of a table 151. The table 151 is a table in which initial positions are arranged in the horizontal direction and instructed positions are arranged in the vertical direction. In the table 151, a region A, a region B, . . . , and a region I are arranged in the horizontal direction, and the region A, the region B, . . . , and the region I are also arranged in the vertical direction.

In the description of the table 151 illustrated in FIG. 38, "x" in the description of "KXAB", for example, represents the x coordinate, the description "A" represents the initial position, and the description "B" represents the instructed position. That is, in this example, it is described that, when the initial position is within the region A and the instructed position is within the region B, it is the gain KXAB that is read out as the gain corresponding to the x coordinate of the instructed position.

The arithmetic operation section 102 holds the table 151 as illustrated in FIG. 38. When the initial position and the instructed position are inputted, the arithmetic operation section 102 reads the gain described in a part where the initial position and the instructed position of the table 151 overlap.

For example, in a case where the initial position is the region A and the instructed position is the region A, the gain KXAA and the gain KYAA are read out. Further, for example, in a case where the initial position is the region A and the instructed position is the region D, the gain KXAD and the gain KYAD are read out.

The arithmetic operation section 102 may set the gain by holding the table 151 described above and referring to the table 151.

It is to be noted that the arithmetic operation section 102-1 may hold the table 151 in which the gain related to the X coordinate is described, and the arithmetic operation section 102-2 may hold the table 151 in which the gain related to the Y coordinate is described.

Next, operation of the controller 50a will be described by referring to a flow chart of FIG. 39.

In step S101, the controller 50a inputs the initial position and the instructed position. An initial position (x0(t), y0(t))

is provided to each of the arithmetic operation section 102-1 and the arithmetic operation section 102-2. Further, the instructed position (rx(t)) is supplied to the adding section 101-1, the arithmetic operation section 102-1, and the arithmetic operation section 102-2, and the instructed position (ry(t)) is supplied to the adding section 101-2, the arithmetic operation section 102-1, and the arithmetic operation section 102-2.

In step S102, a difference (addition) is calculated in the adding section 101. The adding section 101 calculates the deviation e(t) by subtracting the output from the actuator control section 104 from the instructed position. The adding section 101-1 subtracts the output (actuator control value x(t)) from the actuator controller 104-1 from the instructed position (rx(t)) to calculate the deviation ex(t).

Similarly, the adding section 101-2 subtracts the output (actuator control value y(t)) from the actuator control section 104-2 from the instructed position (ry(t)) to calculate the deviation ey(t).

In step S103, the arithmetic operation section 102 performs an arithmetic operation for setting the gain or a reading from the table. As described above, the arithmetic operation section 102 sets an arithmetic expression to be used on the basis of the initial position and the instructed position, and substitutes the instructed position into the arithmetic expression to calculate the gain. Alternatively, as described above, by referring to the table 151 (FIG. 38), the gain described in a field where the initial position and the instructed position overlap is read out.

The gain set by the arithmetic operation section 102 is supplied to the PID control section 103. In step S104, the PID control section 103 performs PID control. For example, as described above, the PID control section 103 calculates an actuator input value u(t) by performing the arithmetic operation based on the expression (1) using the gain set by the arithmetic operation section 102.

The PID control section 103-1 calculates the control value x(t) for controlling the first actuator 37 that performs the control related to the X-axis direction (first movement direction), and supplies the control value x(t) to the actuator control section 104-1. Similarly, the PID control section 103-2 calculates the control value y(t) for controlling the second actuator 43 that performs the control related to the Y-axis direction (second movement direction), and supplies the control value y(t) to the actuator control section 104-2.

In step S105, the actuator control section 104 controls each actuator to be controlled on the basis of the supplied control value. The actuator control section 104-1 controls the first actuator 37 on the basis of the control value x(t), and the actuator control section 104-2 controls the second actuator 43 on the basis of the control value y(t).

As described above, by controlling the first actuator 37 and the second actuator 43, it is possible to prevent the stopping position accuracy from decreasing in a predetermined region described referring to FIG. 30 and FIG. 31.

As described with reference to FIG. 30 and FIG. 31, there is a possibility that the stop position accuracy is not maintained in a region other than the region E. As described above, however, according to the present embodiment, the control value of the actuator is made different for each region and the control suitable for the region can be performed. It is therefore possible to perform control maintaining the stop position accuracy.

Accordingly, since only the region in which the stop position accuracy within the movement range is maintained has been used, the range in which the shake correction can be performed has been also limited. By applying the present embodiment, however, the stop position accuracy can be maintained in the entire region within the movement range, and the entire region can be used. It is therefore possible to enlarge the range in which the shake correction can be performed.

<Second Configuration and Operation of Controller>

A second configuration and operation of the controller 50 will be described. The controller 50 according to the second embodiment differs from the controller 50 according to the first embodiment in that control is performed taking into account even more detailed movement directions.

Figure 40:
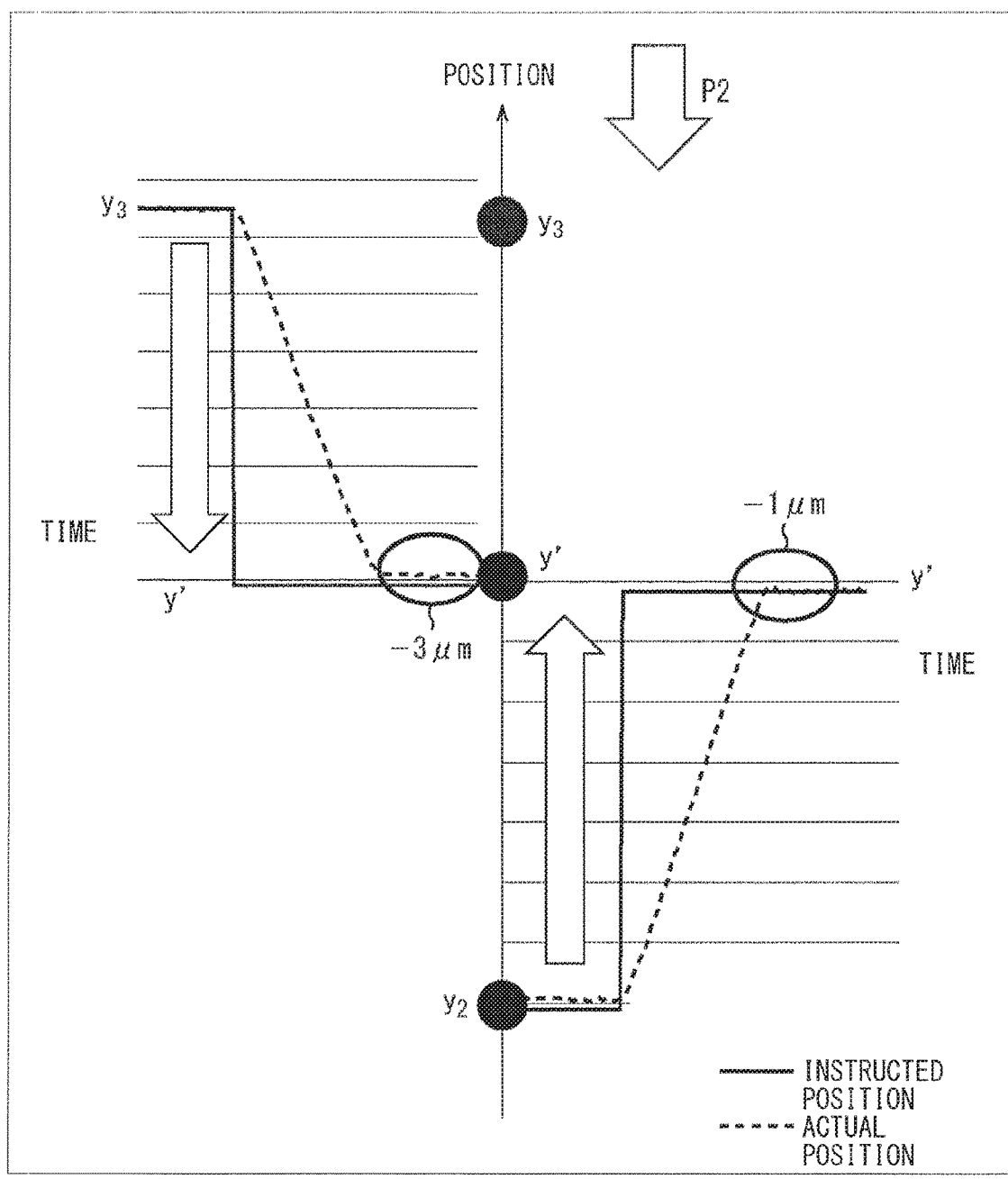
FIG. 40 is a diagram for explaining an influence of a biasing force.

FIG. 40 describes that there is a possibility that the stop position accuracy may differ as a result of a difference in the movement direction. FIG. 40 exemplifies a case where the y coordinate moves within a region of coordinates y3 and y2, for example, the region I (see FIG. 33). A coordinate located between the coordinate y3 and the coordinate y2 is defined as a coordinate y'. Further, here, the description will be continued on the assumption that the X coordinate is unchanged (i.e., movement along the Y axis).

In FIG. 40, a graph indicated by a solid line represents variation in the instructed position, and a graph indicated by a dotted line represents a conversion of the position in accordance with the actual movement. In a case where the second moving body 12 moves from the coordinate y3 to the coordinate y', it moves in the pulling direction (the same direction as the biasing force P2) with respect to the biasing force P2. In this case, the stop position accuracy is represented by a difference between the instructed position and the actual position (actual position). In the example illustrated in FIG. 40, it is indicated that "−3 um" is obtained.

In a case where the second moving body 12 moves from the coordinate y2 to the coordinate y', it moves in the pushing direction (opposite direction to the biasing force P2) with respect to the biasing force P2. In this case, the stop position accuracy is represented by a difference between the instructed position and the actual position (actual position). In the example illustrated in FIG. 40, it is indicated that "−1 um" is obtained.

As described above, there is a possibility that the stop position accuracy differs between the case of moving in the same direction with respect to the biasing force and the case of moving in different direction with respect to the biasing force. Therefore, the movement direction with respect to the biasing force is further considered to perform the control and the control is thereby so performed that such a difference does not occur.

In the description referring to FIG. 40, the description has been provided referring to, as an example, the case where the second moving body 12 moves in the Y-axis direction. Similarly, however, also in the case where the first moving body 11 moves in the X-axis direction, there is a possibility that the stop position accuracy differs between the case of moving in the same direction with respect to the biasing force P1 and the case of moving in different direction with respect to the biasing force P1.

Also in the first embodiment described above, for example, in a case where the initial position is in the region A and the instructed position is in the region F, an arithmetic expression at a time of moving from the region A to the region F is set (gain is read out from the table). Therefore, it is control also taking into consideration the movement direction.

Further, in the second embodiment, also in the case of moving in parallel to the biasing force P1 or in the case of moving in parallel to the biasing force P2, control is performed taking into consideration the movement direction thereof for the reason described with reference to FIG. 40.

It is possible to perform finer control by taking into consideration of the movement direction and making the control value different depending on the movement direction.

Figure 41:
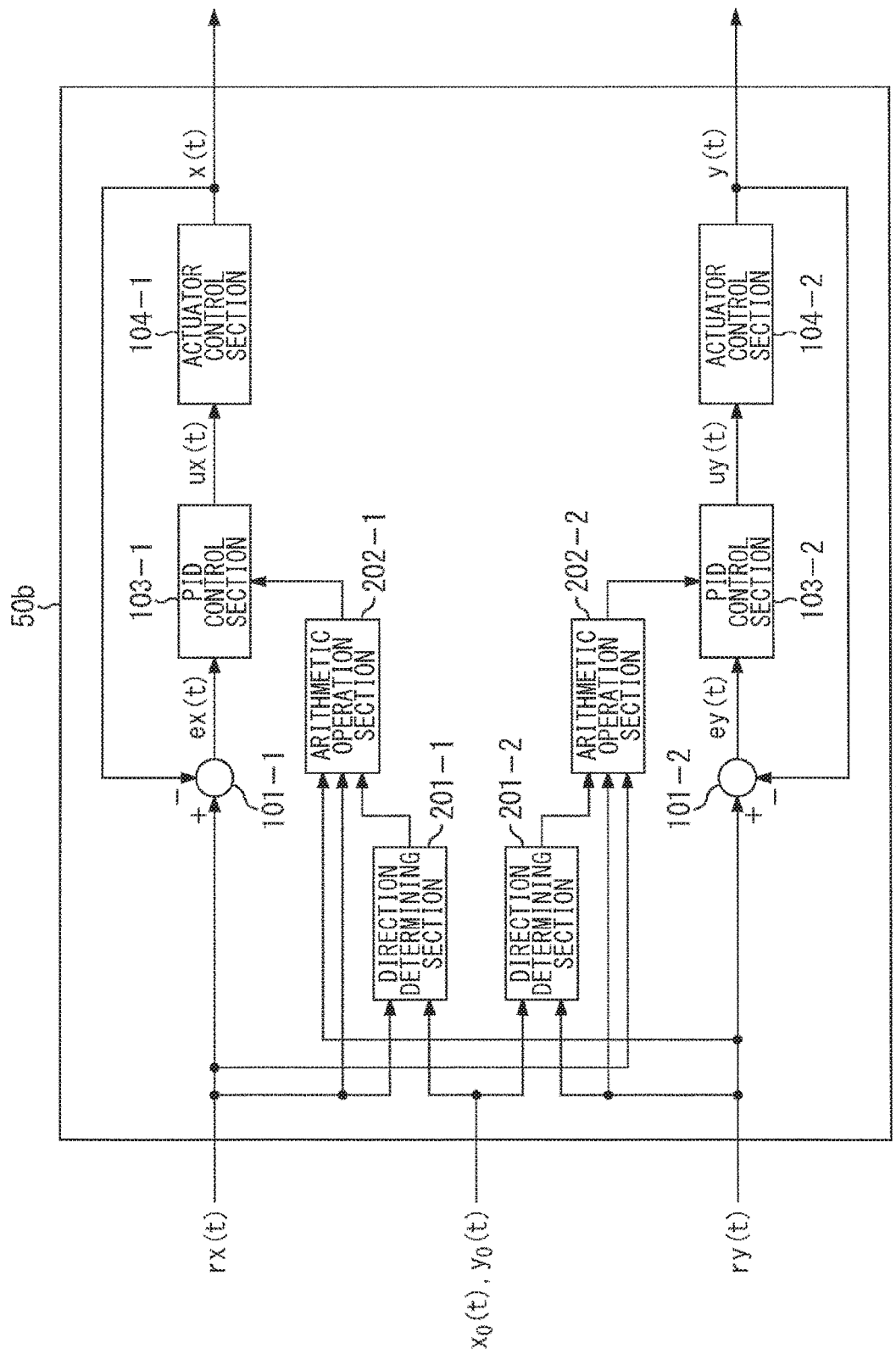
FIG. 41 is a diagram for explaining a configuration of a controller in a second embodiment.

FIG. 41 is a diagram showing a configuration of a controller 50b that performs control taking into consideration the movement directions. The controller 50b in the second embodiment illustrated in FIG. 41 has a similar configuration except that direction determining sections 201-1 and 201-2 are added to the controller 50a in the first embodiment illustrated in FIG. 32. Therefore, description of the similar configuration is appropriately omitted.

Further, the arithmetic operation section 202 is different from the arithmetic operation section 102 in the first embodiment in that the determination result from the direction determining section 201 is inputted to perform an arithmetic operation. Therefore, it is given a different reference numeral and will be described.

The direction determining section 201-1 receives the x coordinate (x0(t)) of the initial position and the x coordinate (rx(t)) of the instructed position. The direction determining section 201-1 is a portion that determines the movement direction in the X-axis direction, and determines the direction from a difference between the x coordinate (x0(t)) of the initial position and the x coordinate (rx(t)) of the instructed position.

The direction determining section 201-2 receives the y coordinate (y0(t)) of the initial position and the y coordinate (ry(t)) of the instructed position. The direction determining section 201-2 is a portion that determines the movement direction in the Y-axis direction, and determines the direction from a difference between the y coordinate (y0(t)) of the initial position and the y coordinate (ry(t)) of the instructed position.

The arithmetic operation section 202 performs an arithmetic operation by taking into consideration also the direction determined by the direction determining section 201. As described with reference to FIGS. 34 and 35, the arithmetic operation section 102 of the controller 50a according to the first embodiment holds an arithmetic expression for each combination of the initial position and the instructed position. Further, the arithmetic operation section 202 of the controller 50b according to the second embodiment holds arithmetic expressions related to different movement directions for different combinations of the initial position and the instructed position.

Figure 42:
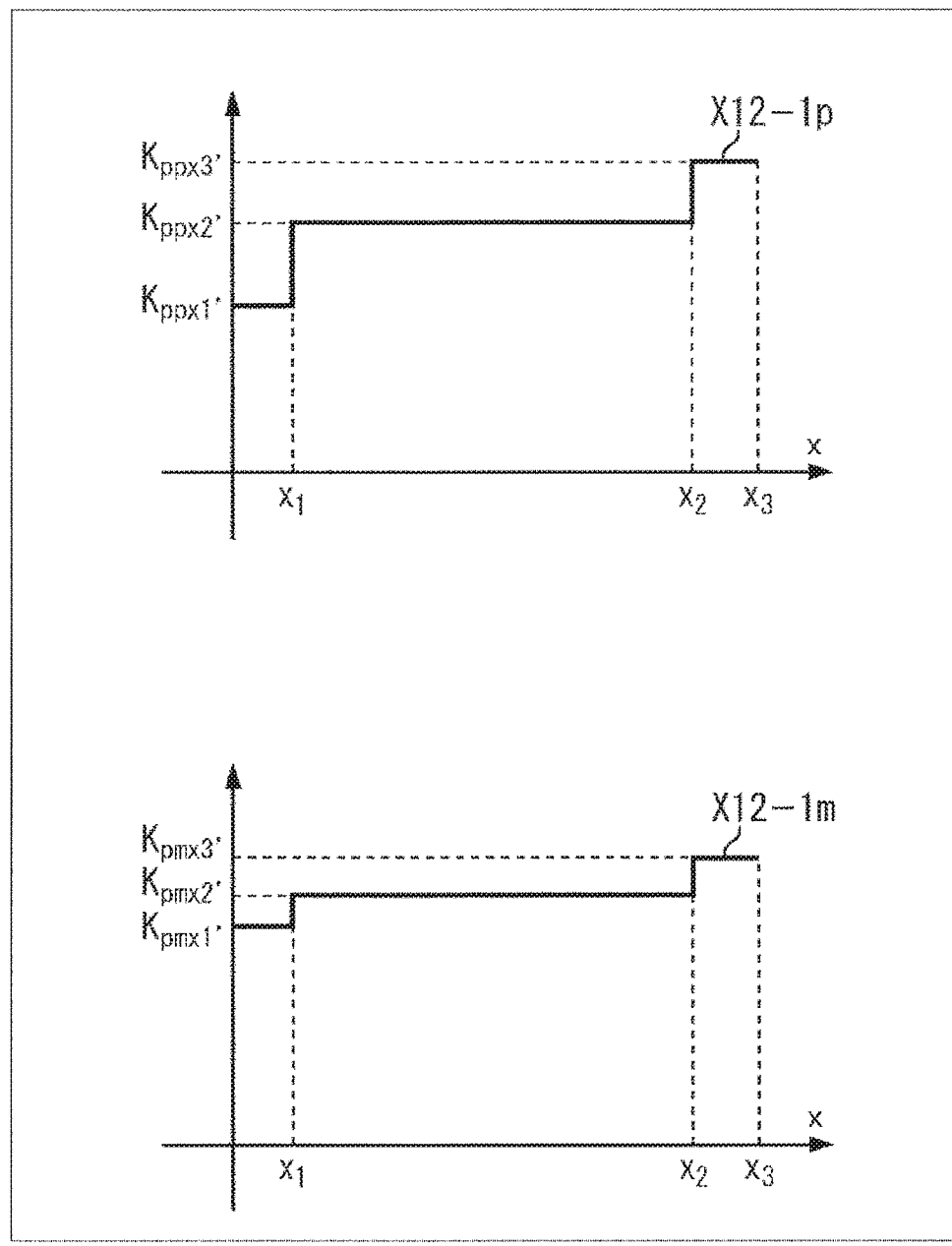
FIG. 42 is a diagram for explaining arithmetic expressions.

For example, as illustrated in FIG. 42, as an arithmetic expression at a time when the Y coordinate of the instructed position is from 0 to y1 and the X coordinate of the initial position is from x1 to x2, an arithmetic expression X12-1p applied at a time of the pushing direction (opposite direction to the biasing force, hereinafter referred to as plus (p)) with respect to the biasing force, and an arithmetic expression X12-1m applied at a time of the pulling direction (same direction as the biasing force, hereinafter referred to as minus (m)) with respect to the biasing force are prepared.

As in the first embodiment, an arithmetic expression X01-1p and an arithmetic expression X01-1m are prepared as the arithmetic expression at a time when the Y coordinate of the instructed position is from 0 to y1 and the X coordinate of the initial position is from 0 to x1. Further, an arithmetic expression X23-1p and an arithmetic expression X23-1m are also prepared as the arithmetic expressions at a time when the X coordinate of the initial position is from x2 to x3.

Further, an arithmetic expression X01-2p and an arithmetic expression X01-2m are prepared as arithmetic expressions at a time when the Y coordinate of the instructed position is from y1 to y2 and the X coordinate of the initial position is from 0 to x1. Further, an arithmetic expression X12-2p and an arithmetic expression X12-2m are prepared as arithmetic expressions at a time when the X coordinate of the initial position is from x1 to x2. Further, an arithmetic expression X23-2p and an arithmetic expression X23-2m are also prepared as arithmetic expressions at a time when the X coordinate of the initial position is from x2 to x3.

Further, an arithmetic expression X01-3p and an arithmetic expression X01-3m are prepared as the arithmetic expression at a time when the Y coordinate of the instructed position is from y2 to y3 and the X coordinate of the initial position is from 0 to x1. Further, an arithmetic expression X12-3p and an arithmetic expression X12-3m are prepared as the arithmetic expression at a time when the X coordinate of the initial position is from x1 to x. Further, an arithmetic expression X23-3p and an arithmetic expression X23-3m are also prepared as the arithmetic expression at a time when the X coordinate of the initial position is from x2 to x3.

Further, similarly, regarding the Y-axis direction, an arithmetic expression Y01-1p and an arithmetic expression Y01-1m are prepared as arithmetic expressions at a time when the X coordinate of the instructed position is from 0 to x1 and the Y coordinate of the initial position is from 0 to y1. Further, an arithmetic expression Y12-1p and an arithmetic expression Y12-1m are prepared as arithmetic expressions at a time when the Y coordinate of the initial position is from y1 to y2. Further, an arithmetic expression Y23-1p and an arithmetic expression Y23-1m are also prepared as arithmetic expressions at a time when the Y coordinate of the initial position is from y2 to y3.

Further, an arithmetic expression Y01-2p and an arithmetic expression Y01-2m are prepared as arithmetic expressions at a time when the X coordinate of the instructed position is from x1 to x2 and the Y coordinate of the initial position is from 0 to y1. Further, an arithmetic expression Y12-2p and an arithmetic expression Y12-2m are prepared as arithmetic expressions at a time when the Y coordinate of the initial position is from y1 to y2. Further, an arithmetic expression Y23-2p and an arithmetic expression Y23-2m are also prepared as arithmetic expressions at a time when the Y coordinate of the initial position is from y2 to y3.

Further, an arithmetic expression Y01-3p and an arithmetic expression Y01-3m are prepared as arithmetic expressions at a time when the X coordinate of the instructed position is from x2 to xt13 and the Y coordinate of the initial position is from 0 to y1. Further, an arithmetic expression Y12-3p and an arithmetic expression Y12-3m are prepared as arithmetic expressions at a time when the Y coordinate of the initial position is from y1 to y2. Further, an arithmetic expression Y23-3p and an arithmetic expression Y23-3m are also prepared as arithmetic expressions at a time when the Y coordinate of the initial position is from y2 to y3.

As described above, the arithmetic operation section 202-1 holds eighteen arithmetic expressions for setting the gain in the x direction, and the arithmetic operation section 202-2 holds eighteen arithmetic expressions for setting the gain in the y direction.

It is to be noted that, in a case where there are expressions that are the same arithmetic expression among the eighteen arithmetic expressions, they are regarded as a single expression to reduce the number of arithmetic expressions. It is not necessary to set eighteen arithmetic expressions.

In a case where a value obtained by subtracting the x coordinate (x0(t)) of the initial position from the x coordinate (rx(t)) of the instructed position is positive, it is determined as the pushing direction (the opposite direction to the biasing force). In a case where the value is negative, it is determined as the pushing direction (the same direction as the biasing force). Further, the arithmetic expression denoted as "p" is selected from the eighteen arithmetic expressions described above.

Further, in a case where a value obtained by subtracting the y coordinate (y0(t)) of the initial position from the y coordinate (ry(t)) of the instructed position is positive, it is determined as the pushing direction (the opposite direction to the biasing force). In a case where the value is negative, it is determined as the pushing direction (the same direction as the biasing force). Further, the arithmetic expression denoted as "m" is selected from the eighteen arithmetic expressions described above.

Figure 43:
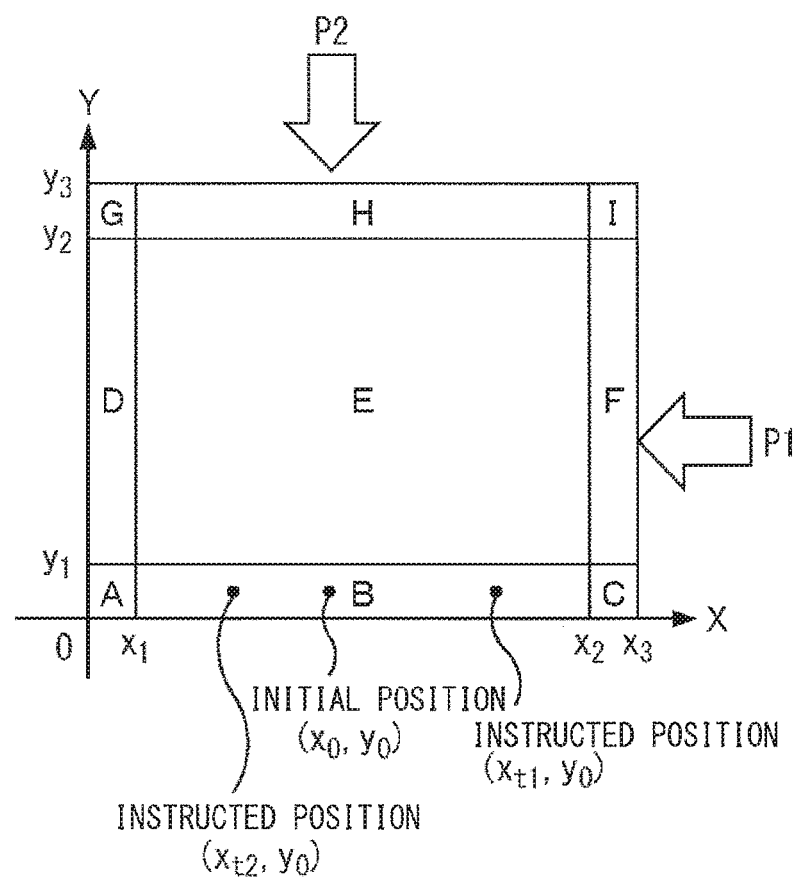
FIG. 43 is a diagram for explaining selection of the arithmetic expression according to a difference in movement direction.

The processes of the direction determining section 201 and the arithmetic operation section 202 are described further for a case where the arithmetic operation section 202 holds the arithmetic expression X12-1p and the arithmetic expression X12-1m as illustrated in FIG. 42 and the instructed position from is instructed from the initial position as illustrated in FIG. 43.

As illustrated in FIG. 43, in a case where the coordinates of the initial position are (x0, y0) in the region B and the coordinates of the instructed direction are (xt1, y0) in the region B, the coordinates x0 and the coordinate xt1 are supplied to the direction determining section 201-1. The direction determining section 201-1 subtracts the coordinate x0 from the coordinate xt1. In this case, since the coordinate xt1>the coordinate x0 holds, the calculation result by the direction determining section 201-1 is calculated to be positive, and it is determined to be the push-direction.

The determination result of the direction determining section 201-1, that is, the determination result of the pushing direction is supplied to the arithmetic operation section 202-1. The arithmetic operation section 202-1 sets an arithmetic expression on the basis of the initial position and the movement direction. In this case, since the Y coordinate of the instructed position is between 0 and y1, and the X coordinate of the initial position is between (the coordinates x1 and x2) in the region B, the arithmetic expression X12-1 is selected. Further, since the movement direction is the pushing direction, the arithmetic expression X12-1p is selected.

Figure 44:
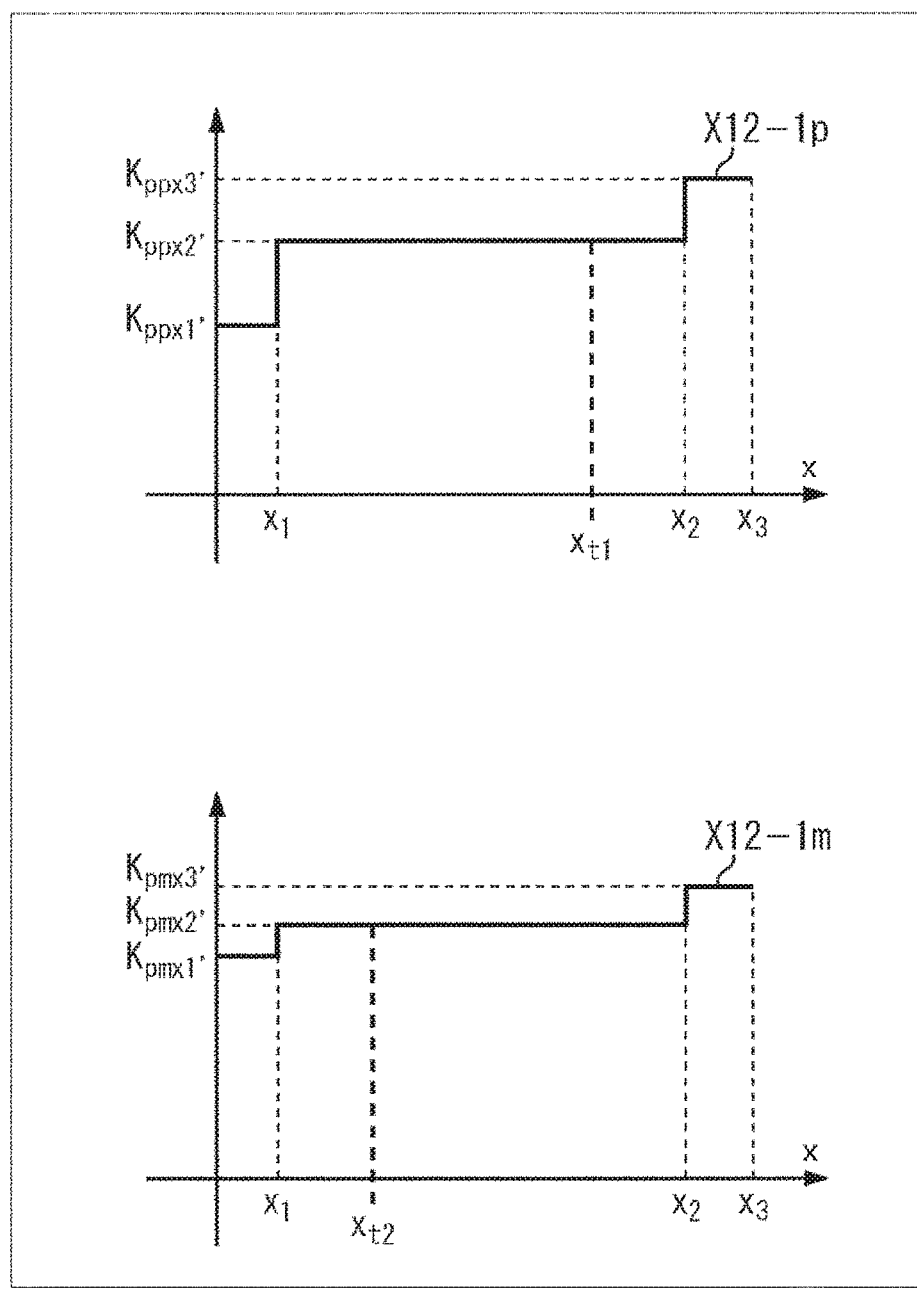
FIG. 44 is a diagram for explaining a calculation of a gain by the arithmetic expression.

As illustrated in the upper drawing of FIG. 44, the arithmetic operation section 202-1 calculates the gain Kppx2' by substituting coordinate xt1 into the arithmetic expression X12-1. It is to be noted that, also in this case, in a case where the PID control section 103-1 performs control on the basis of the expression (1), three gains of Kp, Ki, and Kd are calculated as the gains, and an arithmetic expression for calculating each gain is held in the arithmetic operation section 202-1.

Referring again to FIG. 43, in a case where the coordinate of the initial position is (x0, y0) in the region B and the coordinate of the instructed direction is (xt2, y0) in the region B, the coordinate x0 and the coordinate xt2 are supplied to the direction determining section 201-1. The direction determining section 201-1 subtracts the coordinate x0 from the coordinate xt2. In this case, wince the coordinate xt2<the coordinate x0 holds, the arithmetic operation result by the direction determining section 201-1 is calculated to be negative, and it is determined to be the pulling direction.

The determination result by the direction determining section 201-1, that is, the determination result of the pulling direction is supplied to the arithmetic operation section 202-1. The arithmetic operation section 202-1 sets an arithmetic expression on the basis of the initial position and the movement direction. In this case, since the Y coordinate of the instructed position is between 0 and y1, and the X coordinate of the initial position is between (the coordinates x1 and x2) in the region B, the arithmetic expression X12-1 is selected. Further, since the movement direction is the pulling direction, the arithmetic expression X12-1m is selected.

As illustrated in the lower drawing of FIG. 44, the arithmetic operation section 202-1 calculates the gain Kpmx2' by substituting the coordinate xt2 into the arithmetic expression X12-1m.

As described above, since different arithmetic expressions are used in the case where the movement direction is the pushing direction (plus) and the case where the movement direction is the pulling direction (minus), the value of the gain is also different. In this case, the gain Kppx2' and the gain Kpmx2' have different values.

The direction determining section 201-2 and the arithmetic operation section 202-2 also perform processes related to the Y coordinate and is similar to those of the direction determining section 201-1 and the arithmetic operation section 202-1.

As with the arithmetic operation section 102 in the first embodiment, the arithmetic operation section 202 in the second embodiment can also hold a table and read the gain by referring to the table. As the table, for example, a table 251 as illustrated in FIG. 45 is held.

The table 251 illustrated in FIG. 45 is a table in which initial positions are arranged in the horizontal direction and instructed positions are arranged in the vertical direction, as with the table 151 illustrated in FIG. 38. In the table 251, a region A, a region B, . . . , and a region I are arranged in the horizontal direction, and the region A, the region B, . . . , and the region I are also arranged in the vertical direction. Further, the table 251 is a table in which a gain is written for each movement direction.

In the description of the table 251 illustrated in FIG. 45, for example, "x" in the description of "KXAB+−" represents the x coordinate, the description "A" represents the initial position, the description "B" represents the instructed position, "+" represents a case of moving to the positive side (the value obtained by subtracting the initial position from the movement position is positive) in the x-axis direction, and "−" described later represents the case of moving to the negative side in the Y-axis direction (the value obtained by subtracting the initial position from the movement position is negative).

The arithmetic operation section 202 holds the table 251 as illustrated in FIG. 45. When the initial position, the instructed position, and the direction (plus or minus) are inputted, the arithmetic operation section 202 reads the gain described in a part where the initial position, the instructed position, and the direction of the table 251 overlap.

For example, in a case where the initial position is in the region A, the instructed position is in the region A, the x coordinate moves in the positive direction, and the y coordinate moves in the positive direction, the gain KXAA++ and the gain KYAA++ are read out. Further, in a case where the initial position is in the region A, the instructed position is in the region A, the x coordinate moves in the positive direction, and the y coordinate moves in the negative direction, the gain KXAA+− and the gain KYAA+− are read out.

In the table 251, the gain is not described in the field not detected as the movement direction. For example, in a case where the initial position is within the region A and the instructed position is within the region E, the movement from the region A to the region E is only the movement in the positive direction for both the x coordinate and the y coordinate on the basis of a positional relationship between the region A and the region E, referring to FIG. 43. Therefore, only the gain KXAE++ and the gain KyAE++ are described in the table 251, and the gain KXAE+−, the gain KXAE−, and the like are not described.

The arithmetic operation section 202 may set a gain by holding such a table 251 and referring to the table 251.

Next, operation of the controller 50b will be described referring to the flowchart of FIG. 46.

In step S201, the initial position and the instructed position are inputted to the controller 50b. In step S202, a difference (deviation) is obtained in the adding section 101 using the inputted initial position and the inputted instructed position. The processes of these steps S201 and S202 are processes similar to those in steps S101 and S102 of the flowchart illustrated in FIG. 39.

In step S203, the direction determining section 201 determines the movement direction. As described above, this determination is performed by determining whether the value calculated by subtracting the initial position from the instructed position becomes positive or negative. The result of the determination by the direction determining section 201 (information of being positive or information of being negative) is supplied to the arithmetic operation section 202.

In step S204, the arithmetic operation section 202 calculates the gain by arithmetic operation, or reads the gain by referring to the table. The process in step S204 is a process similar to that in step S103 of the flowchart illustrated in FIG. 39. The process in step S204, however, differs from that in step S103 in that the directional information (plus or minus) is also used to set the arithmetic expression or to read out the corresponding gain from the table.

Figure 39:
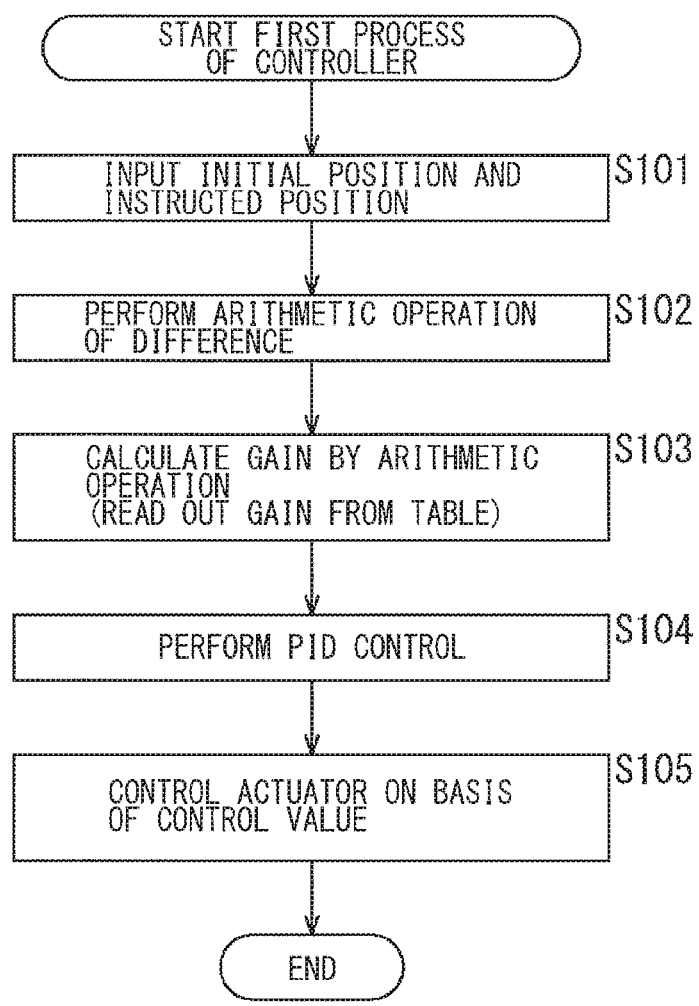
FIG. 39 is a flowchart for explaining operation of the controller in the first embodiment.

The processes in steps S205 and S206 are processes similar to those in steps S104 and S105 of the flowchart illustrated in FIG. 39. Therefore, description thereof is omitted.

As described above, by controlling the first actuator 37 and the second actuator 43, it is possible to prevent the stopping position accuracy from decreasing in a predetermined region described referring to FIG. 30 and FIG. 31.

As described with reference to FIG. 30 and FIG. 31, there is a possibility that the stop position accuracy is not maintained in a region other than the region E. As described above, however, according to the present embodiment, the control value of the actuator is made different for each region and the control suitable for the region can be performed. It is therefore possible to perform control maintaining the stop position accuracy.

Further, since the movement direction is also determined, and different control values are calculated depending on whether the movement direction is the same direction or the opposite direction with respect to the biasing force to control the actuator. It is therefore possible to perform the movement to the movement position with higher accuracy.

Accordingly, since only the region in which the stop position accuracy within the movement range is maintained has been used, the range in which the shake correction can be performed has been also limited. By applying the present embodiment, however, the stop position accuracy can be maintained in the entire region within the movement range, and the entire region can be used. It is therefore possible to enlarge the range in which the shake correction can be performed.

<Third Configuration and Operation of Controller>

A third configuration and operation of the controller 50 will be described. The configuration and operation of the controller 50 according to the third embodiment differ from those of the controller 50 according to the first embodiment or the second embodiment in that control is performed taking into consideration a driving voltage for driving the actuator.

Figure 47:
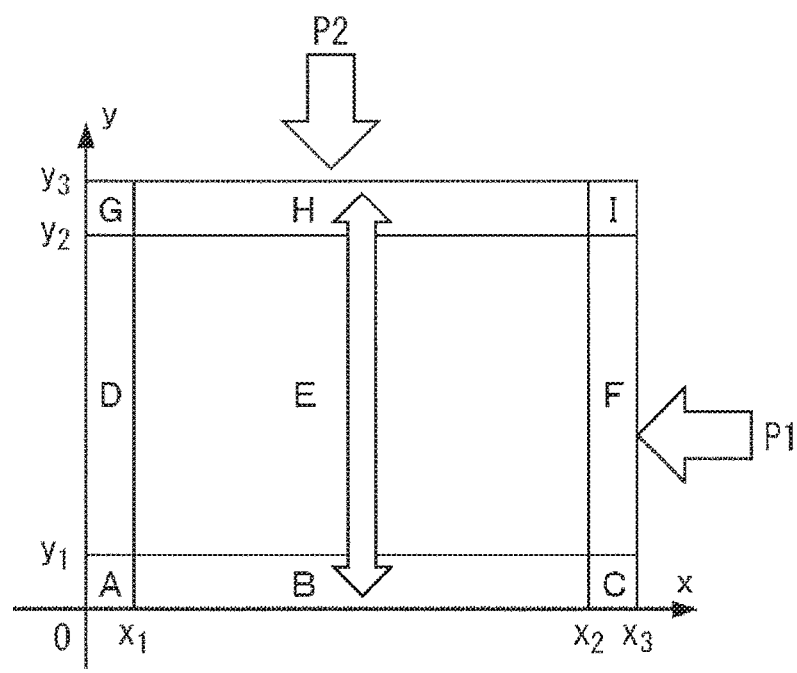
FIG. 47 is a diagram for explaining setting of a driving voltage value on the basis of a region.

A case where the second moving body 12 moves as illustrated in FIG. 47 is considered. As illustrated in FIG. 47, in a case where the second moving body 12 moves in the Y-axis direction, if the second actuator 43 is controlled with the same driving voltage, there is a possibility that the same control cannot be performed as a result of an influence of the biasing force P2 depending on the region in which the second moving body 12 moves. For example, in a case where the second actuator 43 is controlled with the same driving voltage, there is a possibility that a difference occurs in that the moving speed is high in a region where the influence of the biasing force P2 is weak, and the moving speed is low in a region where the influence of the biasing force P2 is strong.

Figure 48:
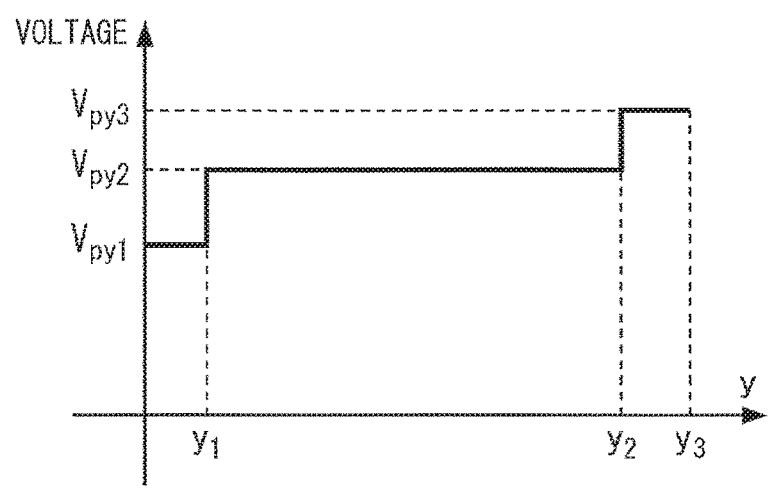
FIG. 48 is a diagram for explaining the setting of the driving voltage value.

Therefore, as illustrated in FIG. 48, the second actuator 43 may be controlled by varying the driving voltage of the second actuator 43 depending on the regions. Referring to FIG. 48, in a case where the Y coordinate is in the range of 0 to y1, the second actuator 43 is controlled with a driving voltage Vpy1. In a case where the Y coordinate is in the range of y1 to y2, the second actuator 43 is controlled with a driving voltage Vpy2. In a case where the Y coordinate is in the range of y2 to y3, the second actuator 43 is controlled by a driving voltage Vpy3.

The driving voltage for controlling the first actuator 37 is also controlled by a driving voltage that differs for each area, as with the driving voltage for controlling the second actuator 43.

In this manner, the actuators are driven with different driving voltages for different regions. This makes it possible to perform uniform control without occurrence of the movement speed being different for each region.

The setting of the driving voltages as illustrated in FIG. 48 may be set by using an arithmetic expression for obtaining graphs as illustrated in FIG. 48, or may be set by referring to table, as with the setting of the gain described above. Further, as in the case of the gain setting described above, different arithmetic expressions may be used for respective regions of the initial position (a plurality of arithmetic expressions may be prepared).

By setting the driving voltages of the actuator depending on the region in which the first moving body 11 or the second moving body 12 moves, it is possible to perform finer control.

Figure 49:
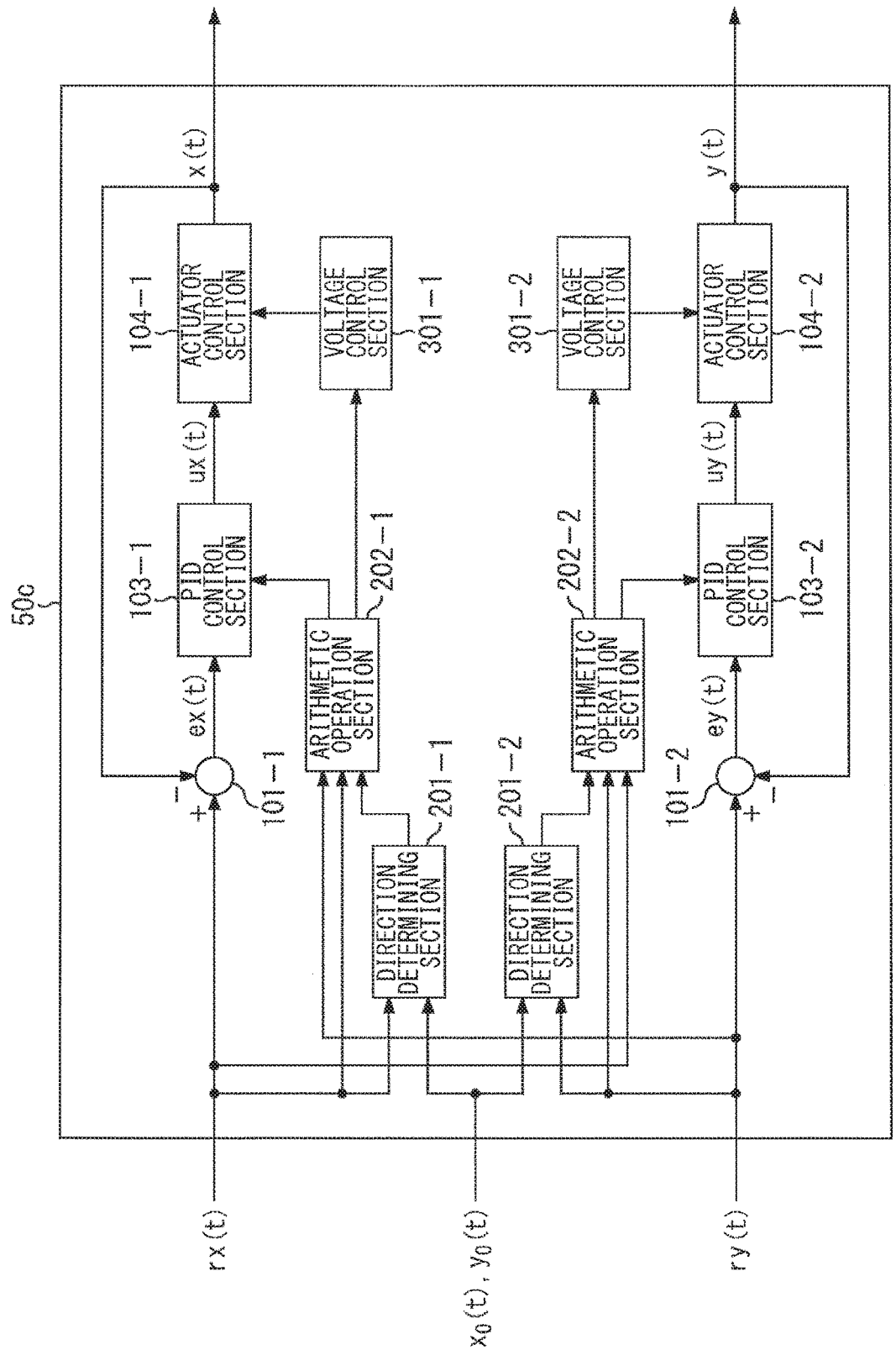
FIG. 49 is a diagram for explaining a configuration of a controller in a third embodiment.

FIG. 49 is a diagram illustrating a configuration of a controller 50c that performs control also taking into consideration the driving voltage of the actuator. The controller 50c in the third embodiment illustrated in FIG. 49 has a similar configuration except that voltage control sections 301-1 and 301-2 are added to the controller 50b in the second embodiment illustrated in FIG. 41. Therefore, description of the similar configuration is appropriately omitted.

The voltage control section 301-1 switches the driving voltage of the actuator on the basis of an instruction from the arithmetic operation section 202-1. As with the gain setting, the arithmetic operation section 202-1 sets an arithmetic expression on the basis of the initial position and the instructed position, calculates a driving voltage value on the basis of the set arithmetic expression, and supplies the calculated driving voltage value to the voltage control section 301-1.

Alternatively, as with the gain setting, the arithmetic operation section 202-1 refers to a table, reads the corresponding driving voltage value on the basis of the initial position and the instructed position, and supplies the read driving voltage value to the voltage control section 301-1.

The voltage control section 301-1 instructs the actuator control section 104-1 to control the actuator with the supplied driving voltage. The actuator controller 104-1 controls the first actuator 37 with the instructed driving voltage.

Similarly, the voltage controller 301-2 switches a driving voltage of the actuator on the basis of an instruction from the arithmetic operation section 202-2. As with the gain setting, the arithmetic operation section 202-2 sets an arithmetic expression on the basis of the initial position and the instructed position, calculates a driving voltage value on the basis of the set arithmetic expression, and supplies the calculated driving voltage value to the voltage control section 301-2.

Alternatively, as with the gain setting, the arithmetic operation section 202-2 refers to a table, reads the corresponding driving voltage value on the basis of the initial position and the instructed position, and supplies the read driving voltage value to the voltage control section 301-2.

The voltage control section 301-2 instructs the actuator control section 104-2 to control the actuator with the supplied driving voltage. The actuator controller 104-2 controls the second actuator 43 with the instructed driving voltage.

In a case where the arithmetic operation section 202 sets the driving voltage by referring to a table, the table can be a table 351 as illustrated in FIG. 50.

The table 351 illustrated in FIG. 50 is a table in which driving voltages are added to the table 251 in the second embodiment illustrated in FIG. 45. For example, in a case where the initial position is in the region A and a designated position is in the region A, a driving voltage value VAA is read out. Further, for example, in a case where the initial position is in the region A and the designated position is in the region B, a driving voltage value VAB is read out.

As described above, the driving voltage value is set from the initial position and the designated position.

It is to be noted that, here, an example has been described in which the same driving voltage is set irrespective of the movement direction of the first moving body 11 or the second moving body 12. However, the driving voltage may be set differently depending on the movement direction.

For example, in the table 351 illustrated in FIG. 50, in a case where the initial position and the initial position instructed position are in the region A, a gain KXAA+++, a gain KXAA+−, a gain KXAA−+, and a gain KXAA−− are set as the gains, and one driving voltage value VAA is associated with these four gains.

In such a case, the driving voltage value VAA++ may be associated with the gain KXAA++, the driving voltage value VAA++ may be associated with the gain KXAA+−, the driving voltage value VAA++ may be associated with the gain KXAA+, and the driving voltage value VAA−− may be associated with the gain KXAA−−.

Further, here, description has been given referring to, as an example, a case where a function (voltage control section 301) for setting the driving voltage value is added to the controller 50b in the second embodiment. However, a function (voltage control section 301) for setting the driving voltage value may be added to the controller 50a in the first embodiment.

Figure 51:
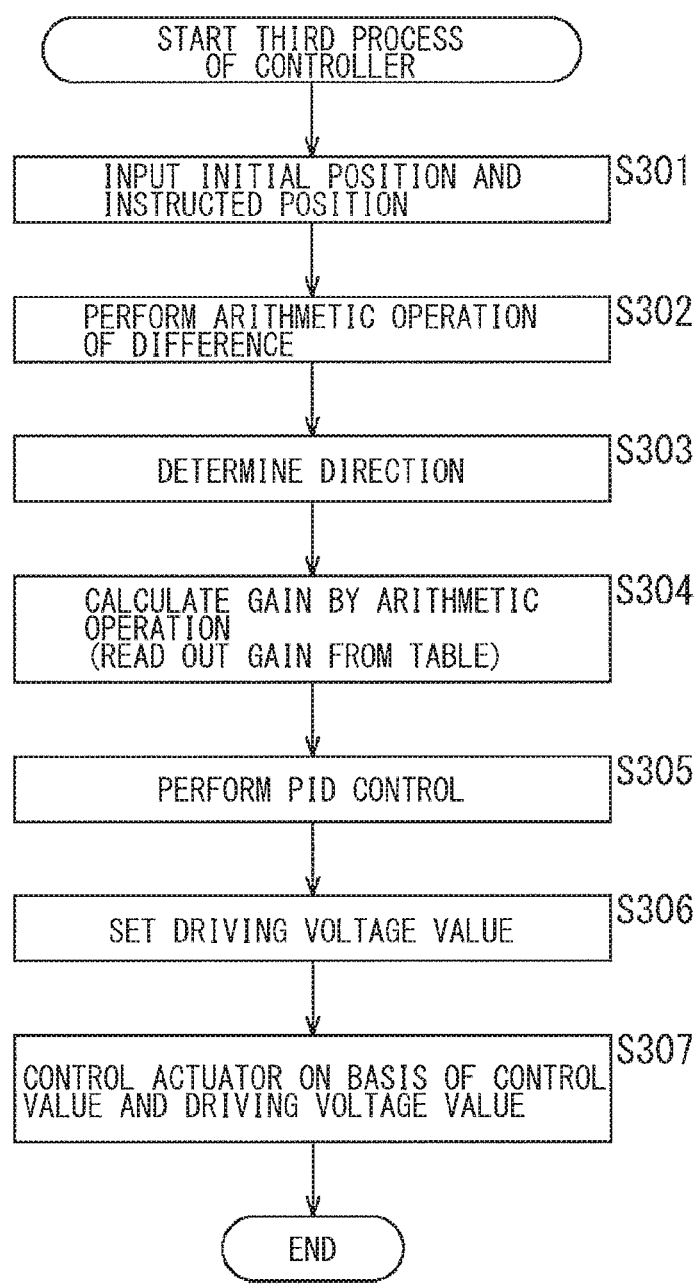
FIG. 51 is a flowchart for explaining operation of the controller in the third embodiment.

Next, the operation of the controller 50c will be described referring to the flowchart of FIG. 51.

Figure 46:
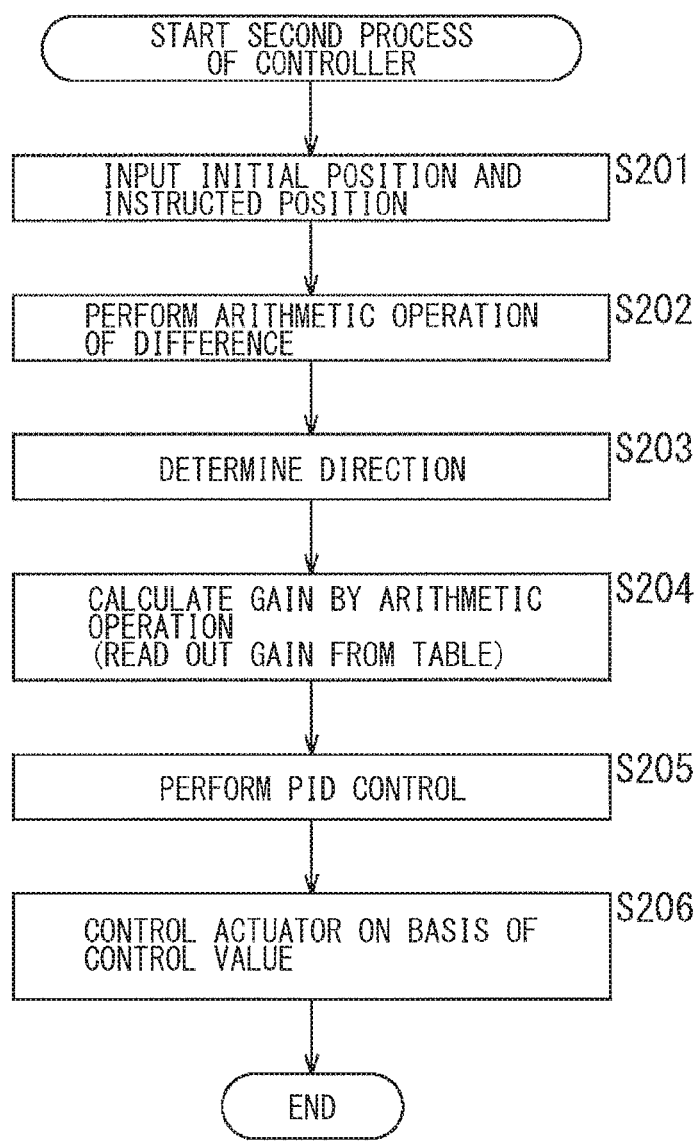
FIG. 46 is a flowchart for explaining operation of the controller in the second embodiment.

The processes in steps S301 to S305 are the same as the processes in steps S201 to S205 in the flowchart illustrated in FIG. 46. Therefore, description thereof is omitted.

In the process up to step S305, the PID control section 103 supplies the control value for controlling the actuator calculated with the gain based on the initial position and the designated position to the actuator control section 104.

In step S306, a driving voltage value is set by the arithmetic operation section 202, and the set driving voltage value is supplied to the voltage control section 301. Thereafter, the voltage control section 301 instructs the actuator controller 104 to control the actuator with the set driving voltage.

In step S307, the actuator control section 104 controls the actuator (first actuator 37 or second actuator 43) on the basis of the control value from the PID control section 103 and the driving voltage value from the voltage control section 301.

As described above, by controlling the first actuator 37 and the second actuator 43, it is possible to prevent the stopping position accuracy from decreasing in a predetermined region described referring to FIG. 30 and FIG. 31.

As described with reference to FIG. 30 and FIG. 31, there is a possibility that the stop position accuracy is not maintained in a region other than the region E. As described above, however, according to the present embodiment, the control value of the actuator is made different for each region and the control suitable for the region can be performed. It is therefore possible to perform control maintaining the stop position accuracy.

In a case where the movement direction is also determined (combined with the second embodiment), a different control value is calculated depending on whether the movement direction is the same direction or the opposite direction with respect to the biasing force to control the actuator. It is therefore possible to perform the movement to the movement position with higher accuracy.

Further, the driving voltage value for controlling the actuator is made different depending on the moving region. In other words, depending on whether the movement direction is the same direction or the opposite direction with respect to the biasing force, different driving voltage values are set to control the actuator. It is therefore possible to perform the movement to the movement position with higher accuracy and uniformly.

Accordingly, since only the region in which the stop position accuracy within the movement range is maintained has been used, the range in which the shake correction can be performed has been also limited. By applying the present embodiment, however, the stop position accuracy can be maintained in the entire region within the movement range, and the entire region can be used. It is therefore possible to enlarge the range in which the shake correction can be performed.

It is to be noted that the first actuator 37 and the second actuator 43 controlled by the controller 50 described above can be an actuator using an ultrasonic motor, a voice coil motor, a stepping motor, a DC (Direct-Current) motor, or the like, or an actuator using a shape-memory-alloy wire.

Further, as a transmission drive mechanism for transmitting the drive from the first actuator 37 or the second actuator 43 to the first moving body 11 or the second moving body 12, a CAM mechanism, a wire suspension mechanism, a rack and pinion mechanism, a belt mechanism, or the like can be applied.

As described above, the present technology can be applied to the shake correction device 9 that performs the shake correction, but can also be applied to a technique other than the shake correction. For example, the present technology can be applied to a super-resolution technique.

The super-resolution technique is a technique that increases the resolution by shifting pixels. For example, the super-resolution technique can be achieved by shifting pixels by using a camera shake correction mechanism of sensor shift.

As a technique using a camera shake correction mechanism of the sensor shift, a sensor shift mechanism used for camera shake correction is applied, four images are photographed by moving the sensor pixel by pixel, and color information of each of RGB is obtained at each pixel position.

According to this technique, although the output size is the same as that of usual photographing, the sharpness and texture reproduction of the image can be improved. Further, according to this technique, a color sensor of three layers of RGB can be reproduced in a pseudo manner.

Further, it can also be applied to a technique of generating a high resolution photograph equivalent to a 40M sensor on the basis of an image taken eight times while moving the sensor in units of 0.5 pixels. According to this technique, it is possible to realize a high-resolution shot function suitable for a scene in which a higher-resolution photograph is required, such as an artwork or a landscape.

It is also possible to apply the above-described technique to such sensor shift, and perform photographing while shifting the sensor. By applying the present technology, it is possible to enlarge the range in which shift is performed by the sensor shift, and to perform the shift in the sensor shift with high accuracy.

<Regarding Recording Medium>

The series of processes described above can be executed by hardware or can be executed by software. In a case where the series of processes is executed by software, a program including the software is installed in the computer. Here, the computer encompasses, a computer incorporated in dedicated hardware, or, for example, a general-purpose personal computer which can execute various functions by installing various programs, etc.

Figure 52:
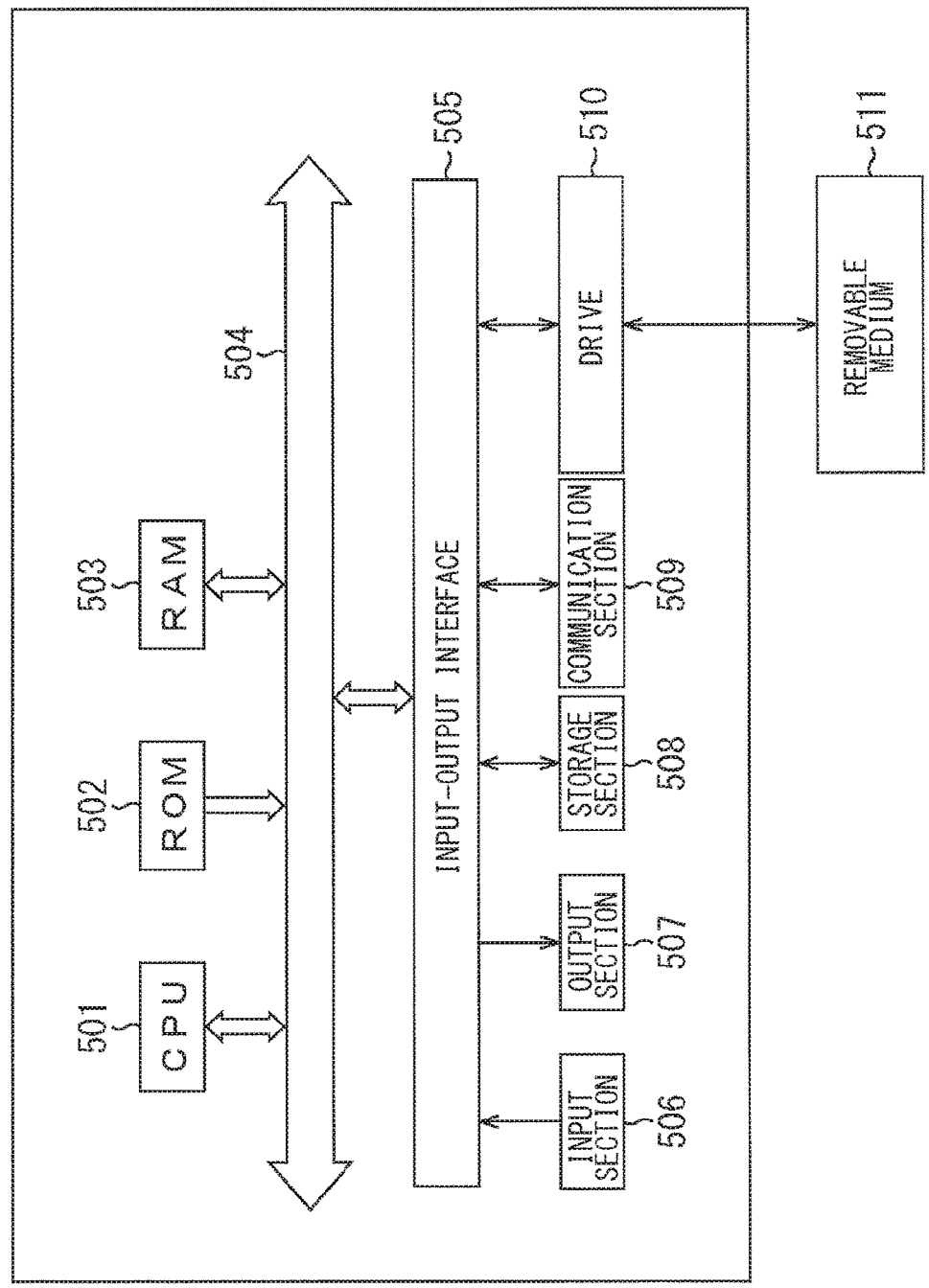
FIG. 52 is a diagram for explaining a recording medium.

FIG. 52 is a block diagram illustrating a configuration example of hardware of a computer that executes the series of processes described above by means of a program. In the computer, a CPU (Central Processing Unit) 501, a ROM (Read Only Memory) 502, and a RAM (Random Access Memory) 503 are coupled to each other by a bus 504. An input-output interface 505 is further coupled to the bus 504. An input section 506, an output section 507, a storage section 508, a communication section 509, and a drive 510 are coupled to the input-output interface 505

The input section 506 includes a keyboard, a mouse, a microphone, and the like. The output unit 507 includes a display, a speaker, and the like. The storage section 508 includes a hard disk, a non-volatile memory, and the like. The communication section 509 includes a network interface and the like. The drive 510 drives a removable medium 511 such as a magnetic disk, an optical disk, a magneto-optical disk, or a semiconductor memory.

In the computer configured as described above, for example, the CPU 501 loads a program stored in the storage section 508 into the RAM 503 via the input-output interface 505 and the bus 504, and executes the program, thereby performing the series of processes described above.

The program to be executed by the CPU 501 can be provided by being recorded in the removable medium 511 as a package medium or the like, for example. Further, the program can be provided via a wired or wireless transmission medium such as a local area network, the Internet, or digital satellite broadcasting.

On a computer, the program can be installed on the storage section 508 via the input-output interface 505 by mounting the removable medium 511 to the drive 510. Further, the programs may also be received by the communication section 509 and installed on the storage section 508 via wired or wireless transmission media. Alternatively, the program can be installed in advance in the ROM 502, the storage section 508, or the like.

It is to be noted that the program executed by the computer may be a program that performs the processes in time series in the order described in this specification, or may be a program that performs the processes in parallel or at necessary timing such as when a call is made.

<Example of Application to Endoscopic Surgery System>

The technology (the present technology) according to the present disclosure can be applied to various products. For example, the technology according to the present disclosure may be applied to an endoscopic surgery system.

Figure 53:
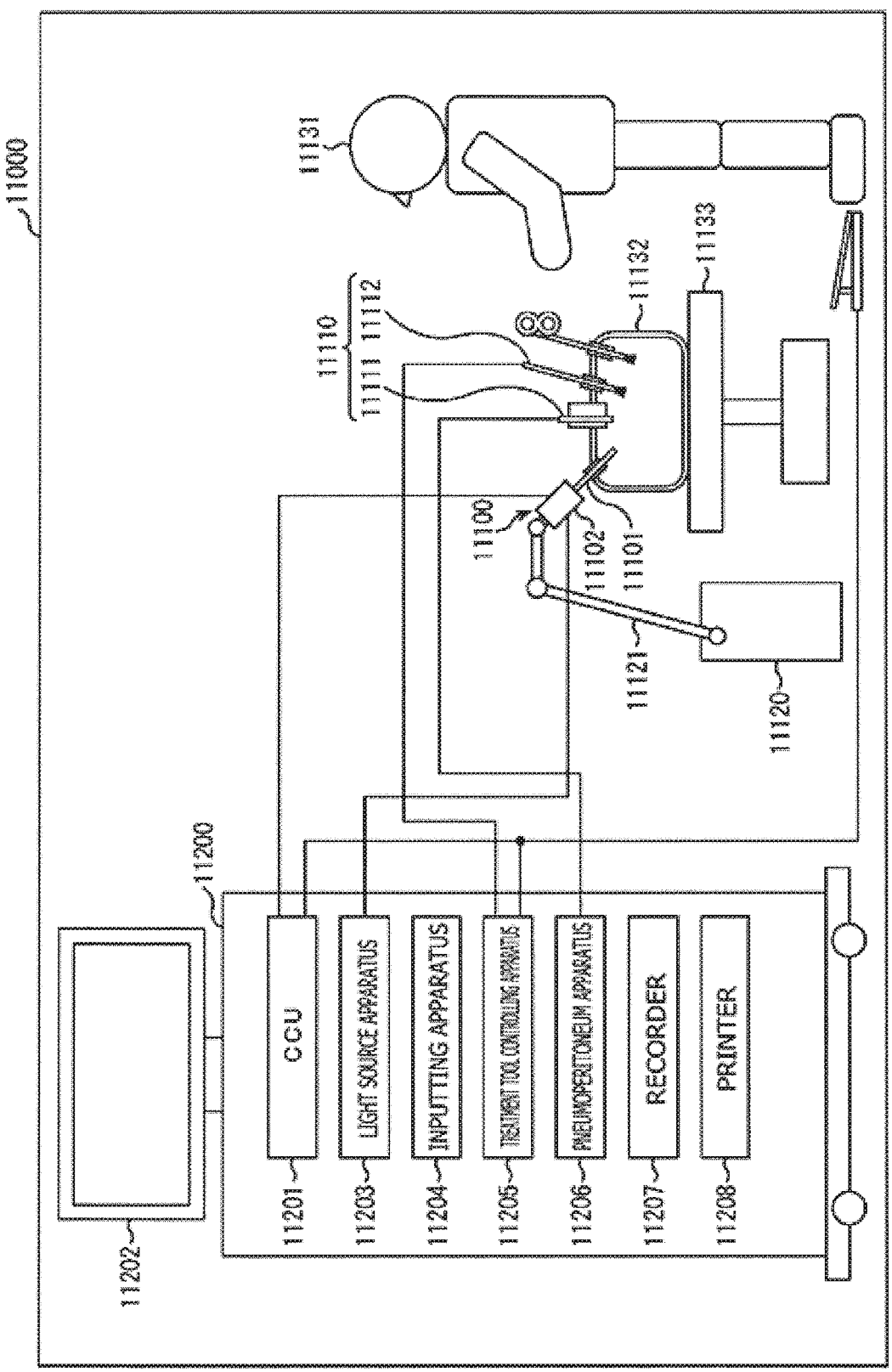
FIG. 53 is a view depicting an example of a schematic configuration of an endoscopic surgery system.

FIG. 53 is a view depicting an example of a schematic configuration of an endoscopic surgery system to which the technology according to an embodiment of the present disclosure (present technology) can be applied.

In FIG. 53, a state is illustrated in which a surgeon (medical doctor) 11131 is using an endoscopic surgery system 11000 to perform surgery for a patient 11132 on a patient bed 11133. As depicted, the endoscopic surgery system 11000 includes an endoscope 11100, other surgical tools 11110 such as a pneumoperitoneum tube 11111 and an energy device 11112, a supporting arm apparatus 11120 which supports the endoscope 11100 thereon, and a cart 11200 on which various apparatus for endoscopic surgery are mounted.

The endoscope 11100 includes a lens barrel 11101 having a region of a predetermined length from a distal end thereof to be inserted into a body cavity of the patient 11132, and a camera head 11102 connected to a proximal end of the lens barrel 11101. In the example depicted, the endoscope 11100 is depicted which includes as a rigid endoscope having the lens barrel 11101 of the hard type. However, the endoscope 11100 may otherwise be included as a flexible endoscope having the lens barrel 11101 of the flexible type.

The lens barrel 11101 has, at a distal end thereof, an opening in which an objective lens is fitted. A light source apparatus 11203 is connected to the endoscope 11100 such that light generated by the light source apparatus 11203 is introduced to a distal end of the lens barrel 11101 by a light guide extending in the inside of the lens barrel 11101 and is irradiated toward an observation target in a body cavity of the patient 11132 through the objective lens. It is to be noted that the endoscope 11100 may be a forward-viewing endoscope or may be an oblique-viewing endoscope or a side-viewing endoscope.

An optical system and an image pickup element are provided in the inside of the camera head 11102 such that reflected light (observation light) from the observation target is condensed on the image pickup element by the optical system. The observation light is photo-electrically converted by the image pickup element to generate an electric signal corresponding to the observation light, namely, an image signal corresponding to an observation image. The image signal is transmitted as RAW data to a CCU 11201.

The CCU 11201 includes a central processing unit (CPU), a graphics processing unit (GPU) or the like and integrally controls operation of the endoscope 11100 and a display apparatus 11202. Further, the CCU 11201 receives an image signal from the camera head 11102 and performs, for the image signal, various image processes for displaying an image based on the image signal such as, for example, a development process (demosaic process).

The display apparatus 11202 displays thereon an image based on an image signal, for which the image processes have been performed by the CCU 11201, under the control of the CCU 11201.

The light source apparatus 11203 includes a light source such as, for example, a light emitting diode (LED) and supplies irradiation light upon imaging of a surgical region to the endoscope 11100.

An inputting apparatus 11204 is an input interface for the endoscopic surgery system 11000. A user can perform inputting of various kinds of information or instruction inputting to the endoscopic surgery system 11000 through the inputting apparatus 11204. For example, the user would input an instruction or a like to change an image pickup condition (type of irradiation light, magnification, focal distance or the like) by the endoscope 11100.

A treatment tool controlling apparatus 11205 controls driving of the energy device 11112 for cautery or incision of a tissue, sealing of a blood vessel or the like. A pneumoperitoneum apparatus 11206 feeds gas into a body cavity of the patient 11132 through the pneumoperitoneum tube 11111 to inflate the body cavity in order to secure the field of view of the endoscope 11100 and secure the working space for the surgeon. A recorder 11207 is an apparatus capable of recording various kinds of information relating to surgery. A printer 11208 is an apparatus capable of printing various kinds of information relating to surgery in various forms such as a text, an image or a graph.

It is to be noted that the light source apparatus 11203 which supplies irradiation light when a surgical region is to be imaged to the endoscope 11100 may include a white light source which includes, for example, an LED, a laser light source or a combination of them. Where a white light source includes a combination of red, green, and blue (RGB) laser light sources, since the output intensity and the output timing can be controlled with a high degree of accuracy for each color (each wavelength), adjustment of the white balance of a picked up image can be performed by the light source apparatus 11203. Further, in this case, if laser beams from the respective RGB laser light sources are irradiated time-divisionally on an observation target and driving of the image pickup elements of the camera head 11102 are controlled in synchronism with the irradiation timings. Then images individually corresponding to the R, G and B colors can be also picked up time-divisionally. According to this method, a color image can be obtained even if color filters are not provided for the image pickup element.

Further, the light source apparatus 11203 may be controlled such that the intensity of light to be outputted is changed for each predetermined time. By controlling driving of the image pickup element of the camera head 11102 in synchronism with the timing of the change of the intensity of light to acquire images time-divisionally and synthesizing the images, an image of a high dynamic range free from underexposed blocked up shadows and overexposed highlights can be created.

Further, the light source apparatus 11203 may be configured to supply light of a predetermined wavelength band ready for special light observation. In special light observation, for example, by utilizing the wavelength dependency of absorption of light in a body tissue to irradiate light of a narrow band in comparison with irradiation light upon ordinary observation (namely, white light), narrow band observation (narrow band imaging) of imaging a predetermined tissue such as a blood vessel of a superficial portion of the mucous membrane or the like in a high contrast is performed. Alternatively, in special light observation, fluorescent observation for obtaining an image from fluorescent light generated by irradiation of excitation light may be performed. In fluorescent observation, it is possible to perform observation of fluorescent light from a body tissue by irradiating excitation light on the body tissue (autofluorescence observation) or to obtain a fluorescent light image by locally injecting a reagent such as indocyanine green (ICG) into a body tissue and irradiating excitation light corresponding to a fluorescent light wavelength of the reagent upon the body tissue. The light source apparatus 11203 can be configured to supply such narrow-band light and/or excitation light suitable for special light observation as described above.

Figure 54:
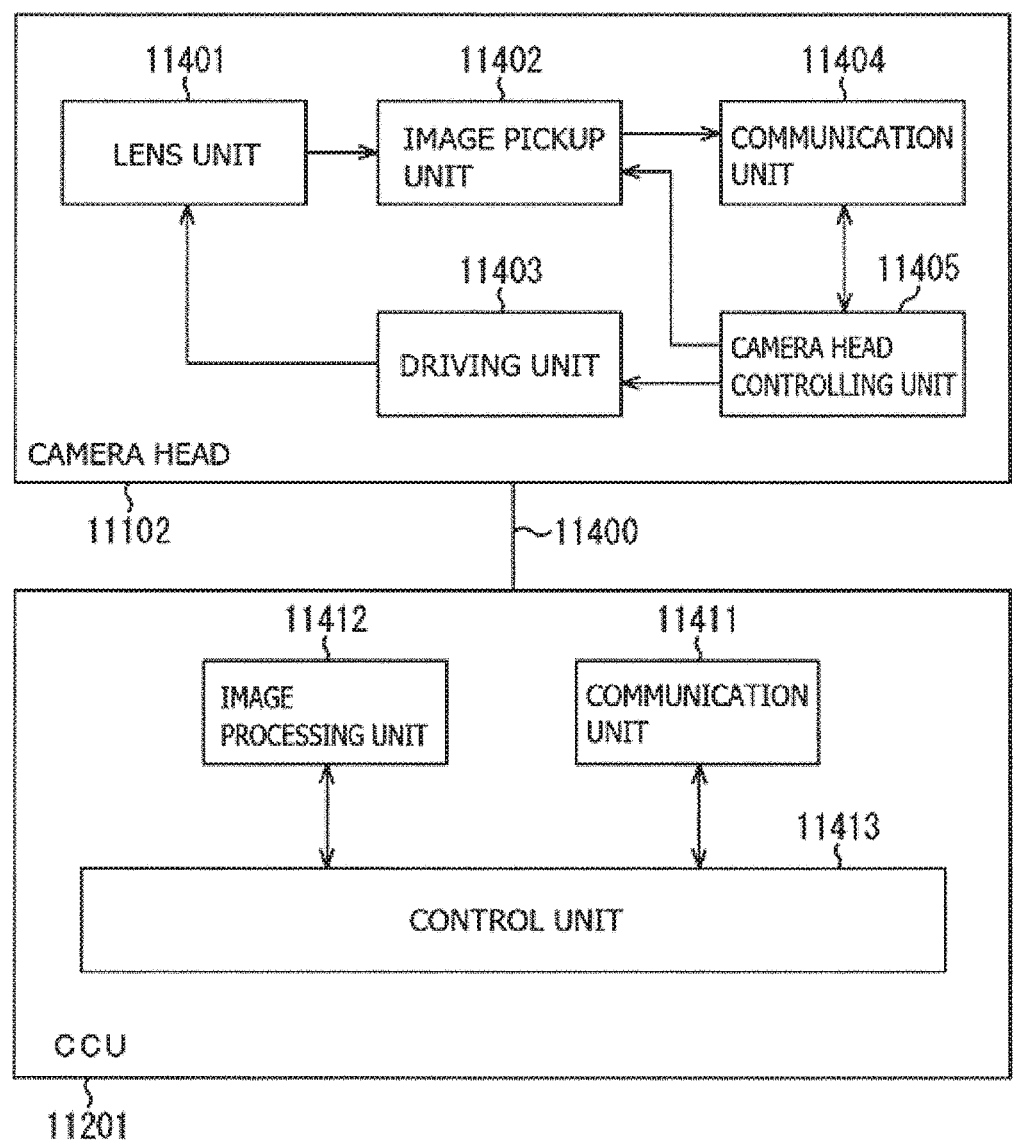
FIG. 54 is a block diagram depicting an example of a functional configuration of a camera head and a camera control unit (CCU).

FIG. 54 is a block diagram depicting an example of a functional configuration of the camera head 11102 and the CCU 11201 depicted in FIG. 53.

The camera head 11102 includes a lens unit 11401, an image pickup unit 11402, a driving unit 11403, a communication unit 11404 and a camera head controlling unit 11405. The CCU 11201 includes a communication unit 11411, an image processing unit 11412 and a control unit 11413. The camera head 11102 and the CCU 11201 are connected for communication to each other by a transmission cable 11400.

The lens unit 11401 is an optical system, provided at a connecting location to the lens barrel 11101. Observation light taken in from a distal end of the lens barrel 11101 is guided to the camera head 11102 and introduced into the lens unit 11401. The lens unit 11401 includes a combination of a plurality of lenses including a zoom lens and a focusing lens.

The number of image pickup elements which is included by the image pickup unit 11402 may be one (single-plate type) or a plural number (multi-plate type). Where the image pickup unit 11402 is configured as that of the multi-plate type, for example, image signals corresponding to respective R, G and B are generated by the image pickup elements, and the image signals may be synthesized to obtain a color image. The image pickup unit 11402 may also be configured so as to have a pair of image pickup elements for acquiring respective image signals for the right eye and the left eye ready for three dimensional (3D) display. If 3D display is performed, then the depth of a living body tissue in a surgical region can be comprehended more accurately by the surgeon 11131. It is to be noted that, where the image pickup unit 11402 is configured as that of stereoscopic type, a plurality of systems of lens units 11401 are provided corresponding to the individual image pickup elements.

Further, the image pickup unit 11402 may not necessarily be provided on the camera head 11102. For example, the image pickup unit 11402 may be provided immediately behind the objective lens in the inside of the lens barrel 11101.

The driving unit 11403 includes an actuator and moves the zoom lens and the focusing lens of the lens unit 11401 by a predetermined distance along an optical axis under the control of the camera head controlling unit 11405. Consequently, the magnification and the focal point of a picked up image by the image pickup unit 11402 can be adjusted suitably.

The communication unit 11404 includes a communication apparatus for transmitting and receiving various kinds of information to and from the CCU 11201. The communication unit 11404 transmits an image signal acquired from the image pickup unit 11402 as RAW data to the CCU 11201 through the transmission cable 11400.

In addition, the communication unit 11404 receives a control signal for controlling driving of the camera head 11102 from the CCU 11201 and supplies the control signal to the camera head controlling unit 11405. The control signal includes information relating to image pickup conditions such as, for example, information that a frame rate of a picked up image is designated, information that an exposure value upon image picking up is designated and/or information that a magnification and a focal point of a picked up image are designated.

It is to be noted that the image pickup conditions such as the frame rate, exposure value, magnification or focal point may be designated by the user or may be set automatically by the control unit 11413 of the CCU 11201 on the basis of an acquired image signal. In the latter case, an auto exposure (AE) function, an auto focus (AF) function and an auto white balance (AWB) function are incorporated in the endoscope 11100.

The camera head controlling unit 11405 controls driving of the camera head 11102 on the basis of a control signal from the CCU 11201 received through the communication unit 11404.

The communication unit 11411 includes a communication apparatus for transmitting and receiving various kinds of information to and from the camera head 11102. The communication unit 11411 receives an image signal transmitted thereto from the camera head 11102 through the transmission cable 11400.

Further, the communication unit 11411 transmits a control signal for controlling driving of the camera head 11102 to the camera head 11102. The image signal and the control signal can be transmitted by electrical communication, optical communication or the like.

The image processing unit 11412 performs various image processes for an image signal in the form of RAW data transmitted thereto from the camera head 11102.

The control unit 11413 performs various kinds of control relating to image picking up of a surgical region or the like by the endoscope 11100 and display of a picked up image obtained by image picking up of the surgical region or the like. For example, the control unit 11413 creates a control signal for controlling driving of the camera head 11102.

Further, the control unit 11413 controls, on the basis of an image signal for which image processes have been performed by the image processing unit 11412, the display apparatus 11202 to display a picked up image in which the surgical region or the like is imaged. Thereupon, the control unit 11413 may recognize various objects in the picked up image using various image recognition technologies. For example, the control unit 11413 can recognize a surgical tool such as forceps, a particular living body region, bleeding, mist when the energy device 11112 is used and so forth by detecting the shape, color and so forth of edges of objects included in a picked up image. The control unit 11413 may cause, when it controls the display apparatus 11202 to display a picked up image, various kinds of surgery supporting information to be displayed in an overlapping manner with an image of the surgical region using a result of the recognition. Where surgery supporting information is displayed in an overlapping manner and presented to the surgeon 11131, the burden on the surgeon 11131 can be reduced and the surgeon 11131 can proceed with the surgery with certainty.

The transmission cable 11400 which connects the camera head 11102 and the CCU 11201 to each other is an electric signal cable ready for communication of an electric signal, an optical fiber ready for optical communication or a composite cable ready for both of electrical and optical communications.

Here, while, in the example depicted, communication is performed by wired communication using the transmission cable 11400, the communication between the camera head 11102 and the CCU 11201 may be performed by wireless communication.

It is to be noted that, although description is given here of the endoscopic surgery system, as an example, the technology according to the present disclosure may be applied, for example, to a micrographic surgery system or the like, other than the above.

<Example of Application to Mobile Body>

The technology (the present technology) according to the present disclosure can be applied to various products. For example, the technology according to the present disclosure may be implemented as an apparatus to be mounted on a mobile body of any type of an automobile, an electric automobile, a hybrid electric automobile, a motorcycle, a bicycle, a personal mobility, an airplane, a drone, a vessel, a robot, etc.

Figure 55:
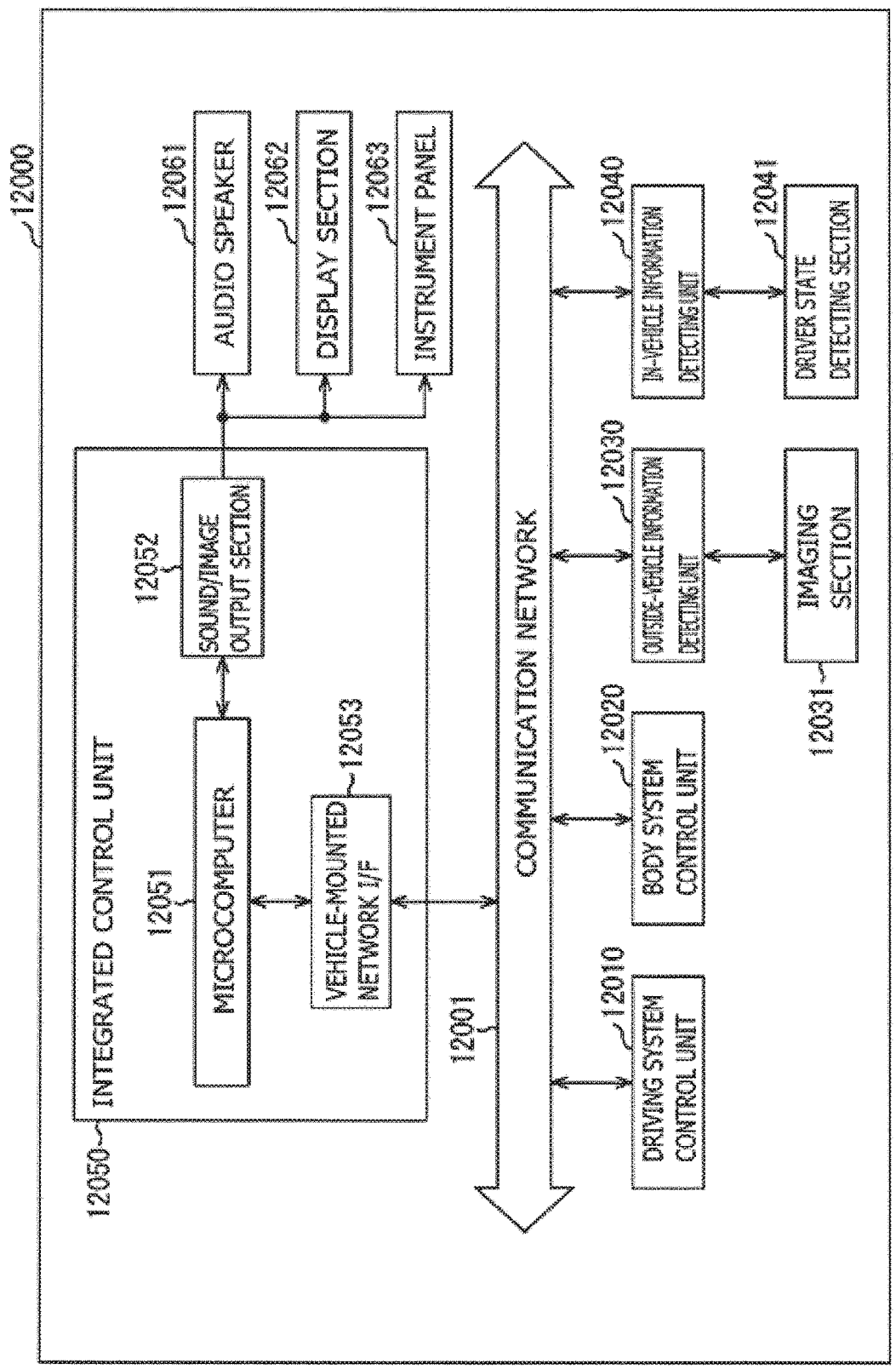
FIG. 55 is a block diagram depicting an example of schematic configuration of a vehicle control system.

FIG. 55 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 55, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 55, an audio speaker 12061, a display section 12062, and an instrument panel 12063 are illustrated as the output device. The display section 12062 may, for example, include at least one of an on-board display and a head-up display.

Figure 56:
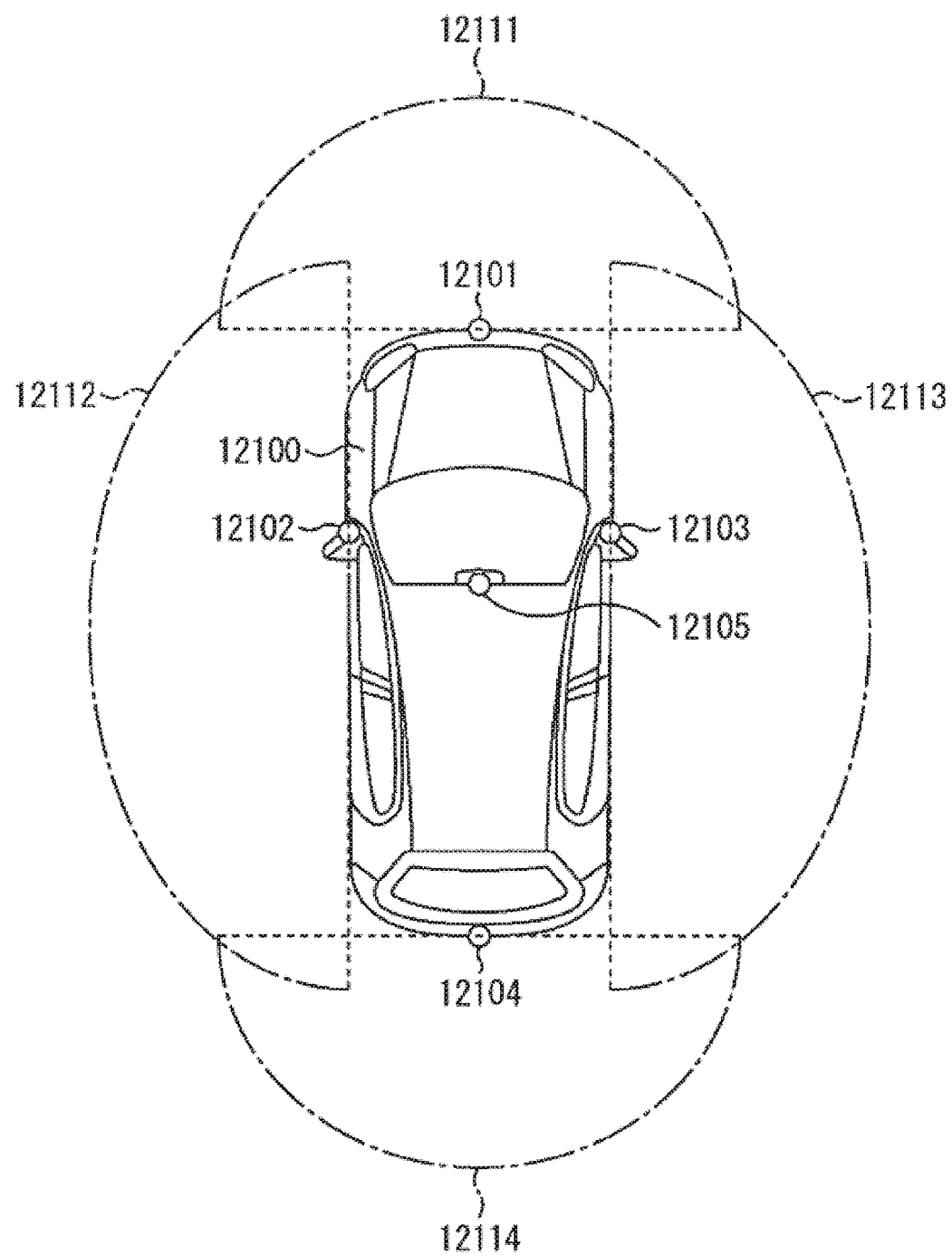
FIG. 56 is a diagram of assistance in explaining an example of installation positions of an outside-vehicle information detecting section and an imaging section.

FIG. 56 is a diagram depicting an example of the installation position of the imaging section 12031.

In FIG. 56, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 56 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

Further, in the present description, the system refers to an apparatus, as a whole, including a plurality of apparatuses.

It is to be noted that the effects described in the present specification are merely illustrative and non-limiting, and other effects may be provided.

It is to be noted that an embodiment of the present technology is not limited to the embodiments described above, and it is possible to make various modifications insofar as they do not depart from the gist of the present technology.

It is to be noted that the present technology can also have the following configurations.

(1)

A control device including:

a moving body that moves in two or more directions; and a controller that controls movement of the moving body, in which the controller sets a control value directed to controlling of the movement of the moving body on the basis of an initial position of the moving body and an instructed position of the moving body.

(2)

The control device according to (1) described above, in which a parameter directed to setting of the control value is set on the basis of the initial position and the instructed position.

(3)

The control device according to (2) described above, in which the controller holds a table in which the initial position, the instructed position, and the parameter are associated with each other, and reads the parameter corresponding to the initial position and the instructed position of the moving body with reference to the table.

(4)

The control device according to (3) described above, in which a movable range of the moving body is divided into a plurality of regions, and the table includes a table in which a region of the initial position, a region of the instructed position, and the parameter are associated with each other.

(5)

The control device according to (3) or (4), further including a determining section that determines a movement direction of the moving body, in which the table is set as a table in which the parameter is uniquely set from the initial position, the instructed position, and the movement direction.

(6)

The control device according to any one of (3) to (5) described above, in which a driving voltage value, directed to driving of the moving body, associated with the initial position and the instructed position is also described in the table, and the controller controls driving of the moving body with the driving voltage value set on the basis of the initial position and the instructed position.

(7)

The control device according to any one of (2) to (6) described above, in which the parameter includes a gain parameter at a time when PID control or PI control performs control, and a control value directed to controlling of the movement of the moving body is calculated as a result of the control performed by the PID control or the PI control.

(8)

The control device according to (2) described above, in which the controller holds an arithmetic expression based on a combination of the initial position and the instructed position, sets the arithmetic expression corresponding to the initial position and the instructed position of the moving body, and sets the parameter with an arithmetic operation based on the set arithmetic expression.

(9)

The control device according to (8) described above, in which a movable range of the moving body is divided into a plurality of regions, and the arithmetic expression is an arithmetic expression associated with a region of the initial position and a region of the instructed position.

(10)

The control device according to (8) or (9) described above, further including a determining section that determines a movement direction of the moving body, in which the arithmetic expression is set from the initial position, the instructed position, and the movement direction.

(11)

The control device according to any one of (8) to (10) described above, in which the controller further holds an arithmetic expression directed to calculating of a driving voltage value directed to driving of the moving body on the basis of the initial position and the instructed position, and the controller substitutes the instructed position into the arithmetic expression set on the basis of the initial position and the instructed position to calculate the driving voltage value, and controls driving of the moving body with the calculated driving voltage value.

(12)

The control device according to any one of (8) to (11) described above, in which the parameter includes a gain parameter at a time when PID control or PI control performs control, and a control value directed to controlling of the movement of the moving body is calculated as a result of the control performed by the PID control or the PI control.

(13)

The control device according to any one of (8) to (12) described above, in which the controller selects the arithmetic expression on the basis of the initial position in a first movement direction of the moving body and the instructed position in a second movement direction, and substitutes the instructed position in the first movement direction into the selected arithmetic expression to calculate the parameter.

(14)

The control device according to any one of (1) to (13) described above, in which the moving body includes a first movable body that is movable in a first movement direction with respect to a base body, a second movable body that is positioned on opposite side of the first movable body to the base body and is movable in a second movement direction with respect to the first movable body, the second movement direction being different from the first movement direction, and a first driving body and a second driving body that each apply a driving force to the second movable body, in which the first movable body and the second movable body are moved together in the first movement direction with respect to the base body by the driving force of the first driving body, the second driving body, or both, and the second movable body is moved in the second movement direction with respect to the first movable body by the driving force of the first driving body, the second driving body, or both.

(15)

The control device according to any one of (1) to (14) described above, in which the controller performs control that corrects a shake.

(16)

The control device according to any one of (1) to (14) described above, in which the controller controls movement of a sensor when a plurality of images is captured by moving the sensor.

(17)

A controlling method in which a control device controlling a moving body controls movement of the moving body on the basis of an initial position of the moving body and an instructed position of the moving body, the moving body moving in two or more directions.

(18)

An imaging apparatus including:

a lens unit including one or more lenses;

an imaging device that performs photoelectric conversion of an optical image taken in through the one or more lenses; and a shake correction device that corrects an image shake of the optical image, in which the shake correction device includes a moving body that moves in two or more directions, and a controller that sets a control value directed to controlling of movement of the moving body on the basis of an initial position of the moving body and an instructed position of the moving body.

DESCRIPTION OF REFERENCE SIGNS 1 imaging apparatus, 9 shake correction device, 10 base body, 11 first movable body, 12 second movable body, 13 disposing section, 13a disposing space, 21 first guide, 22 first rolling member, 25 second guide, 26 second rolling member, 27 second rolling member, 33a first working target surface, 34a second working target surface, 35 pressing spring (biasing portion), 36 first driving body, 37 first actuator, 38 first slider, 41a first driving force transmitting section, 42 second driving body, 43 second actuator, 44 second slider, 50 controller, 101 adding section, 102 arithmetic operation section, 103 PID control section, 104 actuator control section, 201 direction determining section, 202 arithmetic operation section, 301 voltage control section

The invention claimed is:

1. A control device, comprising:
a moving body configured to move in two or more directions, wherein a movable range of the moving body is divided into a plurality of regions; and
a controller configured to:
set a parameter based on an initial position of the moving body and an instructed position of the moving body;
hold a table in which the initial position, the instructed position, and the parameter are associated with each other, wherein the table comprises a first table in which a region of the initial position, a region of the instructed position, and the parameter are associated with each other;
read the parameter corresponding to the initial position of the moving body and the instructed position of the moving body with reference to the table;
set a control value directed to control movement of the moving body, wherein the control value is set based on the parameter; and
control the movement of the moving body based on the set control value.

2. The control device according to claim 1, further comprising a determining section configured to determine a movement direction of the moving body,
wherein the table is set as a second table in which the parameter is uniquely set from the initial position, the instructed position, and the movement direction.

3. The control device according to claim 1, wherein
the table further includes a driving voltage value associated with the initial position and the instructed position,
the driving voltage value is directed to drive the moving body,
the controller is further configured to control the drive of the moving body based on the driving voltage value, and the driving voltage value is set based on the initial position and the instructed position.

4. The control device according to claim 1, wherein the parameter comprises a gain parameter at a time of a control performed by a Proportional-Integral-Differential (PID) control or a control performed by a Proportional-Integral (PI) control, and
the controller is further configured to calculate the control value directed to control the movement of the moving body as a result of the control performed by the PID control or the control performed by the PI control.

5. The control device according to claim 1, wherein the controller is further configured to:
hold an arithmetic expression based on a combination of the initial position and the instructed position;
set the arithmetic expression corresponding to the initial position and the instructed position of the moving body; and
set the parameter with an arithmetic operation based on the set arithmetic expression.

6. The control device according to claim 5, wherein the arithmetic expression is an arithmetic expression associated with the region of the initial position and the region of the instructed position.

7. The control device according to claim 5, further comprising
a determining section configured to determine a movement direction of the moving body,
wherein the arithmetic expression is set from the initial position, the instructed position, and the movement direction.

8. The control device according to claim 5, wherein the controller is further configured to:
hold the arithmetic expression directed to calculation of a driving voltage value based on the initial position and the instructed position, wherein the driving voltage value is directed to drive the moving body;
substitute the instructed position into the arithmetic expression;
calculate the driving voltage value based on the substitution of the instructed position into the arithmetic expression; and
control the drive of the moving body based on the calculated driving voltage value.

9. The control device according to claim 5, wherein
the parameter comprises a gain parameter at a time of a control performed by a Proportional-Integral-Differential (PID) control or a control performed by a Proportional-Integral (PI) control, and
the controller is further configured to calculate the control value directed to control the movement of the moving body as a result of the control performed by the PID control or the control performed by the PI control.

10. The control device according to claim 5, wherein the controller is further configured to:
select the arithmetic expression based on the initial position in a first movement direction of the moving body and the instructed position in a second movement direction;
substitute the instructed position in the first movement direction into the selected arithmetic expression; and
calculate the parameter based on the substitution of the instructed position in the first movement direction into the selected arithmetic expression.

11. The control device according to claim 1, wherein the moving body includes:

a first movable body movable in a first movement direction with respect to a base body;
a second movable body positioned on an opposite side of the first movable body, wherein
the second movable body is movable in a second movement direction with respect to the first movable body, and
the second movement direction is different from the first movement direction; and
a first driving body and a second driving body each configured to apply a driving force to the second movable body, wherein
the first movable body and the second movable body are configured to move together in the first movement direction with respect to the base body based on the driving force of at least one of the first driving body or the second driving body, and
the second movable body is configured to move in the second movement direction with respect to the first movable body based on the driving force of at least one of the first driving body or the second driving body.

12. The control device according to claim 1, wherein the controller is further configured to perform control to correct an image shake of an optical image.

13. The control device according to claim 1, wherein the controller is further configured to control movement of a sensor that captures a plurality of images based on the movement of the sensor.

14. A controlling method, comprising:
setting a parameter based on an initial position of a moving body and an instructed position of the moving body, wherein
the moving body is configured to move in two or more directions, and
a movable range of the moving body is divided into a plurality of regions;
holding a table in which the initial position, the instructed position, and the parameter are associated with each other, wherein the table comprises a first table in which a region of the initial position, a region of the instructed position, and the parameter are associated with each other;
reading the parameter corresponding to the initial position of the moving body and the instructed position of the moving body with reference to the table;
setting a control value directed to controlling movement of the moving body, wherein the control value is set based on the parameter; and
controlling the movement of the moving body based on the set control value.

15. An imaging apparatus, comprising:
a lens unit including one or more lenses;
an imaging device configured to perform photoelectric conversion of an optical image taken in through the one or more lenses; and
a shake correction device configured to correct an image shake of the optical image, wherein the shake correction device includes:
a moving body configured to move in two or more directions, wherein a movable range of the moving body is divided into a plurality of regions; and
a controller configured to:
set a parameter based on an initial position of the moving body and an instructed position of the moving body;
hold a table in which the initial position, the instructed position, and the parameter are associated with each other, wherein the table comprises a first table in which a region of the initial position, a region of the instructed position, and the parameter are associated with each other;

read the parameter corresponding to the initial position of the moving body and the instructed position of the moving body with reference to the table;

seta control value directed to control movement of the moving body, wherein the control value is set based on the parameter; and control the movement of the moving body based on the set control value.

16. A control device, comprising:

a moving body configured to move in two or more directions; and a controller configured to:

hold an arithmetic expression based on a combination of an initial position of the moving body and an instructed position of the moving body;

set the arithmetic expression corresponding to the initial position of the moving body and the instructed position of the moving body;

set a parameter with an arithmetic operation based on the set arithmetic expression;

set a control value directed to control movement of the moving body, wherein the control value is set based on the parameter; and control the movement of the moving body based on the set control value.

* * * * *